US008197847B2

(12) United States Patent
Haddleton et al.

(10) Patent No.: US 8,197,847 B2
(45) Date of Patent: Jun. 12, 2012

(54) PROCESS FOR MAKING POLYMERS AND SUPPORTS COMPRISING PENDANT SUGAR SIDE GROUPS

(75) Inventors: David M. Haddleton, Kenilworth (GB); Guiseppe Mantovani, Coventry (GB); Vincent Ladmiral, Bidache (FR)

(73) Assignee: Warwick Effect Polymers Ltd., Coventry (GB)

( * ) Notice: Subject to any disclaimer, the term of this patent is extended or adjusted under 35 U.S.C. 154(b) by 636 days.

(21) Appl. No.: 12/205,056

(22) Filed: Sep. 5, 2008

(65) Prior Publication Data

US 2009/0082224 A1   Mar. 26, 2009

Related U.S. Application Data

(63) Continuation of application No. PCT/GB2007/000840, filed on Mar. 12, 2007.

(60) Provisional application No. 60/809,588, filed on May 31, 2006.

(30) Foreign Application Priority Data

Mar. 10, 2006 (GB) .................................. 0604911.8
Sep. 11, 2006 (GB) .................................. 0617918.8

(51) Int. Cl.
*A61K 9/14* (2006.01)
(52) U.S. Cl. .................. 424/486; 424/78.17; 424/78.31; 424/78.35; 424/179.1; 506/19; 506/20; 525/54.2; 525/384
(58) Field of Classification Search ............... 525/384; 506/19, 20; 424/78.17, 78.31, 78.35, 179.1, 424/486
See application file for complete search history.

(56) References Cited

U.S. PATENT DOCUMENTS

2004/0116677 A1*   6/2004   Chaikof et al. ............. 530/395

FOREIGN PATENT DOCUMENTS

| WO | 0078821 A1 | 12/2000 |
| WO | 2004055160 A2 | 7/2004 |
| WO | 2005035727 A2 | 4/2005 |
| WO | 2005087818 A1 | 9/2005 |
| WO | 2006003352 A1 | 1/2006 |

OTHER PUBLICATIONS

Fazio, F.; Bryan, M.C.; Blixt, O.; Paulson, J.C.; Wong, C.H.; Journal of the American Chemical Society, 2002, p. 14397-14402.*
Woodson, L.C.; Ames, M.M.; Selassie, C.D.; Hansch, C.; Weinshilboum, R.M.; Molecular Pharmacology, 1983, p. 471-478.*
Sun, X.L.; Stabler, C.L.; Cazalis, C.S.; Chaikof, E.L.; Bioconjugate Chemistry, 2006 (published online Dec. 21, 2005), p. 52-57.*
Zhang, Y.; Luo, S.; Tang, Y.; Yu, L.; Hou, K.Y.; Cheng, J.P.; Zeng, X.; Wang, P.G.; Analytical Chemistry, 2006 (published online Jan. 28, 2006), p. 2001-2008.*
Malkoch, Michael, et al., "Orthogonal Approaches to the Simultaneous and Cascade Functionalization of Macromolecules Using Click Chemistry," J. Am. Chem. Soc., 127: 14942-14949 (2005).
Falbe, J., et al., "Römmp Chemie Lexikon," Thieme, Stuttgart, XP002436909, 1989.
Punna, Sreenivas, et al., "Clickable" Agarose for Affinity Chromatography, Bioconjugate Chem., 16: 1536-1541 (2005).
Opsteen, J.A. et al., "Modular synthesis of block copolymers via cycloaddition of terminal azide and alkyne functionalized polymers," Chemical Communications, vol. 1: 57-59 (2005).
Gupta, S.S. et al., "Virus-glycopolymer conjugates by copper (I) catalysis of atom transfer radical polymerization and azide-alkyne cycloaddition," Chemical Communications, vol. 34: 4315-4317 (2005).
Tsarevsky, N.V. et al., "Step-Growth "Click" Coupling of Telechelic Polymers Prepared by Atom Transfer Radical Polymerization," Macromolecules, 38: 3558-3561 (2005).

* cited by examiner

*Primary Examiner* — David W Wu
*Assistant Examiner* — Robert Jones, Jr.
(74) *Attorney, Agent, or Firm* — Edgar W. Harlan; Carolyn S. Elmore; Elmore Patent Law Group PC

(57) ABSTRACT

The application discloses a process for making a polymer having pendant side groups comprising:
(i) polymerising an olefinically unsaturated monomer functionalized with (a) an azide group optionally protected by a protecting group, or (b) an alkyne group optionally protected by a protecting group, by living radical polymerization, most preferably RAFT, transitional metal mediated living radical polymerization (TMM-LRP) and/or atom transfer radical polymerization, to produce a polymer intermediate;
(ii) removing, when present, at least a portion of the total number of protecting groups from the polymer intermediate;
(iii) reacting the polymer intermediate with at least one pendant side group moiety functionalised with (a) an alkyne group or (b) an azide group respectively so that the alkyne and azide groups react to attach the pendant side group to the polymer. Processes for making supports comprising pendant side groups, and polymers and supports prepared by the method are also disclosed.

16 Claims, 14 Drawing Sheets

○ Galactose
● Mannose

PROCESS FOR MAKING POLYMERS AND SUPPORTS COMPRISING PENDANT SUGAR SIDE GROUPS

RELATED APPLICATIONS

This application is a continuation of International Application No. PCT/GB2007/00840, which designated the United States and was filed on Mar. 12, 2007, published in English, which claims the benefit of U.S. Provisional Application No. 60/809,588, filed on May 31, 2006. This application claims priority under 35 U.S.C. §119 or 365 to Great Britain, Application No's. 0604911.8, filed Mar. 10, 2006 and 0617918.8, filed on Sep. 11, 2006. The entire teachings of the above applications are incorporated herein by reference.

The invention provides processes for making polymers having pendant side groups, such as sugars, alkyl groups, polyalkylene glycol groups or phospholipid groups. Polymers comprising such side groups are also provided, together with intermediate polymers suitable for attachment of the pendant side groups.

"Click chemistry" is a term used to describe several classes of chemical transformations that share a number of important properties such as very high efficiency, in terms of both conversion and selectivity, with very mild reaction conditions and a simple work up.[1, 2] The Cu(I)-catalyzed version of the Huisgen 1,3-cycloaddition[3, 4] has been recently receiving the greatest attention, since high efficiency and stereoselectivity are coupled with excellent functional group compatibility. These important features of this chemical process (often simply referred to as "click") allowed the tailor made synthesis of complex materials such as dendrimers,[5-8] bioconjugates,[9-12] therapeutics,[13-15] functionalized polymers,[16-20] affinity chromatography supports[21] and sugar derivatives.[22-28] In addition, "click" strategies have been used as an approach to synthetic cyclodextrins[29] and the decoration of cyclic peptides by glycosilation[28]. Synthetic glycochemicals are attracted increasing interest as carbohydrates are involved in a number of important biological processes involving highly specific events in cell-cell recognition, cell-proteins interactions and the targeting of hormones, antibodies and toxins.[22, 30-33] Sugars are information-rich molecules and an increasingly large number of known lectins are able to recognize subtle variations of oligosaccharide structure and act as decoders for this carbohydrate-encoded information.[34] Gaining insight into the factors that control these phenomena may open the way for the development of new anti-infective, anti-inflammatory and anticancer therapeutics and agents.[22, 28, 30, 35, 36]

Synthetic glycopolymers are receiving increasing attention as mono-saccharides have weak interactions with protein receptors and thus only illicit a weak response to in vivo events mediated by carbohydrate-protein binding[37-40]. In nature, often both protein-binding carbohydrates and lectins exist in higher-order oligomeric structures presenting multiple binding sites acting as "polydentate" donors which helps to circumvent this intrinsic weak binding limitations relating to the use of monovalent ligands.[40, 41] The enhancement in activity that can be achieved with appropriate synthetic multivalent polymers as compared to the corresponding monovalent ligands is known as the "glycoside cluster effect".[34, 42-44]

The synthesis of glycopolymers featuring well-defined macromolecular architectures (chain length, blocks, stars) is an interesting target in this field, and a number of synthetic techniques have been employed in order to achieve this. Controlled radical polymerization of carbohydrate-containing monomers offers one promising synthetic route to achieve new glycopolymers, however only a relatively small number of examples have been reported in the literature thus far.[45-52] One contributing reason is due to the inherent difficulties in the synthesis of the requisite carbohydrate monomers; the compatibility of these highly functionalized monomers with the conditions of living radical polymerization, and in some cases, subsequent deprotection to reveal the carbohydrate epitope.

Copper(I) catalyzed Huisgen 1,3-dipolar cycloaddition is a particularly attractive route for the synthesis of new synthetic glycopolymers as the reaction conditions are compatible with unprotected sugar azides, as long as suitable "clickable" polymers are available.[53] The synthetic strategy developed in the current invention is outlined in FIG. 1. Since a large variety of carbohydrate-based materials can be obtained starting from the same alkyne containing "clickable" polymer, the method appears to be particularly useful for preparing libraries of sugar polymers featuring materials with identical size and structural architectures of the polymer backbone but differing just in the nature of the pendant sugar moieties to control the properties due to the multiple carbohydrates rather than the polymer backbone. The use of an alkyne monomer with azido sugars was also considered attractive over the reverse, an azide polymer with alkyne functional sugars, from a safety perspective as this reduces the number of azide groups in the same molecule and utilizes well documented azido functional sugars. The invention is also applicable to other pendant side groups such as alkyl, polyalkylene glycol, and phospholipid groups.

Transition Metal Mediated Living Radical Polymerization (TMM-LRP, often termed ATRP)[54, 55] is well established, versatile, has good tolerance towards most functional groups and allows excellent control over the polymer architecture. A number of patent applications relate to TM-LRP. These include WO 96/30421 and WO 97/18247 which disclose ATRP using an initiator having a radically transferable atom or group, a transition metal compound and a ligand such as bipyridine. Alternative organodiimine-based catalysts are disclosed in WO 97/47661.

The production of comb polymers, such as polyethylene glycols, comprising functional groups capable of reacting with polypeptides using TM-LRP has been disclosed in WO 2006/003352.

Thus TMM-LRP was chosen as the polymerization technique for the synthesis of the required alkyne functional materials. A protected alkyne monomer was used, following the work of Van Hest and coworkers[17] who recently reported the synthesis of α-functional alkyne polymers obtained by ATRP starting from a trimethylsilyl-protected alkyne initiator as the homo-polymerization of unprotected propargyl methacrylate leads to polymers having relatively broad molecular weight distribution.[20, 56]

The synthetic strategy developed was employed for the preparation of a small representative library of glycopolymers that have been used as multivalent ligands for lectin binding studies. The interaction of various lectins with a number of synthetic glycopolymers has been previously reported[57-60] These materials have been employed for a range of potential applications covering lectin clustering studies[57, 61-68] and for the evaluation of cell-surface interactions.[69-75] The possibility of using a combination of the two versatile synthetic methodologies "click" and TMM-LRP was attractive as excellent control over the multivalent ligands properties is associated with the advantages related to the robustness of both these processes (tolerance towards a number of functional groups and solvents, use of technical grade solvents, including water, and relatively inexpensive starting materials).

The inventors realised that the ease at which they were able to produce polymers with pendant sugar groups means that it is also applicable to the ready production of polymers containing other side groups, such as alkyl, polyalkylene glycols (such as polyethylene glycol) and phospholipid groups.

The invention provides a process for making a polymer having pendant side groups comprising:
(i) polymerising an olefinically unsaturated monomer functionalised with (a) an azide group optionally protected by a protecting group, or (b) an alkyne group optionally protected by a protecting group, by living radical polymerisation, most preferably RAFT (Reverse Addition—Fragmentation Chain Transfer Polymerisation), transitional metal mediated living radical polymerisation (TMM-LRP) and/or atom transfer radical polymerisation, to produce a polymer intermediate;
(ii) removing, when present, at least a portion of the total number of protecting groups from the polymer intermediate;
(iii) reacting the polymer intermediate with at least one pendant side group moiety functionalised with (a) an alkyne group or (b) an azide group respectively so that the alkyne and azide groups react to attach the pendant side group to the polymer.

The use of transition metal mediated living radical polymerisation, also sometimes known as atom transfer radical polymerisation, allows polymers having tightly controlled polydispersity, containing the azide groups or alkyne groups to be easily produced. RAFT may also be used to polymerise the monomers. The use of RAFT means that the alkyne groups do not need to be protected during the course of the polymising reaction.

This intermediate can then be easily reacted with the side group moieties to attach the pendant side groups onto the polymer. The separation of the side groups from the monomer during the polymerisation process means that the polymer intermediate can be produced in bulk and stored until such time that the final polymer having pendant side groups needs to be produced. Furthermore, the polymer intermediate can be produced under conditions which otherwise might damage the pendant side groups. A variety of different side groups can be readily attached to the polymer intermediate. This allows, for example, the relatively easy formation of libraries of polymers containing a variety of side groups.

Azides may be readily prepared by techniques well known in the art, including by nucleophilic substitution of appropriate groups, such as halides, with for example sodium azide. Techniques for the production of alkyne-containing molecules are also themselves well known in the art.

Preferably the olefinically unsaturated monomers are functionalised with alkyne groups optionally protected by a protecting group. In such a situation, the pendant group moieties will comprise an azide group. Use of this arrangement is particularly attractive because, from a safety perspective, it reduces the number of azide groups in the same molecule and utilises well-known azidofunctionalised side groups, such as azidofunctional sugars. Such functionalised compounds are often commercially available.

The pendant side group may comprise a biological entity. Preferably the pendant side group has a biological activity. That is, the pendant side group comprises a moiety which occurs within or is made by a cell, and/or which interacts with a molecule, such as a receptor or other molecule within an organism, cell or on the surface of a cell. The organism or cell may be prokaryotic, eukaryotic, fungal, bacterial, plant or animal such as mammalian or preferably human. The cell may be isolated or a part of a tissue or whole organism. Preferred side groups include those with a moiety selected from proteins, peptides, aminoacids, carbohydrates, nucleic acids, nucleotides, nuclosides, vitamins, hormones, fatty acids, lipopolysaccharides, glycerol, etc. The biological entity may bind to a receptor. Such compounds are known in the art. The process of the invention allows them to be easily incorporated onto polymers, for example for the production of combinatorial libraries with different numbers or combinations of entities.

Preferably, the pendant side group comprises a moiety selected from one or more sugars, substituted or non-substituted alkyl groups, substituted or non-substituted polyalkylene glycol groups or phospholipid groups.

Sugars are carbohydrates which are usually an aldehyde or a ketone derivative of a polyhydric alcohol. They may be monomers (monosaccharides), such as fructose or glucose, or more complex sugars made of two or more sugars joined together to form disaccharides, pentasaccharides or polysaccharides. Different sugars may be formed together to form such di- and polysaccharides. Disaccharides include sugars such as sucrose, which is made of glucose and fructose. Polysaccharides include starch and celluloses. The term sugar includes both substituted and non-substituted sugars, and derivatives of sugars. Preferably, the sugar is selected from glucose, glucosamine, galactose, galactosamine, mannose, lactose, fucose and derivatives thereof, such as sialic acid, a derivative of glucosamine. The sugar is preferably α or β. The sugar may especially be a manno- or galactose pyranoside. The sugars may also be one or more nucleosides, such as 3-azido-3-deoxythymidine (commercially available from Aldrich Ltd, United Kingdom), or one or more nucleotides. The hydroxyl groups on the sugar may be protected with, for example, one or more acetyl groups. The sugar is preferably N-acetylated. Preferred examples of such sugars include N-acetyl galactosamine, sialic acid, neuraminic acid, N-acetyl galactose, and N-acetyl glucosamine. Such N-acetylated sugars are often present on cell surfaces and involved in surface recognition in organisms. For example, they are recognised by receptors on proteins, hormones, viruses, microorganisms, parasites or other cells within an organism.

Sugars are also present in lipopolysaccharides (LPS). LPS comprises a lipid attached to a polysaccharide. LPS is a component of, for example, the cell membrane gram of negative bacteria. It is an endotoxin that often stimulates an immune response in animals, such as mammals.

Preferably, the alkyl group comprises 6-30, especially 10-25, or 10-20 carbon atoms. This may be optionally substituted by one or more hydroxyl, carboxy, halogen, oxygen, nitrogen, amide or aryl groups. The alkyl group may be branched, straight or cyclic alkyl.

Preferably, the polyalkylene glycol is a polymer of an alkylene glycol containing 2-10, especially at least 3, carbon atoms, most preferably poly(ethylene glycol), poly(propylene glycol) or poly(butylene glycol). Most preferably, polyethylene glycol (PEG) is used. Methods of producing comb polymers from monomers comprising polyalkylene glycols is known in the art (as discussed in WO 2006/003352 and incorporated herein by reference). However, the attachment of pendant alkylene glycol groups via the mechanism disclosed herein is new and allows, for example, mixtures of different pendant groups to be used, in addition to the polyalkylene groups, via a relatively easy to use mechanism. The polyalkylene glycol groups may be optionally substituted by one or more groups, including those described above for alkyl groups.

Polyalkylene glycol derivatives have potential uses, for example for reducing the antigenicity and immunogenicity of a molecule to which PEG is attached. PEG also produces remarkably improved circulating half-lives in vivo due to either evasion of renal clearance as a result of the polymer increasing the apparent size of the molecule to above glomerular filtration limits and/or through evasion of cellular clearance mechanisms. Moreover PEG can remarkably improve the solubility of proteins and polypeptides to which it is attached. Hence, use of polyalkylene glycols with the polymers produces polymers with beneficial properties. PEG side groups may also be incorporated by copolymerising the olefinically unsaturated monomers functionalised with the azide group or alkyne group (as discussed above), with an olefinically unsaturated monomer functionalised with a polyalkylene glycol such as PEG. The latter monomers are discussed in WO 2006/003352.

Phospholipids are fat derivatives in which at least one fatty acid has been replaced by a phosphate group and usually with one of several nitrogen-containing molecules such as ethanolamine or choline. Phospholipids include phosphatidyl choline (also known as lecithin), phosphatidyl glycerol, phosphatidyl inositol, phosphatidyl serine and phosphatidyl ethanolamine. The polar characteristic of phospholipids is essential to their biological function in cell membranes. The fats-soluble portions associate with fat-soluble portions of other phospholipids while the water-soluble regions remain exposed to the surrounding solvent. Phospholipids also have important properties as they act as emulsifiers. Hence, the additional phospholipids to a polymer may be used to alter the solubility and/or biological activity of the polymer.

Most preferably, the pendant side group comprises a sugar.

Preferably, the olefinically unsaturated monomers copolymerise with one or more different olefinically unsaturated monomers. This may be used to produce a copolymer. The two different monomers may be, for example, methylmethacrylate functionalised with an alkyne group or an azide group, and the additional monomer may be, for example, non-functionalised methylmethacrylate. These may be added to the reaction separately to produce a block copolymer or alternatively together in a predetermined ratio to form a statistical copolymer. Use of an unfunctionalised monomer allows the number of functionalised monomers incorporated into the polymer intermediate to be controlled. Hence, most preferably at least one of the monomers used does not have a functionalised alkyne group or azide group. Such copolymerisation may be block, gradient or statistical.

At least one of the additional monomers may itself comprise a functionalised group. For example, the monomer might have attached to it a fluorescent or other marker group, such as benzyl side group detectable by NMR or a fluorescent group such as coumarin or hostasol. Other functionalised monomers may be used, however, to incorporate different properties to the final polymer. For example, the functionalised group may be a drug, such as a toxin and/or antibiotic. The antibiotic may be antiviral, antimicrobial or an antiparasitic agent, such as an antimalarial agent. Toxins and antibiotics are generally known. The functionalised group may be a polyalkylene glycol, such as polyethylene glycol.

Preferably, the polymer intermediate is reacted with two or more different pendant groups, each functionalised with an alkyne group or an azide group. This allows, for example, a mixture of different sugars to be attached to the final polymer. This has the advantage of allowing the effects of different ratios of different sugars to be determined on, for example, binding to lectins or cell membranes. One of the different pendant groups may also be a functional group, such as a marker. For example, coumarin (a fluorescent group) may be used to make the polymer fluorescent. The coumarin group may be attached via an azide group or an alkyne group as appropriate.

The protecting group protecting the alkyne group is preferably selected from a trialkyl, triaryl, $R_3Si$ (where R=substituted or non-substituted alkyl or aryl) each alkyl or aryl preferably containing 1 to 6 carbons or another silicon-containing protecting group. Preferably the protecting group is trimethylsilyl group.

A protecting group of the azide group is preferably not used and is usually not needed.

The inventors have unexpectedly found that where the alkyne group is protected by a trimethylsilyl group, and the protecting group is removed from the polymer intermediate by treating it with TBAF (tetrabutyl ammonium fluoride), buffered with an acid such as acetic acid, this improves the number of protecting groups removed from the polymer intermediate.

Preferably the or each olefinically unsaturated monomer is a linear, branched or star-shaped, substituted or non-substituted monomer having an olefinically unsaturated moiety capable of undergoing addition polymerisation, and optionally comprising one or more functional groups.

Preferably, the monomer is selected from methyl methacrylate, ethyl methacrylate, propyl methacrylate (all isomers), butyl methacrylate (all isomers), and other alkyl methacrylates; corresponding acrylates; also functionalised methacrylates and acrylates including glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid (and esters), itaconic acid (and esters), maleic anhydride; styrene, α-methyl styrene; vinyl halides such as vinyl chloride and vinyl fluoride; acrylonitrile, methacrylonitrile; vinylidene halides of formula $CH_2{=}C(Hal)_2$ where each halogen is independently Cl or F; optionally substituted butadienes of the formula $CH_2{=}C(R^{15})C(R^{15}){=}CH_2$ where $R^{15}$ is independently H, C1 to $C_{10}$ alkyl, Cl, or F; sulphonic acids or derivatives thereof of formula $CH_2{=}CHSO_2OM$ wherein M is Na, K, Li, $N(R^{16})_4$ where each $R^{16}$ is independently H or Cl or alkyl, D is COZ, ON, $N(R^{16})_2$ or $SO_2OZ$ and Z is H, Li, Na, K or $N(R^{16})_4$; acrylamide or derivatives thereof of formula $CH_2{=}CHCON(R^{16})_2$ and methacrylamide or derivative thereof of formula $CH_2{=}C(CH_3)CON(R^{16})_2$, mixtures of such monomers may be used, or a polyoxypolyether. The polyoxypolyether is preferably a poly(alkylene glycol) or polytetrahydrofuran. Preferably, the polyalkylene glycol is a polymer of an alkylene glycol containing 2-10, especially at least 3, carbon atoms, most preferably poly(ethylene glycol), poly(propylene glycol) or poly(butylene glycol). For example, polyethylene glycol may be used.

The monomers may be functionalised with an optionally protected azide or alkyne group as appropriate to allow the pendant side group moieties to be attached.

Most preferably, the method utilises transition metal mediated living free-radical polymerisation and/or ATRP (atom transfer radical polymerisation). These are especially preferred for sugars as sugars contain a range of functionality which could react with strong atoms (nucleophiles) and cations (electrophiles). However, other types of living polymerisation known in the art may be used. These include living anionic and cationic polymerisation RAFT and nitroxide-mediated polymerisation. RAFT is disclosed in, for example, U.S. Pat. No. 6,153,705, WO98/01478, WO99/35177, WO99/31144, WO98/58974.

Nitroxide medicated polymerisation is summarised in the article by Harnker C. J et al Chem Rev 2001.

Any living radical polymerisation is expected to work with the claimed invention as:

(i) Each initiator will lead to one polymer chain and only one polymer chain where the alpha-terminus is directly derived from the intiator;

(ii) The absence of termination reactions will remove the presence of difunctional products as a result of termination reactions;

(iii) Molecular weight distribution is more tightly controlled than by other reactions;

(iv) The polymerisation process allows the introduction of a functional group e.g. to bind proteins via the initiator, without having to carry out complex chemical transformations.

Preferably, the transition metal mediated living free-radical polymerisation and/or ATRP comprises the use of:

(i) An initiator comprising a transferable atom or group; and (ii) A catalyst capable of catalysing the polymerisation reaction.

The initiator preferably comprises a homolytically cleavable bond. There are a number of patent applications referring to such systems, including WO 96/30421, WO 97/18247 and WO 97/47661. Production of comb polymers, such as polyethylene glycols, is disclosed in WO 2006/003352.

Different forms of radical polymerisation, including nitroxide mediated living radical polymerisation, atom transfer radical polymerisation and reversible addition-fragmentation transfer (RAFT) mechanism, as well as other forms of living radical polymerisation are discussed in the text book "Hand-book of Radical Polymerisation", EDT. Matyjaszewski K. and Davies T. P. (John Wiley and Sons (2002) (incorporated herein by reference).

Preferably, the transferable atom or group is selected from Cl, Br, I, $OR^{20}$, $SR^{21}$, $SeR^{21}$, $OP(=O)R^{21}$, $OP(=O)R^{21}$, $OP(=O)(OR^{21})_2$, $OP(=O)O^{21}$, $O-N(R^{21})_2$ and $S-C(=S)N(R^{21})_2$, where $R^{20}$=a $C_1$ to $C_{20}$ alkyl where one or more of the hydrogen atoms may be independently replaced by halide, $R^{21}$ is aryl or a straight or branched $C_1$-$C_{20}$ alkyl group, and where an $(NR^{21})_2$ group is present, the two $R^{21}$ groups may be joined to form a 5- or 6-membered heterocyclic ring.

Preferably, the initiator has a detectable group or a group capable of binding a biological substance. The group is preferably capable of binding to a protein or polypeptide, or a fat, or lipid, carbohydrate or nucleic acid. In ATRP or transition metal mediated living radical polymerisation at least part of the initiator is incorporated into the final polymer. This allows groups to be incorporated into the polymer from the initiator.

Preferably, the initiator is selected from:

A-S—C(O)—R, A-S—C(S)—O—R, R—S—C(O)-A, R—S—C(S)—O-A, where R is $C_1$ to $C_{20}$ substituted or non-substituted, straight chain, branched chain, cyclic, heterocyclic or aromatic alkyl;

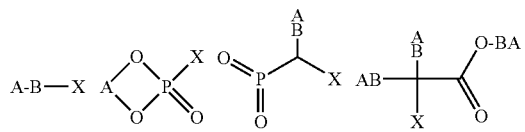

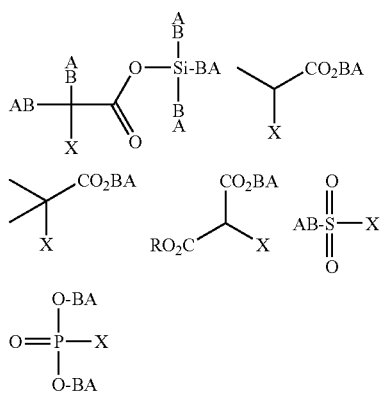

where: X=Cl, Br, I, $OR^{20}$, $SR^{21}$, $SeR^{21}$, $OP(=O)R^{21}$, $OP(=O)R^{21}$, $OP(=O)(OR^{21})_2$, $OP(=O)O^{21}$, $O-N(R^{21})_2$ and $S-C(=S)N(R^{21})_2$, where $R^{20}$=a $C_1$ to $C_{20}$ alkyl where one or more of the hydrogen atoms may be independently replaced by halide, $R^{21}$ is aryl or a straight or branched $C_1$-$C_{20}$ alkyl group, and where an $(NR^{21})_2$ group is present, the two $R^{21}$ groups may be joined to form a 5- or 6-membered heterocyclic ring.

A is a moiety which, when attached to the polymer is capable of binding to a biological molecule, such as a protein or polypeptide.

B is a linker and may or may not be present.

Most preferably, A is selected from succinimidyl succinate, N-hydroxy succimimide, succinimidyl propionate, succinimidyl butanoate, triazine, vinyl sulfone, propionaldehyde, acetaldehyde, tresylate, benzotriazole carbonate, maleimide, pyridyl sulfide, iodoacetamide and succinimidyl carbonate.

Preferably the linker, where present, is selected from a $C_1$ to $C_{20}$ substituted or non-substituted, straight chain, branched chain cyclic, heterocyclic or aromatic alkyl group; —$(CH_2Z)_aCH_2$—, —$CH_2ZCH_2$—, —$(CH_2CH_2Z)_n$—R, —$(CH_2CH(CH_3)Z)_n$—R, —$(CH_2)_b$—C(O)—NH—$(CH_2)_c$—, —$(CH_2)a$-NH—C(O)—$(CH_2)_y$—, —$N(R)_2$—; —S—; —N—R; or —O—R; where R=$C_1$ to $C_{20}$ substituted or non-substituted, straight chain, branched chain cyclic, heterocyclic or aromatic alkyl, Z is O or S, and n, a, b and c are independently selectable integers between 1 and 10.

Preferably, the moiety capable of reacting with a protein or polypeptide has the formula:

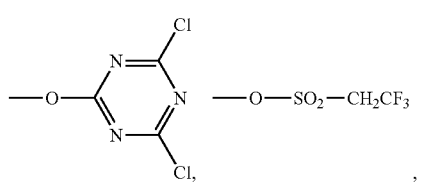

-continued
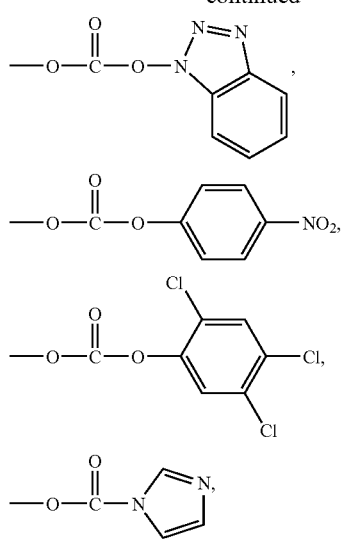
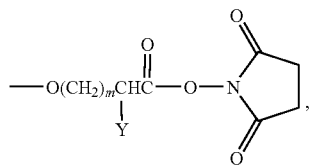
where n=integer of 0 to 10
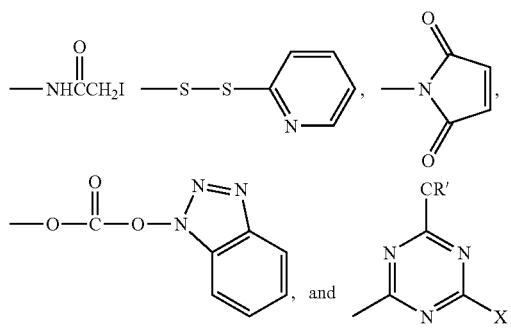
where m=integer of 0 to 10, Y is an aliphatic or aromatic moiety
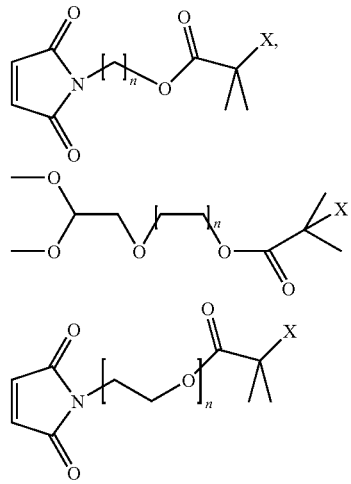
where R' is H, methyl, ethyl, propyl or butyl, X is a halide, especially Cl or Br.
Most preferably, the initiator (ii) has a formula:
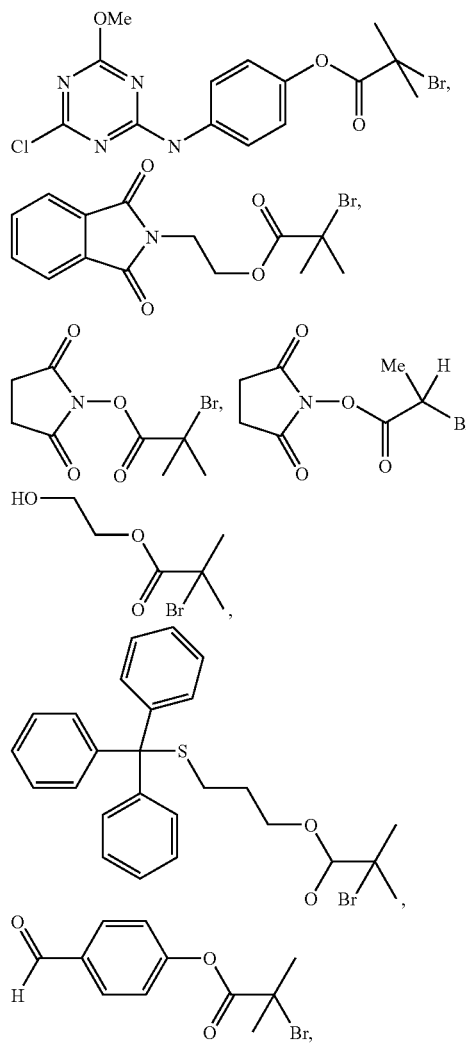
where n is an integer of 0 to 10, and X is a halide, especially Cl or Br.
The initiator has a compound selected from:

-continued

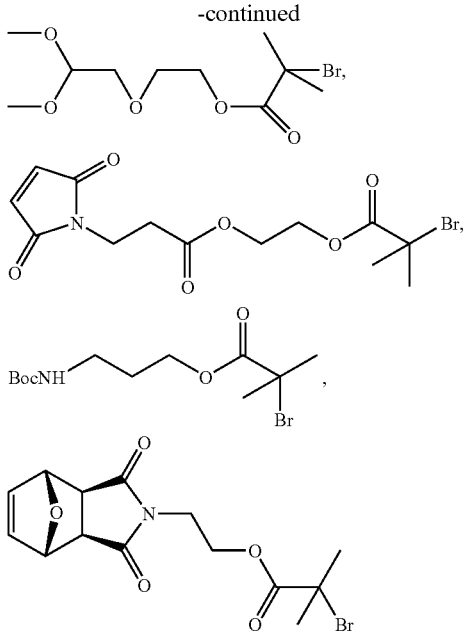

Such initiators and binding groups are described in detail in WO 2006/003352.

Initiator may comprise a detectable group such as a benzyl side group or a coumarin fluorescent group. Benzyl side groups are detectable via NMR.

Most preferably, the initiator is O-benzyl α-bromoester.

Preferably, the catalyst is selected from a ligand which is any N-, 0-, P- or S-containing compound which can coordinate in a δ-bond to a transition metal or any carbon-containing compound which can coordinate in a π-bond to the transition metal, such that direct bonds between the transition metal and growing polymer radicals are not formed.

Preferably, the catalyst comprises:

a first compound MY, where M is a transition metal which is capable of being oxidised by one formal oxidation state, especially $Cu^+$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{3+}$, $Mn^{4+}$, $Rh^{3+}$, $Rh^{4+}$, $Re^{2+}$, $Re^{3+}$, $Co^+$, $Co^{2+}$, $V^{2+}$, $V^{3+}$, $Zn^+$, $Zn^{2+}$, $Au^+$, $Au^{2+}$, $Ag^+$ and $Ag^{2+}$, and Y is a monovalent or a divalent counterion; and an organodiimine, wherein at least one of the nitrogens is not a part of an aromatic ring.

Most preferably the process comprises the use of a catalyst capable of catalysing the polymerisation reaction, the catalyst comprising a compound of formula:

$$[ML_m]^{n+}A^{n-}$$

where M=a transition metal capable of being oxidised by one formal oxidation state, especially $Cu^+$, $Cu^{2+}$, $Fe^{2+}$, $Fe^{3+}$, $Ru^{2+}$, $Ru^{3+}$, $Cr^{2+}$, $Cr^{3+}$, $Mo^{2+}$, $Mo^{3+}$, $W^{2+}$, $W^{3+}$, $Mn^{3+}$, $Mn_{4+}$, $Rh^{3+}$, $Rh^{4+}$, $Re^{2+}$, $Re^{3+}$, $Co^+$, $Co^{2+}$, $V^{2+}$, $V^{3+}$, $Zn^+$, $Zn^{2+}$, $Au^+$, $Au^{2+}$, $Ag^+$ and $Ag^{2+}$, A=an anion, n=an integer of 1 to 3, m=an integer of 1 to 2, L=an organodiimine, where at least one of the nitrogens is not a part of an aromatic ring.

Preferably the organodiimine has a formula selected from:
1,4-diaza-1,3-butadiene

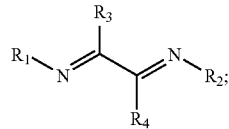
Formula 24 a 2-pyridinecarbaldehyde imine

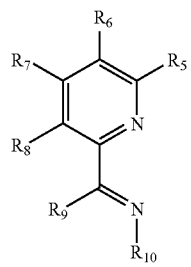
Formula 25

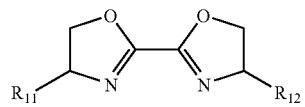
Formula 26 or a quinoline carbaldehyde

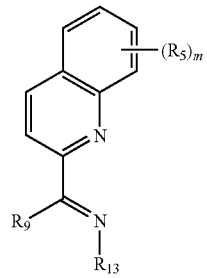
Formula 27 where $R_1$, $R_2$, $R_{10}$, $R_{11}$, $R_{12}$ and $R_{13}$ may be varied independently and $R_1$, $R_2$, $R_{10}$, $R_{11}$, $R_{12}$ and $R_{13}$ may be H, straight chain, branched chain or cyclic saturated alkyl, hydroxyalkyl, carboxyalkyl, aryl (such as phenyl or phenyl substituted where substitution is as described for $R_4$ to $R_9$), $CH_2Ar$ (where Ar=aryl or substituted aryl) or a halogen. Preferably $R_1$, $R_2$, $R_{10}$, $R_{11}$, $R_{12}$ and $R_{13}$ may be a $C_1$ to $C_{20}$ alkyl, hydroxyalkyl or carboxyalkyl, in particular $C_1$ to $C_4$ alkyl, especially methyl or ethyl, n-propylisopropyl, n-butyl, sec-butyl, tert butyl, cyclohexyl, 2-ethylhexyl, octyl, decyl or lauryl.

$R_1$, $R_2$, $R_{10}$, $R_{11}$, $R_{12}$ and $R_{13}$ may especially be methyl.

$R_3$ to $R_9$ may independently be selected from the group described for $R_1$, $R_2$, $R_{10}$, $R_{11}$, $R_{12}$ and $R_{13}$ or additionally $OCH_{2n+1}$ (where n is an integer from 1 to 20), $NO_2$, CN or O=CR (where R=alkyl, benzyl $PhCH_2$ or a substituted benzyl, preferably a $C_1$ to $C_{20}$ alkyl, especially a $C_1$ to $C_4$ alkyl) and where m is an integer from 0 to 4.

Preferably in the quinoline carbaldehyde, $R_9$ is H, and m=0.

Furthermore, the compounds may exhibit a chiral centre a to one of the nitrogen groups. This allows the possibility for polymers having different stereochemistry structures to be produced.

Compounds of general Formula 25 may comprise one or more fused rings on the pyridine group.

One or more adjacent $R_1$ and $R_3$, $R_3$ and $R_4$, $R_4$ and $R_2$, $R_{10}$ and $R_9$, $R_8$ and $R_9$, $R_8$ and $R_7$, $R_7$ and $R_6$, $R_6$ and $R_5$ groups may be $C_5$ to $C_8$ cycloalkyl, cycloalkenyl, polycycloalkyl, polycycloalkenyl or cyclicaryl, such as cyclohexyl, cyclohexenyl or norborneyl.

Preferred ligands include:

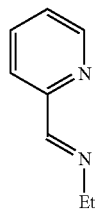
Et

Formula 28

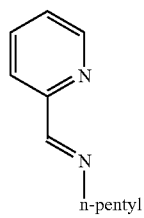
n-pentyl

Formula 29

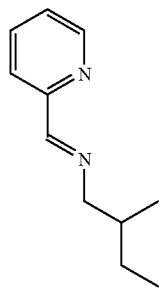

Formula 30

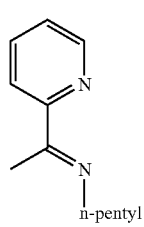
n-pentyl

Formula 31

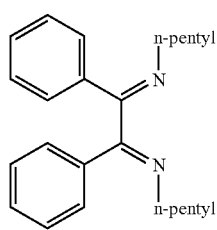
n-pentyl n-pentyl

Formula 32

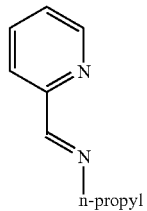
n-propyl

Formula 33

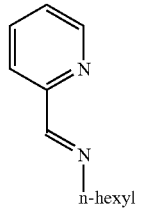
n-hexyl

Formula 34

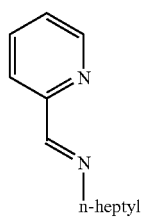
n-heptyl

Formula 35

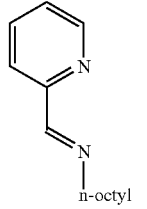
n-octyl

Formula 36

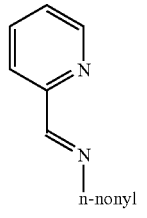
n-nonyl

Formula 37

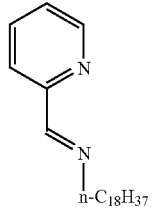
n-$C_{18}H_{37}$

Formula 38

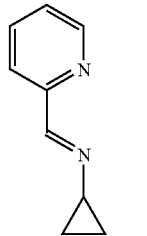

Formula 39

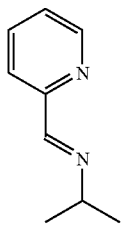
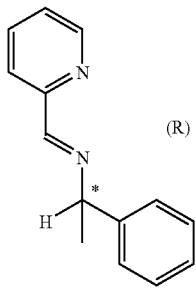
(R)
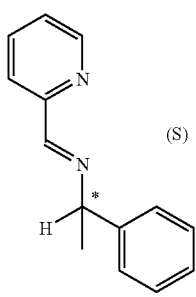
(S)
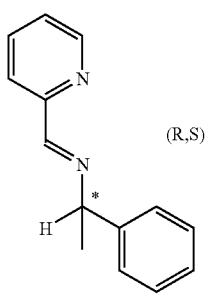
(R,S)
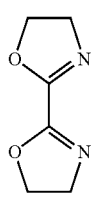
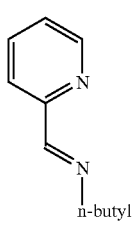
n-butyl
Formula 40
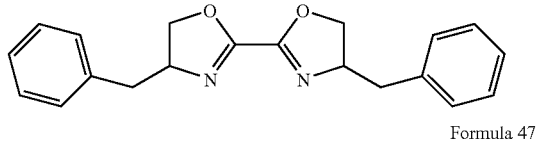
Formula 41
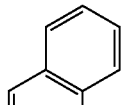
n-pentyl
Formula 42
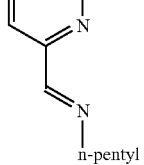
OH
Formula 43
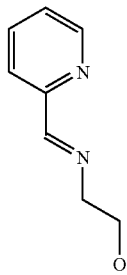
OH
Formula 44
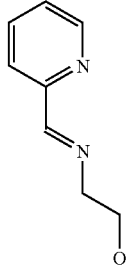
$R_{14}$   COOH   And
Formula 45
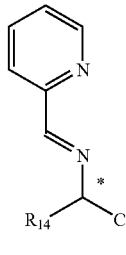
COOH
Formula 46
Formula 47
Formula 48
Formula 49
Formula 50
Formula 51
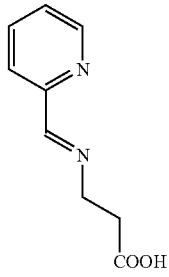
where: * indicates a chiral centre,
R14=Hydrogen, $C_1$ to $C_{10}$ branched chain alkyl, carboxy- or hydroxy-$C_1$ to $C_{10}$ alkyl.

Preferably the catalyst is

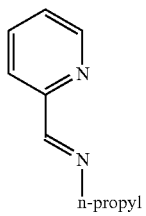

in combination with CuBr.

Most preferably, the organodiimine is selected from N-(n-propyl)-2-pyridylmethanimine (NMPI), N(n-ethyl)-2-pyridylmethanimine, or N-ethyl-2-pyridylmethanimine.

The catalyst may also comprise a bipyridine group. Most preferably the catalyst is 4,4-di(5-nonyl)-2,2'-bipyridyl(dN-bpy).

Preferably, the pendant group is as defined above and preferably comprises a moiety selected from a sugar and is selected from glucose, glucosamine, gatactose, galactosamine, lactose, mannose, fucose and derivatives thereof, for example, sialic acid. The sugar is preferably N-acetylated. Preferred examples of such sugars include N-acetyl galactosamine, sialic acid, neuraminic acid, N-acetyl galactose, and N-acetyl glucosamine. Such N-acetylated sugars are often present on cell surfaces and involved in surface recognition in organisms. For example, they are recognised by receptors on proteins, hormones, viruses, microorganisms, parasites or other cells within an organism.

Sugars are also present in lipopolysaccharides (LPS). LPS comprises a lipid attached to a polysaccharide. LPS is a component of, for example, the cell membrane gram negative bacteria. It is an endotoxin that often stimulates an immune response in animals, such as mammals.

The reactions may be carried out in any suitable solvent, depending on the reactants. These include protic and non-protic solvents and aprotic solvents. For example water, DMSO, DMF, alcohol, and mixtures of alcohol and water.

Optimal reaction conditions, such as temperature and concentrations may be readily determined by the skilled person.

The invention also provides polymers having pendant side groups obtainable by the methods of the invention.

Preferably, the polymers have a polydispersity index (Mw/Mn) of less than 1.5, 1.4 or 1.3, most preferably less than 1.25, less than 1.2, especially less than 1.15.

Preferably, the polymer has a molecular weight of between 5000 Da-100,000 Da.

A further aspect of the invention provides a polymer having pendant side groups comprising a plurality of pendant groups having a polydispersity of less than 1.5, 1.4, 1.3, most preferably less than 1.25, less than 1.2, especially less than 1.15. Preferably the weight of the polymer is between 5000 Da and 100,000 Da.

The polymers produced by the process of the invention may be used for further reactions. For example, where the pendant groups are sugars, the sugars may be derivatised by, for example, reacting with a chiral compound, such as isocyanate. This produces compounds useful in chiral chromatography.

The polymers of the invention preferably have pendant side groups as defined above and the moieties may be selected from one or more sugars, alkyl groups, polyalkylene glycol groups or phospholipid groups, as defined above.

Most preferably, the pendant side groups are sugar side groups.

Two or more different pendant side groups may be provided on the polymer. Preferably, these are sugar side groups. However, other functional side groups, such as those described above for the first aspect of the invention, may be used.

Preferably, a detectable side group or end group is provided. Most preferably, the detectable group is a benzyl group or coumarin group.

Polymers of the invention may additionally comprise a group which is capable of binding a biological molecule selected from a protein or polypeptide, nucleic acid, carbohydrate or fat, as described above.

Preferably, the polymer comprises a group selected from:

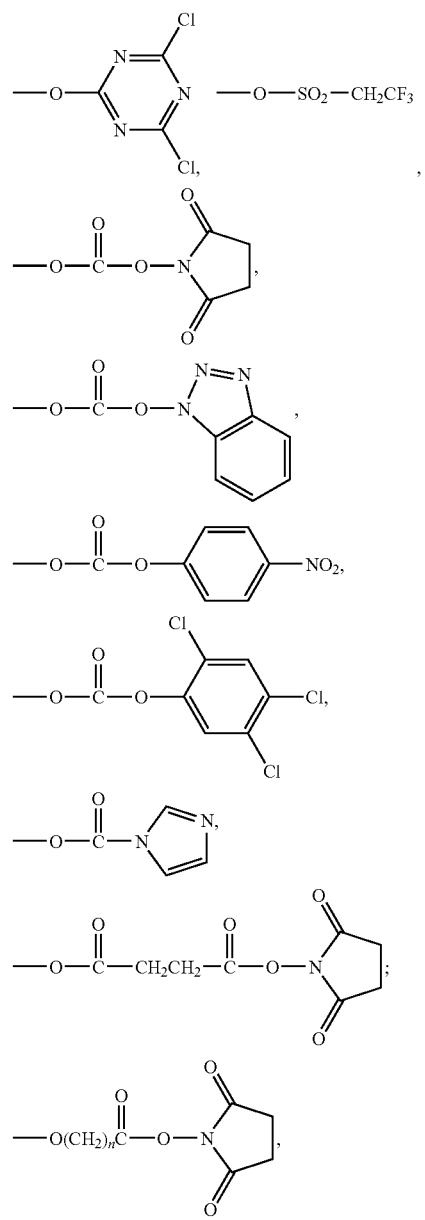

where n=integer of 0 to 10

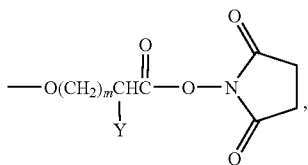

where m=integer of 0 to 10, Y is an aliphatic or aromatic moiety

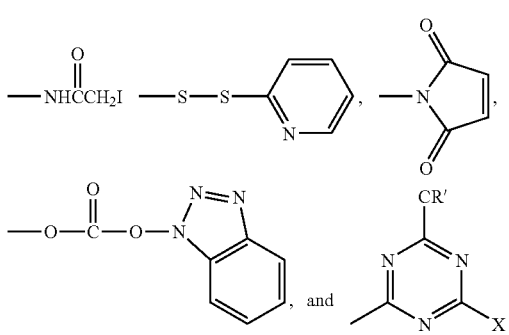

where R' is H, methyl, ethyl, propyl or butyl, X is a halide, especially Cl or Br.

Preferably, the glycopolymer comprises attached thereto an atom or group obtained from an initiator and, separate thereto on the polymer, the rest of the initiator compound.

The group capable of binding a biological molecule and/or the initiators may be as defined above for the first aspect of the invention.

With transition metal mediated living radical polymerisation/ATRP the initiator separates. When part of the initiator eventually binds to one end of the polymer chain, the other, transferable part (atom or group) of the initiator attaches to another part of the polypeptide chain. For example, as shown in the results and discussion section, utilising an O-benzyl α-bromoester (2), the bromine atom eventually ends up on one end of the polymer chain, the remaining part of the initiator moiety appearing on the other end of the polymer chain. The initiators are preferably as discussed above for the first aspect of the invention.

The ability to produce compounds with side groups such as sugars or LPS allows the interaction of proteins, viruses, parasites, cells, etc. to be studied. It also allows molecules which target cell receptors or other components to be produced.

Hence, the molecules of the invention, for example comprising sugars or LPS, may be additionally attached to a further functional group. The functional group may be a drug such as a toxin and/or antibiotic (for example as described above). The further functional group may be attached, for example, by click chemistry. Alternatively, the functional group may be provided as part of the initiator used to initiate the polymerisation reaction. WO 2006/003352 discloses the use of functionalised initiators to produce polymers having pendant polyethylene glycol groups attached and additionally having a biological binding moiety, such as maleimide, succinimide or N-hydroxysuccinimide attached.

The further functional group may be attached to an olefinically unsaturated momover and incorporated, for example, as a co-monomer such as a gradient, block or statistical copolymer. For example, a block of polymer made by the method of the invention with sugars attached may be produced attached to a second block with the further functional groups attached.

The molecules of the invention preferably comprise a moiety which, when attached to the polymer, is capable of binding to a biological substance. Preferably, the moiety is maleimide, succinimide or N-hydroxysuccinimide. Preferably, the process of the invention uses an initiator comprising the moiety. Such initiators are generally shown in WO 2006/003352. Molecules made by the process of the invention comprising sugars or PEG side groups may be attached, for example, by such moieties to pharmaceutically active compounds such as drugs. As described in WO 2006/003352, PEG is known to improve the circulatory half lives of such compounds and reduce the antigenicity and immunogenicity. Using sugars attached to the polymer, instead of PEG is also believed to have this effect.

The sugars or LPS, for example, may target the molecule to a receptor on, for example, a cell, so that the drug is targetted to the receptor.

Hence, the invention also provides molecules of the invention attached to a pharmaceutical active agent, such as a protein or polypeptide. Preferably the molecule comprises one or more sugars and/or PEG groups as the pendant side group. Preferably the molecule is attached via a moiety capable of binding a biological moiety, such as those described above.

A further aspect of the invention provides a library of different polymers comprising a plurality of polymers according to the invention, each of the polymers differing by different pendant groups, different amounts of pendant side groups and/or different ratios of different pendant side groups. Providing a library of different compounds allows, for example, the effect of different ratios of sugars on lectin binding to be assertained.

Assay kits for sugar-lectin binding or cell surface binding assays comprising polymers according to the invention, or libraries according to the invention, are also provided. Preferably, the assay kits comprise polymers having one or more pendant sugar side groups. A further aspect of the invention provides a method of assaying a lectin or cell surface for binding of a lectin or cell surface to a polymer comprising detecting the binding of a lectin or cell surface to a polymer or a library of polymers according to the invention. Preferably, the polymer comprises one or more pendant sugar groups.

Methods of assaying lectin binding or cell surface binding to compounds are well-known in the art. For example, the binding of polymers of the invention to lectins such as concanavalin A (con A) is able to be determined because the polymer causes the lectin to precipitate. This is discussed in more detail in the materials and methods section. Moreover, other techniques, such as tubidimetry, may also be used.

Polymer intermediates for use in the process according to the invention are also provided. Such polymers preferably comprise a plurality of optionally protected azide side groups or protected alkyne side groups, and preferably have a polydispersity index of less than 1.5, 1.4, or 1.3, more preferably less than 1.25, less than 1.2, especially less than 1.5.

Preferably, the intermediate polymer comprises a detectable side group or end group. It may additionally comprise a group which is capable of binding a biological molecule and/or an atom or group obtained from an initiator and, separate thereto on the polymer intermediate, the rest of the initiator compound. The detectable side group or end groups, moieties capable of binding to a biological molecule, and the initiator compound, are preferably as defined above for the earlier aspects of the invention.

Preferably, the polymer of the invention or the polymer intermediate of the invention is a statistical copolymer, a block copolymer, a gradient, a telechelic polymer, a comb polymer, or a graft copolymer.

The polymer or polymer intermediate may be a branched, linear, comb, dendrimer, branched or graft polymer.

The polymer may itself form a solid support, or it may be attached to a solid support by techniques generally known in the art. The initiator may itself be attached to the support before polymerisation. However, the inventors have realised that the principle of adding a pendant group by click chemistry may be applied to any solid support.

Hence, a further aspect of the invention provides:

A process of making a support comprising pendant side groups, comprising providing an organic or inorganic support functionalized with (a) an azide group optionally protected by a protecting group, or (b) an alkyne group optionally protected by a protecting group,
(ii) removing, when present, at least a portion of the total number of protecting groups from the functionalized support;
(iii) reacting the functionalised support with at least one pendant side group moiety functionalised with (a) an alkyne group or (b) an azide group respectively so that the alkyne and azide groups react to attach the pendant side group to the support.

Solid supports may be provided in the form of beads or with larger surface areas such as sheets of material. The supports may be inorganic, such as silica, or organic, such as a cross-linked organic material, such as poly(styrene-w-divinylbenzene), or cellulosic material, such as filter paper. Wang resins are especially preferred. Solid supports are discussed in more detail in WO2001/094424, incorporated herein by reference.

Preferably the solid support is functionalised with an alkyne group.

The solid support may originally comprise, for example, a hydroxyl group or an amine group. The group may then be converted to an alkyne group for using in the click chemistry. For example, hydroxyl group containing supports, such as Wang resins may be reacted with anhydrous pyridine and dimethylaminopyridine and thereafter with an alkyne ester to produce the alkyne functionalised support. The alkyne ester preferably is a C3-C10 alkyne ester.

The pendant side groups, alkyne groups, azide groups, uses and protecting groups may be as defined above. Optional functional groups or detectable groups may also be provided, as discussed above.

The inventors have also realised that if the pendant group is an enantiomer, then the polymers, libraries and solid supports of the invention may be used in chiral chromatography. Chiral chromomatography is a variant of column chromatography generally known in the art, where the stationary phase is chiral instead of achiral. The enantiomers of the same compound then differ in affinity to the stationary phase, thus they exit the column at different times. Enantiomeric separations are achieved in chiral chromatography by the judicious use of chiral phases. The mobile phase can be a gas or liquid giving rise to chiral gas chromatography and chiral liquid chromatography. Chiral selectivity is usually achieved by employing chiral stationary phases.

Enantiomeric compounds exist as nonsuperimposable mirror images of each other. Mixtures of enantiomers are known as racemic mixtures. A wide variety of enantiomeric compounds exist, including many drugs, sugars (such as D-mannose or D- or L-glucose) and amino acids. They usually have different activity under polarised light. An enantiomer that rotates the plane of light in a clockwise sense as a viewer faces the light is called dextrorotatory ("+" or "D"). One which rotates the light in an anticlockwise direction is called levorotatory ("−" or "L"). Different enantiomers often have different activity or the different ability to interact with different compounds or receptors.

Hence, preferably, the pendant side groups used in the process of the invention, or attached to a polymer, library or solid support of the invention, is an enantiomer of a compound, or a racemic mixture of a compound. The racemic mixture may be a preselected racemic mixture of predetermined rations of different enanatiomers. For example the ration of +:− enantiomers may be 90:10, 80:20, 70:30, 60:40, 50:50, 40:60, 30:70, 20:80, or 10:90.

The process of the invention therefore also provides the step of preparing a chromatographic column with the polymer.

The techniques of the invention particularly lend themselves to the production of such polymers, libraries or supports.

Preferably the enantiomeric compound is a sugar. The enantiomeric sugar may be a monomer (monosaccharide), such as fructose or glucose, or more complex sugars made of two or more sugars joined together to form disaccharides or polysaccharides. Different sugars may be formed together to form such di- and polysaccharides. Disaccharides include sugars such as sucrose, which is made of glucose and fructose. Polysaccharides include starch and celluloses. The term sugar includes both substituted and non-substituted sugars, and derivatives of sugars. Preferably, the sugar is selected from glucose, glucosamine, galactose, galactosamine, mannose, fucose and derivatives thereof, such as sialic acid, a derivative of glucosamine. The sugar is preferably α or β. The sugar may especially be a manno- or galactose pyranoside. The sugars may also be one or more nucleosides, such as 3-azido-3-deoxythymidine (commercially available from Aldrich Ltd, United Kingdom), or one or more nucleotides.

The pendant side groups may be further reacted to form other useful compounds. For example, where the pendant groups are sugars, the polymer comprising the sugars may be reacted with a chiral compound, such as an isocyanate. This reacts with hydroxyl groups on the sugars. The product may then be used in chiral chromatography, as discussed above.

Chromatography columns comprising a polymer, a library, or a solid support according to the invention are provided. Chromatography columns in general are well known in the art. Such columns may be, for example, HPLC columns. They are preferably for use in affinity or chiral chromatography.

A method of performing affinity chromatography or chiral chromatography comprising the use of polymer, a library or a solid support or a chromatography column of the invention is also provided.

The invention will now be described by way of example, with reference to the following figures.

Figure 5:
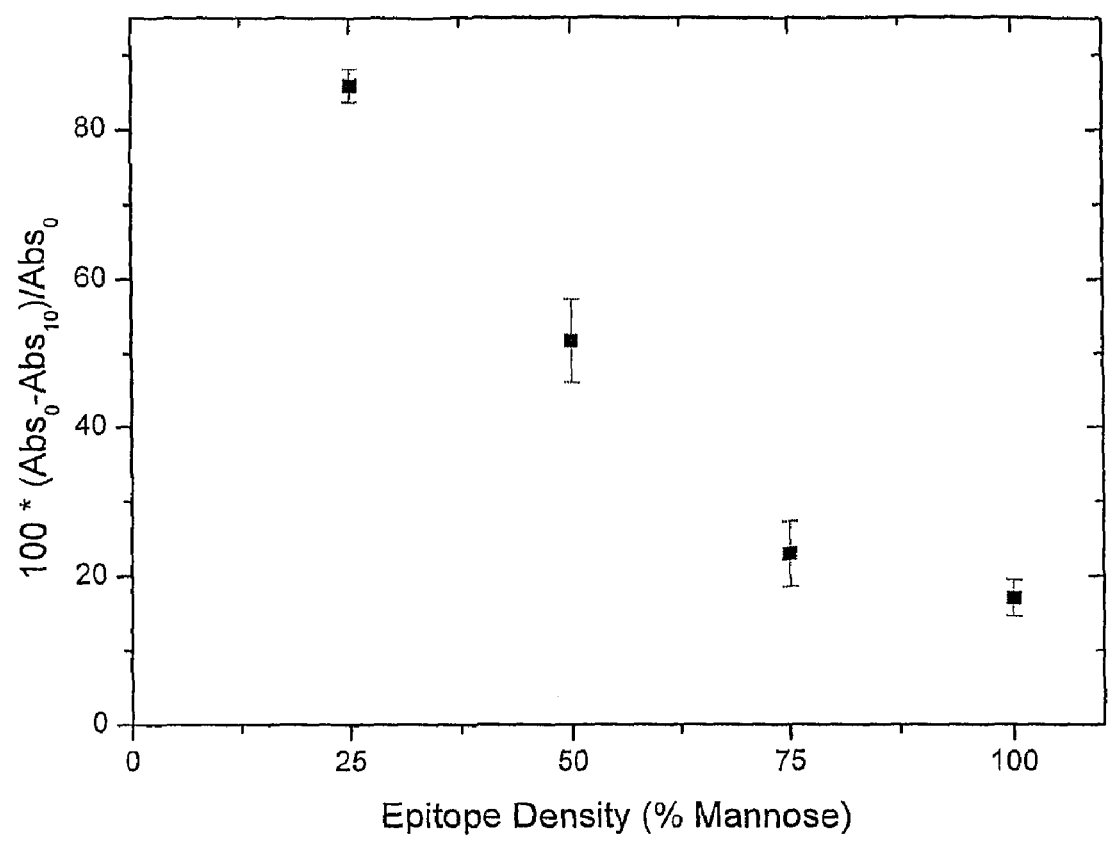

FIG. 5 shows reversal aggregation assay results. Clusters formed during the turbidimetry experiments were treated with 1 M α-methyl mannopyranoside and the absorbance was recorded at t=0 and t=10 min. The change (%) in the absorbance was then plotted against the epitope density (%), confirming that the stability of the conjugates towards disruption caused by a competitive monovalent ligand such as α-methyl mannopyranoside strongly depend on the epitope density of the polymer employed for the clustering. The data shown area average values calculated from 3 independent experiments.

Figure 6A:
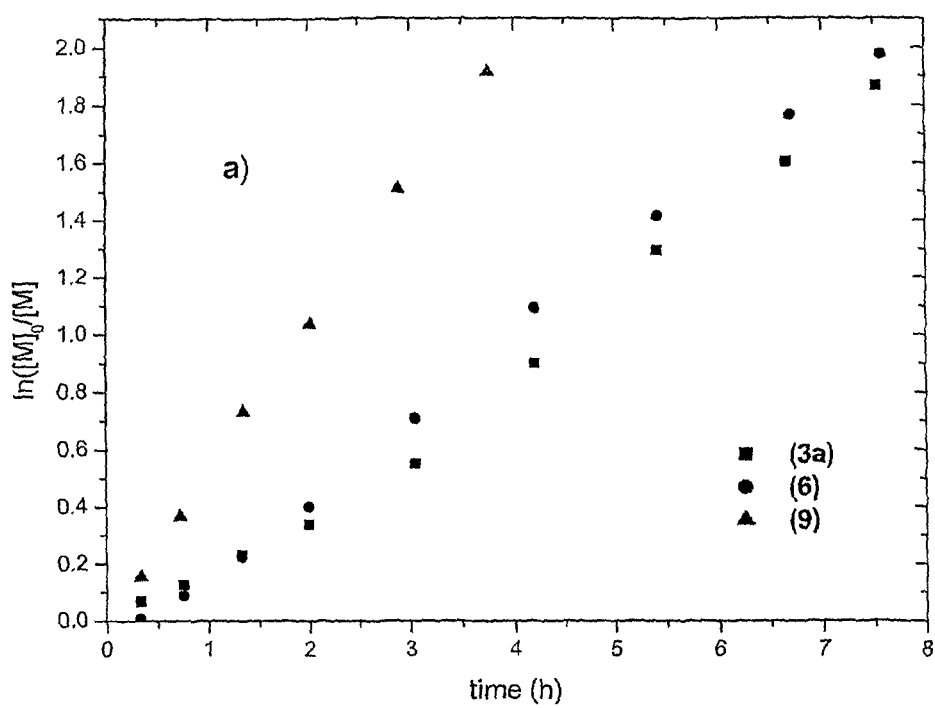
Figure 6B:
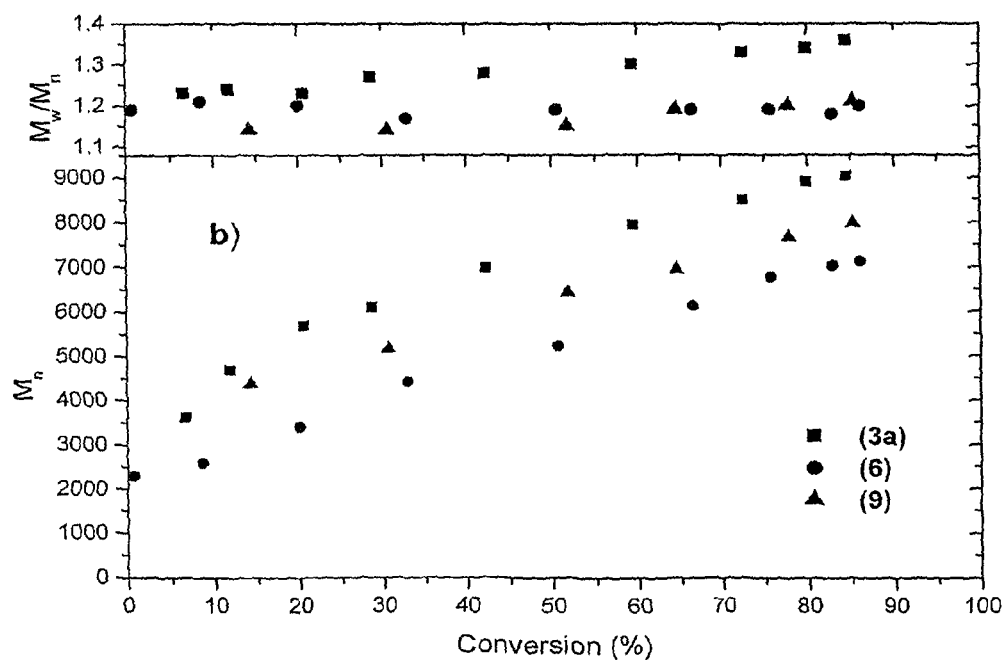

FIG. 6 shows homo and co-polymerization of (1) using (2) as initiator with MMA or mPEG$_{300}$MA as comonomers in toluene solution at 70° C. Reaction conditions: (3a): [(1)]$_0$: [(2)]$_0$:[CuBr]:[ligand]=40:1:1:2. (6): [(1)]$_0$:[MMA]$_0$: [(2)]$_0$: [CuBr]:[ligand]=20:50:1:1:2. (9): [(1)]:[mPEG$_{300}$MA]: [(2)]:[CuBr]:[ligand]=5:25:1:1:2. a) First order kinetic plots. b) Dependence of M$_n$ and M$_w$/M$_n$ on the monomer conversion.

Figure 7:
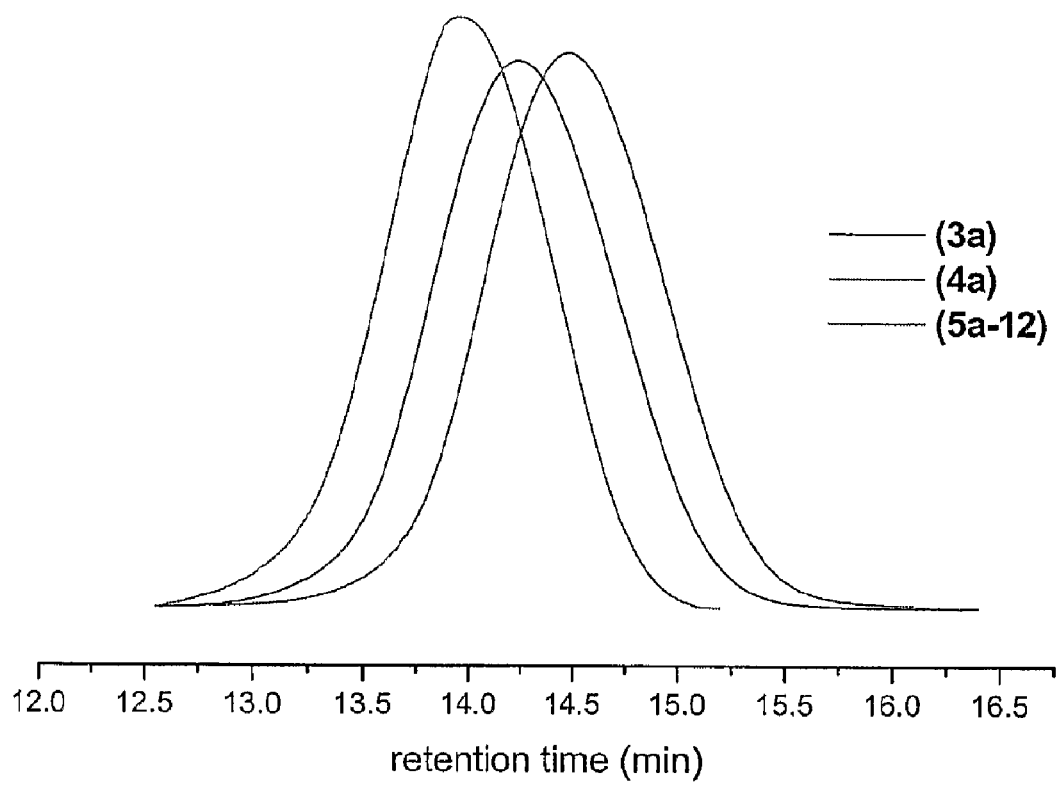

FIG. 7 shows SEC analysis of the protected polymer (3a), after removal of the trimethylsilyl group (4a), and after reaction with the glucose azide derivative (12).

Figure 8:
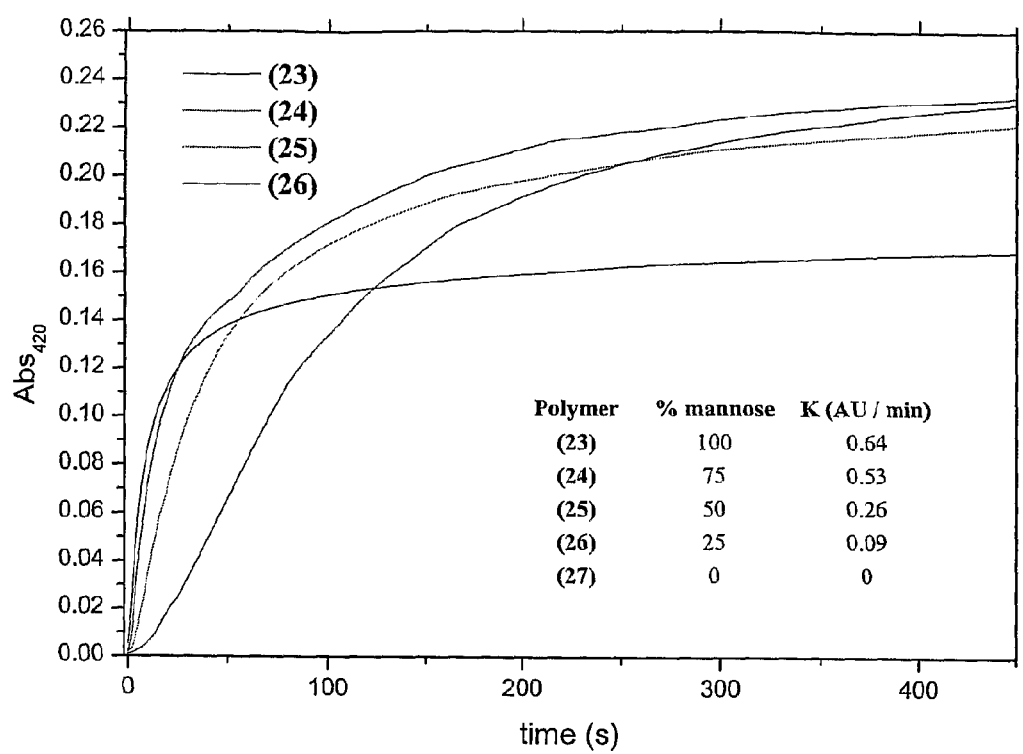

FIG. 8 shows turbidimetric assay results.

Figure 9:
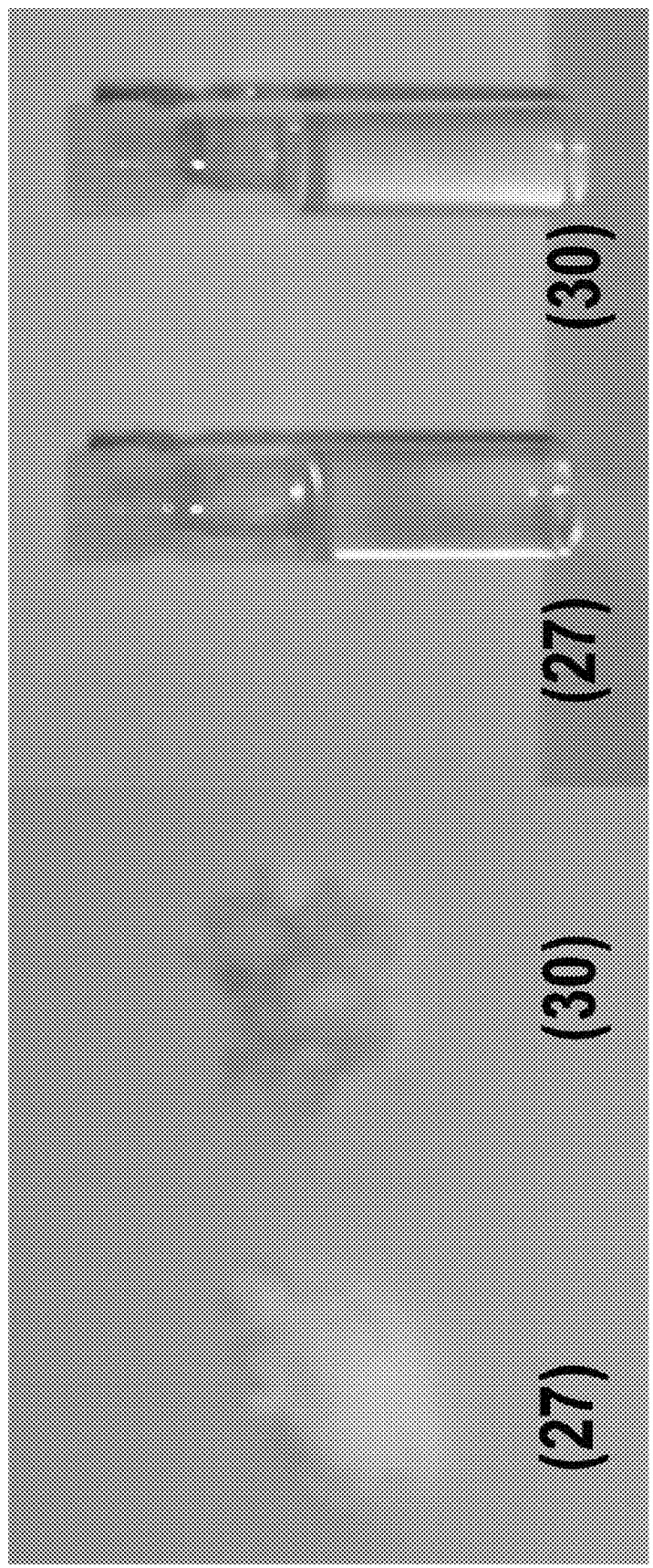

FIG. 9 shows galactose-containing multivalent displays: non fluorescent (27) and fluorescent (30) polymers (0.5 mg mL$^{-1}$ solutions in DMSO).

Figure 10:
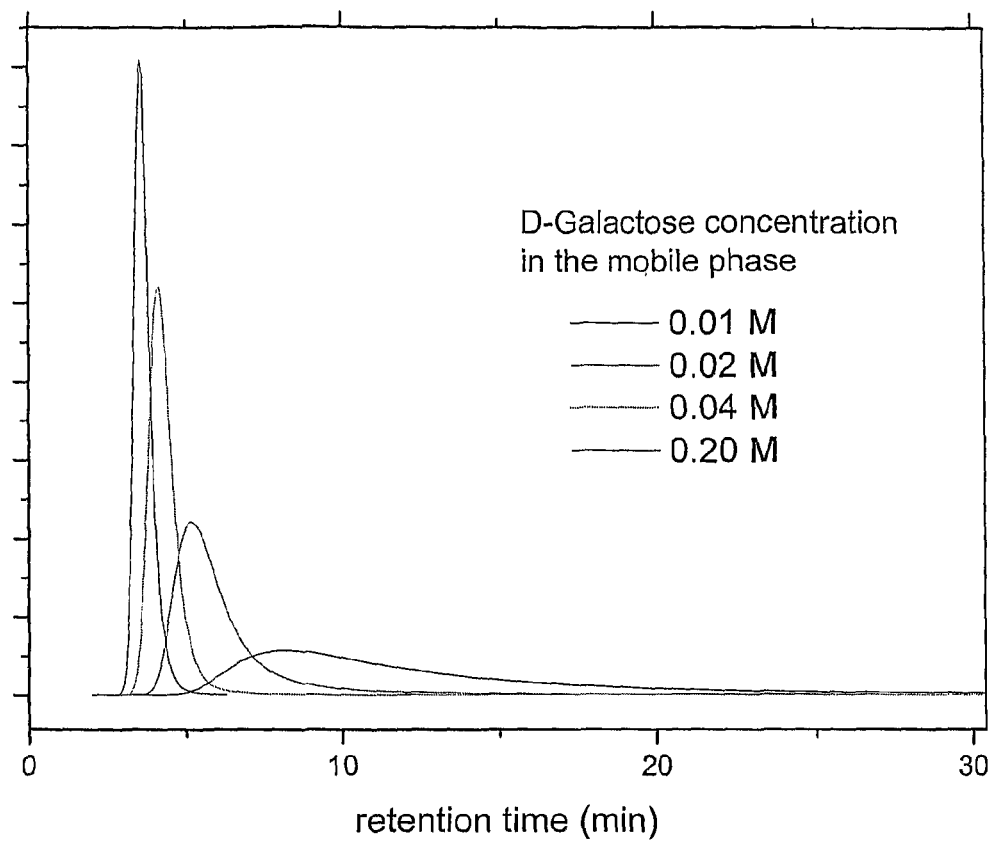

FIG. 10 shows affinity HPLC analysis of the ligand (30) using an immobilized RCA I lectin packed column. Conditions: 66.7 M PBS (pH 7.4), 150 mM NaCl, ambient temperature. Different concentrations of D-galactose in the mobile phase were employed in each run. For comparative purposes the areas of all of the chromatograms have been normalized with respect to concentration.

Figure 11:
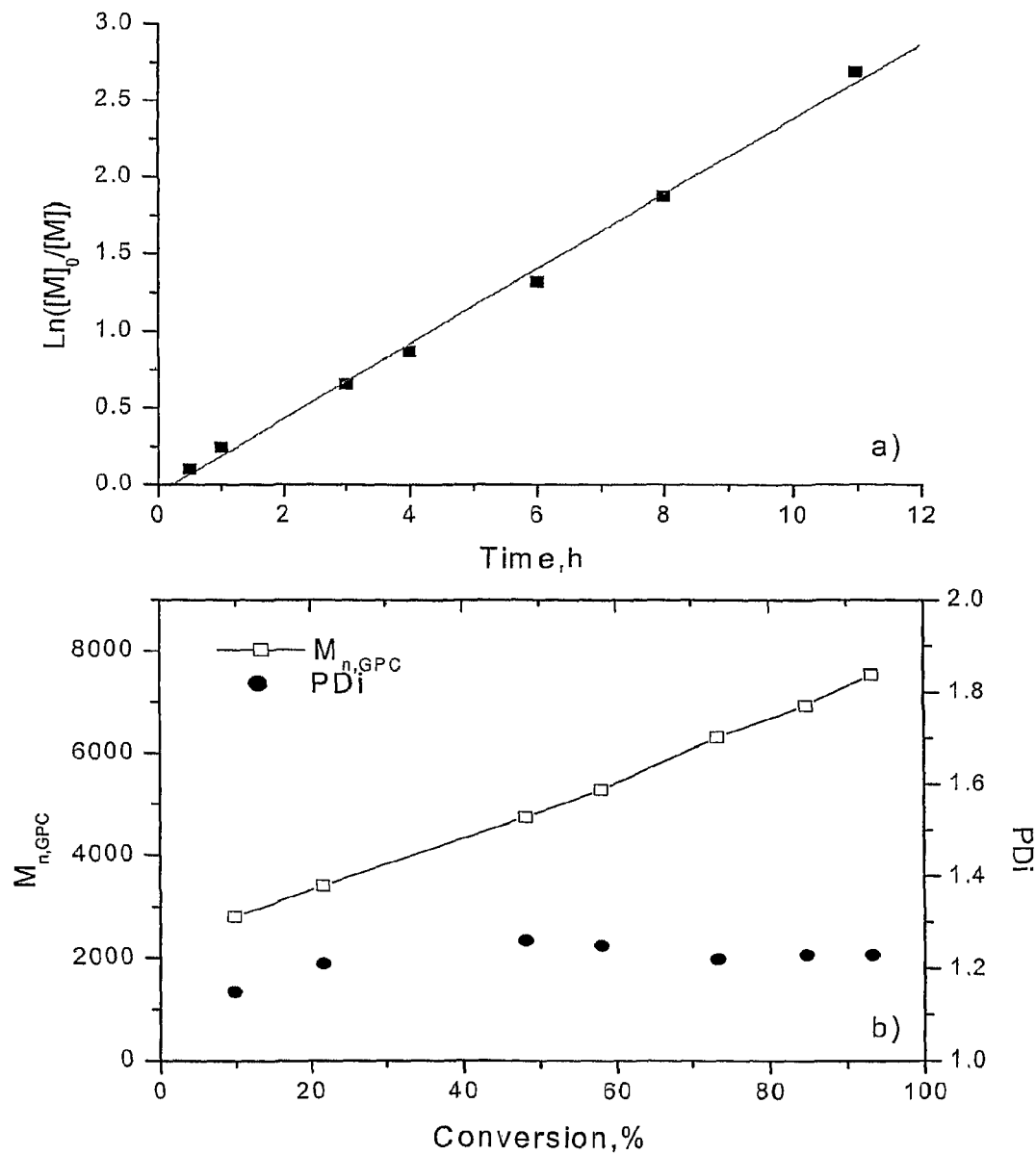

FIG. 11 a) Semilogarithmic kinetic curves and b) M$_n$, M$_w$/M$_n$ vs. conversion curves for the TMM-LRP of methyl methacrylate and hostasol monomer. Reaction conditions: [MMA]$_0$/[hostasol]$_0$/[I]$_0$/[CuBr]$_0$/[L]$_0$=40:0.2:1:1:2, 90° C.

Figure 12:
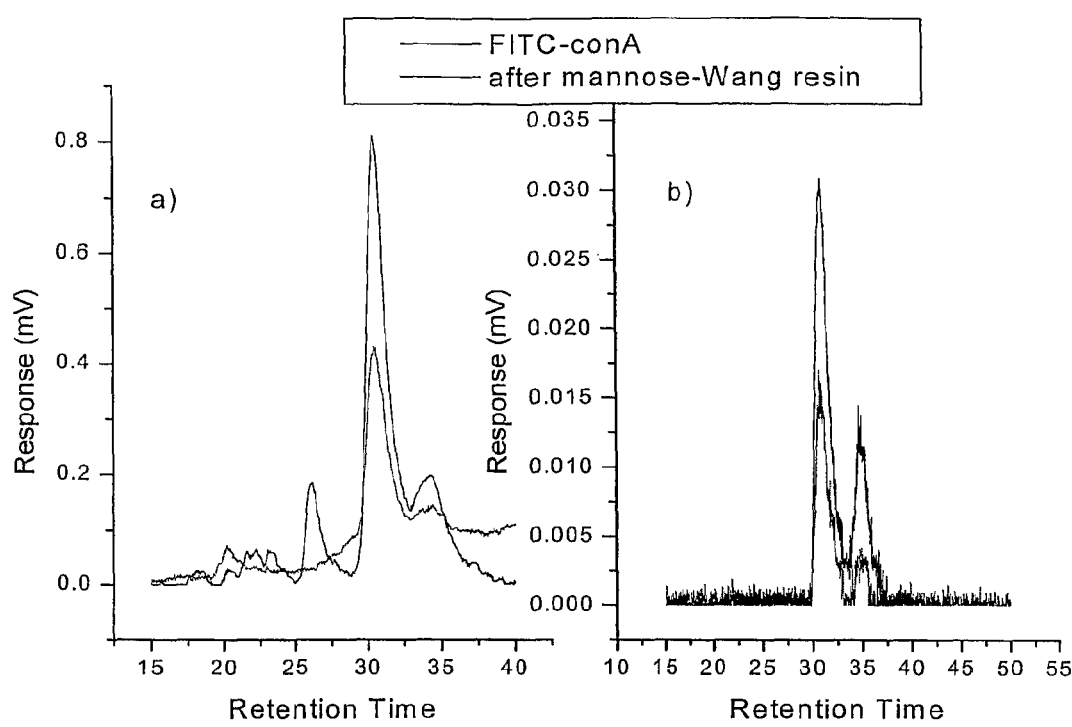

FIG. 12. a) HPLC-UV and b) HPLC-FL spectra of the FITC-Con A solution before and after mannose-modified Wang resin.

Figure 13:
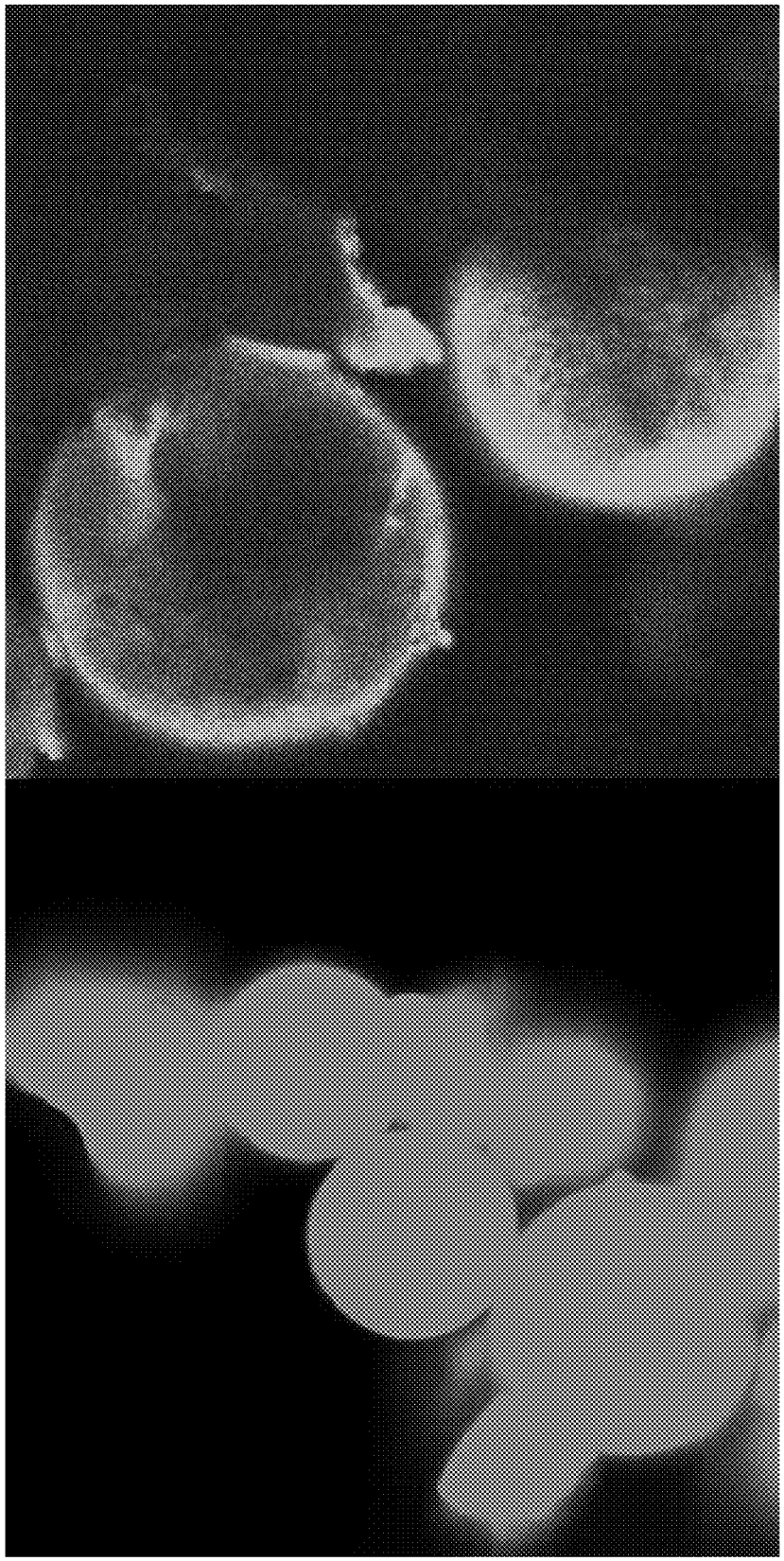

FIG. 13 Confocal images of modified Wang resin. a) Poly (MMA-co-hostasol) Wang resin and b) D-mannose-modified resin binding FITC-Con A.

Figure 14:
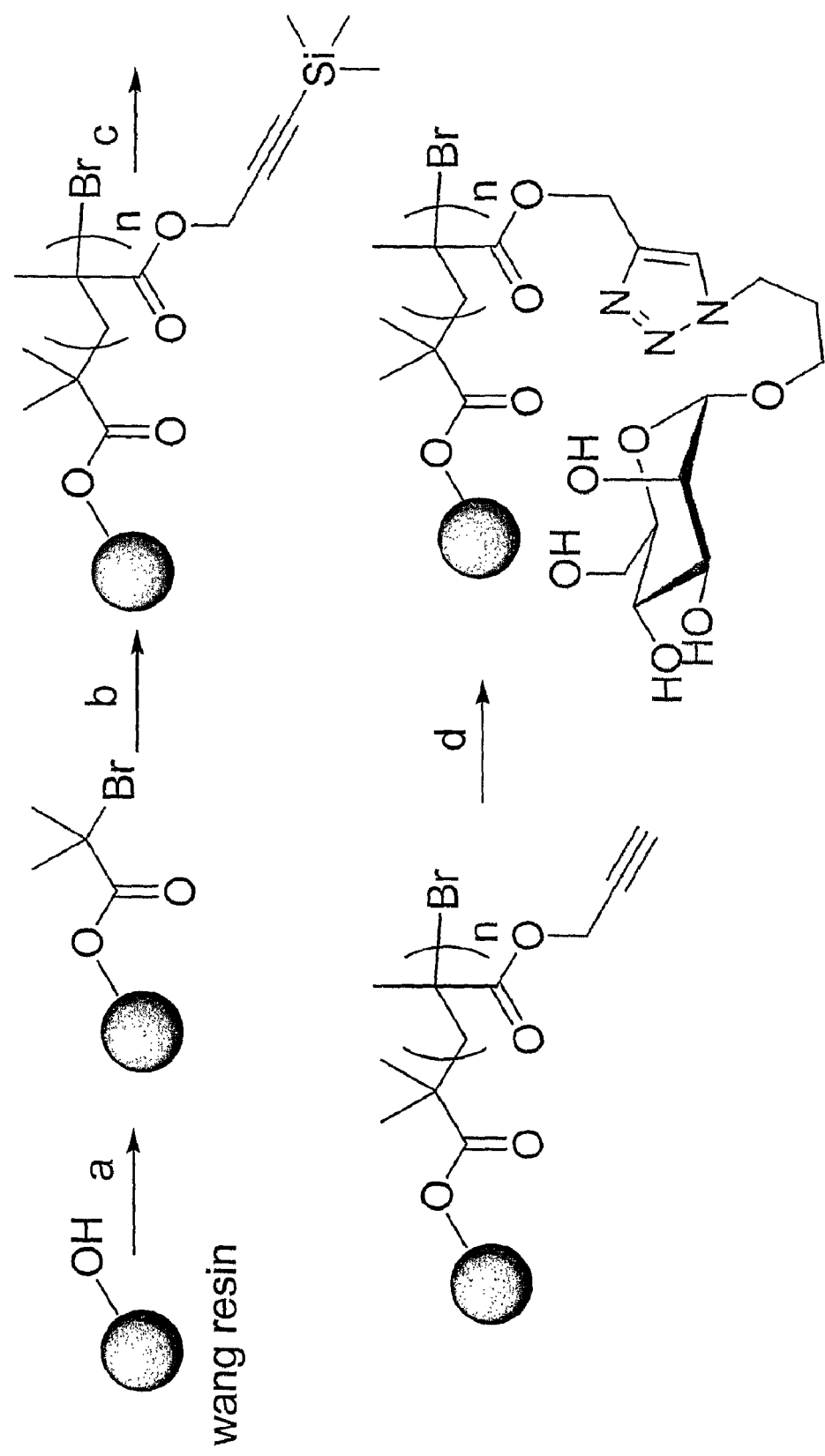

FIG. 14 Alternative method of producing a modified Wang Resin using a supported initiator. Reagent and conditions: a) 2-bromo-2-methyl-propionyl bromide, triethylamine, DMAP, CH$_2$Cl$_2$, b) methacrylic acid 3-trimethylsilanyl-prop-2-ynyl ester, Cu(1)Bl N-(n-propyl)-2 pyridylmethanimine, toluene, 60° C., c) TBAF.3H$_2$O, acetic acid, THF, −20 to 25° C., d) (PPh$_3$)$_3$Cu(1)Br, α-(3-azido-1-propyl)-D-mannose, DIPEA, 60° C.

Figure 15:
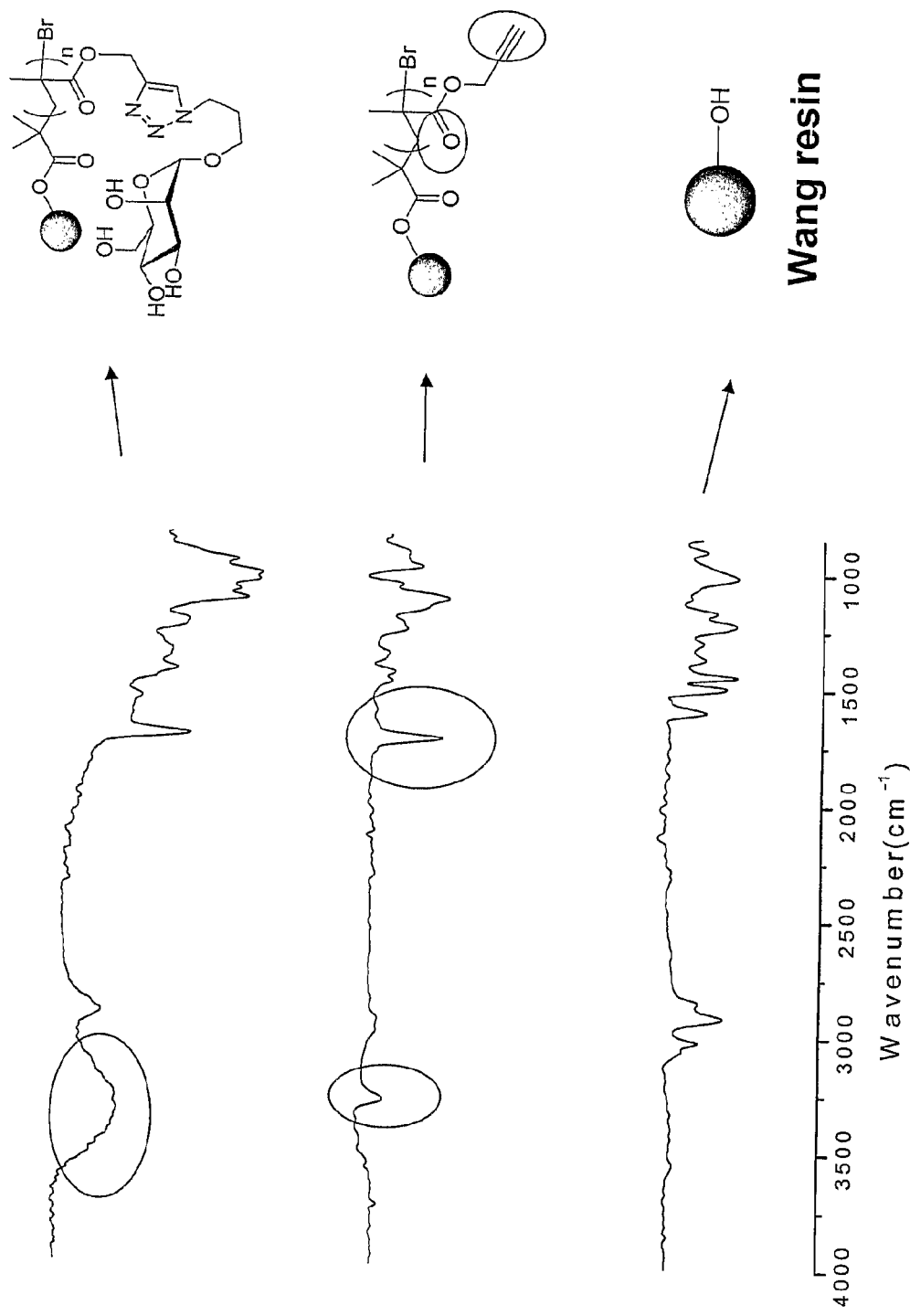

FIG. 15 IR Spectra of modified Wang Resin.

Figure 16:
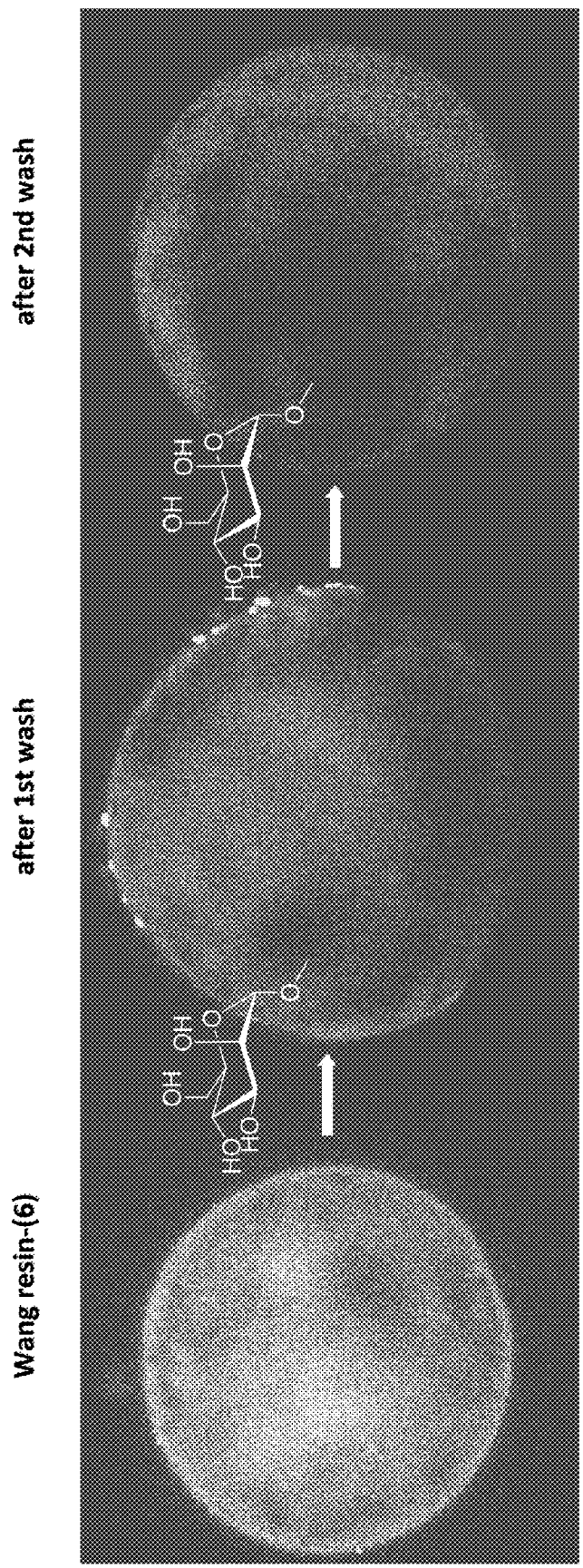

FIG. 16 Addition of competitive monodentate ligand to modified Wang Resin. Reagent and conditions: washing mixture: 4 mg/ml alpha-methyl-D-mannopyranoside, 0.3 ml each time.

MATERIALS

Copper(I) bromide (Aldrich, 98%) was purified according to the method of Keller and Wycoff (Keller R N, Wycoff H D (1946) 1-4). 2-Bromo-2-methyl-propionic acid benzyl ester initiator (2) (Hovestad N J, et al., Macromolecules (2000), 33 (11): 4048-4052), methyl-[6-azido-6-deoxy-α-D-glucopyranoside (8) (Wu X, et al., Bioorg. Med. Chem. (2002), 10 (7): 2303-2307), [(PPh$_3$)$_3$CuBr] (Gujadhur R, et al., Tetrahedron Lett. (2001), 42 (29): 4791-4793), 3-azido-1-propanol (Mantovani G, et al., Chem. Commun. (2005), (16): 2089-2091), peracetylated mannose (Mukhopadhyay B, et al., J. Org. Chem. (2004), 69 (22): 7758-7760) and N-(ethyl)-2-pyridyl-methanimine (Haddleton D M, et al., Macromolecules (1997), 30 (7): 2190-2193) were prepared as described earlier and stored at 0° C. Triethylamine (Fischer, 99%) was stored over sodium hydroxide pellets. Anhydrous THF (Romil "Hi-Dry", 99.99%) was stored over activated 4 Å molecular sieves under dry nitrogen. Tetra n-butylammonium fluoride (TBAF) in methanol (0.20 M) from Aldrich was used as received. All other reagents, including 2,3,4,6-tetra-O-acetyl-β-D-glucopyranosyl azide (12), and solvents were obtained at the highest purity available from Aldrich Chemical Company and used without further purification unless stated.

Analysis

All reactions were carried out using standard Schlenk techniques under an inert atmosphere of oxygen-free nitrogen, unless otherwise stated. R$_f$ values refer to analytical TLC performed using pre-coated silica gel 60 F254 and developed in the solvent system indicated. TLC plates were initially rinsed in the chamber solvent prior to sample application. Compounds were visualized by use of UV light (254 nm) or a basic solution (10% w/w K$_2$CO$_3$ in water) of KMnO$_4$. Merck 60 (230-400 mesh) silica gel was used for column chromatography. Molar mass distributions were measured using size exclusion chromatography (SEC), on a system equipped with two PL gel 5 μm mixed D-columns (300×7.5 mm) and one PL gel 5 mm guard column (50×7.5 mm) (Polymer Laboratories, suitable for molecular weights between 200 and 400,000 g mol$^{-1}$) with differential refractive index detection using THF/triethylamine 95:5 (vol/vol) at 1.0 mL min$^{-1}$ as the eluent. Poly(MMA) standards (1·10$^6$-200 g mol$^{-1}$) were used to calibrate the SEC. Analyte samples contained (0.2% vol) toluene as the flow marker. The M$_n$ reported in the M$_n$ vs Conversion (%) plots are obtained from SEC data calibrated with PMMA standards and are uncorrected. Those plots are reported in order to show the evolution of M$_n$ with the conversion. Absolute weight-average molecular weights (M$_w$) were determined by gel permeation chromatography equipped with a low-angle laser light scattering detector (LA-LLS; 5°, 2-mW HeNe laser, Polymer Laboratories) and a concentration detector (DRI) linked in series (PL-LALS) with a guard column and two mixed C columns (200 and 2,000,000 g mol$^{-1}$) using N,N-dimethylformamide (DMF)/ 0.1M LiBr at 0.8 mL min$^{-1}$ as eluent. The refractive-index increment, dn/dc, was derived by integration of the concentration detector and used in the calculation of M$_w$. The light scattering cell of the SEC-LALLS system was calibrated with narrow molecular weight PMMA standards (PL). Samples were injected in a volume of 100 μL at a concentration of 12 mg/mL. RCA I recognition experiments were performed using an HPLC system equipped with a Shodex AFpak ARC-894 column and a Hitachi L-7480 fluorescence detector. NMR spectra were obtained on a Bruker DPX300 and Bruker DPX400 spectrometer. All chemical shifts are reported in ppm (δ) relative to tetramethylsilane, referenced to the chemical shifts of residual solvent resonances ($^1$H and $^{13}$C). The following abbreviations were used to explain the multiplicities: s=singlet, d=doublet, dd=doublet of doublets, bs=broad singlet, m=multiplet. The molecular weight of the polymers M$_n$(NMR) were calculated by comparing the integrals of the chain-end signals and appropriate peaks related to the polymer backbone. Tubidimetry assay was performed using an Varian Cary 50 Bio UV-Vis spectrometer, using 2 mL volume polycarbonate cuvettes (1 cm pathlength). Perkin Elmer Lambda 25 UV-Vis spectrometer and a 2 mL volume quartz cuvette (1 cm pathlength) were used for the Quantitative Precipitation (QP) experiments. Infrared absorption spectra were recorded on a Bruker VECTOR-22 FTIR spectrometer using a Golden Gate diamond attenuated total reflection cell. Mass spectra were recorded using a Micromass Autospec apparatus. Turbidimetry and quantitative precipitation assays were performed as described by Kiessling and co-workers (Cairo C W, et al., J. Am. Chem. Soc. (2002), 124 (8): 1615-1619). Melting points were measured on a Büchi 510 apparatus using open glass capillaries, the data are uncorrected. The yields are not optimized.

Synthesis of Monomer and Azide Sugars Derivatives

2-Methyl-acrylic acid 3-trimethylsilanyl-prop-2-ynyl ester (1): A solution of trimethylsilyl propyn-1-ol (10.0 g, 78.0 mmol) and $Et_3N$ (14.2 mL, 101.3 mmol) in $Et_2O$ (100 mL) was cooled to −20° C. and a solution of methacryloyl chloride (8.8 mL, 93 mmol) in $Et_2O$ (50 mL) was added dropwise over ca. 1 h. The mixture was stirred at this temperature for 30 min, then at ambient temperature overnight; the ammonium salts were removed by filtration and the volatiles removed under reduced pressure. $^1H$ NMR analysis of the yellow oily residue did not reveal the presence of substantial amount of any impurity, but two additional faint spots were observed by TLC (petroleum ether/$Et_2O$ 20:1) analysis, the crude product was therefore purified by flash chromatography (CC, $SiO_2$, petroleum ether/$Et_2O$ 50:1; $R_f$=0.67 in petroleum ether/$Et_2O$ 20:1). Obtained 12.4 g (63.2 mmol, 81%) NOTE: For large scale preparations (≧10 g) the best separation was obtained by eluting the column with 100% petroleum ether and subsequently, when most of the monomer (1) was already removed from the column, with petroleum ether/$Et_2O$ 50:1. IR (neat): $\tilde{v}$=2960, 1723, 1638, 1452, 1366, 1314, 1292, 1251, 1147, 1035, 971, 942, 842, 813, 761 $cm^{-1}$. $^1H$ NMR (400.03 MHz, $CDCl_3$, 298 K) δ=0.16 (s, 9H, $Si(CH_3)_3$); 1.93-1.94 (m, 3H, $CH_3C=CH_2$); 4.73 (s, 2H, $OCH_2$); 5.58-5.59 (m, 1H, C=CHH); 6.14 (m, 1H, C=CHH). $^{13}C\{^1H\}$ NMR (100.59 MHz, $CDCl_3$, 298 K) δ=−0.2 (3C, $Si(CH_3)_3$); 18.4 (1C, $CH_3C=CH_2$); 53.0 (1C, $OCH_2$); 92.0 (1C, $C\equiv CSi(CH_3)_3$); 99.2 (1C, $C\equiv CSi(CH_3)_3$); 126.5 (1C, $\overline{C}H_3C=CH_2$); 135.8 (1C, $\overline{C}H_3C=CH_2$); 166.6 (1C, $CO_{ester}$). Anal. Calcd. for $C_{10}H_{16}O_2Si$: C, 61.18; H, 8.21; N, 0.00. Found: C, 60.89; H, 8.22; N, 0.00; Mass Spectrometry (+ESI-MS) m/z (%): 219 [M+Na] (100), 197 [MH+] (40).

1-β-Azido-2,3,4,6-tetraacetyl-D-galactose (12) The product was prepared as previously described starting from commercially available pentaacetyl galactose, via the 1-α-bromo-2,3,4,6-tetraacetyl-D-galactose, that was used immediately for the synthesis of the corresponding azide due to its reported instability (Maier M A, et al., Bioconjugate Chem. (2003), 14 (1): 18-29) 1-α-Bromo-2,3,4,6-tetraacetyl-D-galactose $^1H$ NMR (400.03 MHz, $CDCl_3$, 298 K) δ=2.02 (s, 3H, $CH_3$); 2.07 (s, 3H, $CH_3$); 2.12 (s, 3H, $CH_3$); 2.16 (s, 3H, $CH_3$); 4.10-4.22 (m, 2H, $CH_2$); 4.48-4.50 (m, 1H, CH); 5.06 (dd, J=10.6, 3.8 Hz, 1H, CH); 5.41 (dd, J=10.6, 2.9 Hz, 1H, CH); 5.53 (bs, 1H, CH); 6.72 (d, J=3.8 Hz, 1H, CH). $^{13}C\{^1H\}$ NMR (100.59 MHz, $CDCl_3$, 298 K) δ=20.58 (1C, $CH_3$); 20.61 (1C, $CH_3$); 20.65 (1C, $CH_3$); 20.74 (1C, $CH_3$); 60.8 (1C, CH); 66.9 (1C, CH); 67.7 (1C, CH); 67.9 (1C, CH); 71.0 (1C, CH); 88.1 (1C, CHBr); 169.7 (1C, CO); 169.9 (1C, CO); 170.0 (1C, CO); 170.3 (1C, CO). 1-β-Azido-2,3,4,6-tetraacetyl-D-galactose (12): (89% overall yield from pentaacetyl galactose) m.p. 93-95° C. (lit. 94-96° C.$^9$). IR (neat): $\tilde{v}$=2984, 2124, 1736, 1435, 1373, 1273, 1210, 1167, 1167, 1117, 1082, 1047, 952, 902, 842, 759, 718 $cm^{-1}$. $^1H$ NMR (400.03 MHz, $CDCl_3$, 298 K) δ=1.98 (s, 3H, $CH_3$); 2.05 (s, 3H, $CH_3$); 2.08 (s, 3H, $CH_3$); 2.16 (s, 3H, $CH_3$); 4.00 (m, 1H, CHHO); 4.14-4.17 (m, 2H, CHHO+CH); 4.59 (d, J=8.8 Hz, 1H, CH); 5.02 (dd, J=10.4, 3.3 Hz, 1H, CH); 5.15 (dd, J=10.4, 8.7 Hz, 1H, CH); 5.41 (dd, J=3.3, 3.8 Hz, 1H, CH). $^{13}C\{^1H\}$ NMR (100.59 MHz, $CDCl_3$, 298 K) δ=20.65 (1C, $CH_3$); 20.74 (1C, $CH_3$); 20.78 (1C, $CH_3$); 20.80 (1C, $CH_3$); 61.3 (1C, $CH_2$); 66.9 (1C, CH); 68.1 (1C, CH); 70.8 (1C, CH); 72.9 (1C, CH); 88.4 (1C, $CHN_3$); 169.5 (1C, CO); 170.1 (1C, CO); 170.3 (1C, CO); 170.5 (1C, CO). Anal. Calcd. for $C_{14}H_{19}N_3O_9$: C, 45.04; H, 5.13; N, 11.26. Found: C, 45.05; H, 5.07; N, 10.63.

(14) (Wang P, et al., J. Org. Chem. (1993), 58 (15): 3985-3990) 88% yield. IR (neat): $\tilde{v}$=3356 (broad), 2920, 2095, 1443, 1279, 1198, 1130, 1044, 961, 875, 806 $cm^{-1}$. $^1H$ NMR (400.03 MHz, $CDCl_3$, 298 K) 3.41 (s, 3H, $OCH_3$); 3.55-3.56 (m, 2H, $CH_2N_3$, H'- and H"-6); 3.69-3.71 (m, 2H, H-3+H-4), 3.95 (dd, J=3.3, 1.5 Hz, 1H, H-2); 4.74 (d, J=1.5 Hz, 1H, H-1) $^{13}C\{^1H\}$ NMR (100.59 MHz, $CDCl_3$, 298 K) 51.53 (1C, $CH_2N_3$); 55.35 (1C, $OCH_3$); 68.37 (1C, CH); 70.85 (1C, CH); 71.43 (1C, CH); 71.80 (1C, CH); 101.14 (1C, $C_{anomeric}$). HRMS-ES Calcd. for $C_7H_{14}N_3O_5$ (M+): 220.0933. Found 220.0926.

(16) (Hayes W, et al., Tetrahedron (2003), 59 (40): 7983-7996) 49% yield. IR (neat): $\tilde{v}$=2958, 1743, 1435, 1368, 1218, 1136, 1084, 1046, 979, 910 $cm^{-1}$. $^1H$ NMR (400.03 MHz, $CDCl_3$, 298 K) δ=1.88 (s, 3H, $CH_3$); 1.94 (s, 3H, $CH_3$); 1.99 (s, 3H, $CH_3$); 2.05 (s, 3H, $CH_3$); 1.96-2.12 (m, 2H, $CH_2CH_2Br$); 3.41-3.51 (m, 3H, $OCHHCH_2+CH_2Br$); 3.77-3.82 (m, 1H, $OCHHCH_2$); 3.89-3.92 (m, 1H, H-5); 4.02 (dd, J=12.3, 2.3 Hz, 1H, H"-6); 4.16 (dd, J=12.3, 5.3 Hz, 1H, H'-6); 4.73 (d, J=1.5 Hz, 1H, H-1); 5.12-5.13 (m, 1H, H-2); 5.16-5.19 (m, 2H, H-3, H-4). $^{13}C\{^1H\}$ NMR (100.59 MHz, $CDCl_3$, 298 K) δ=20.52 (1C, $CH_3$); 20.55 (1C, $CH_3$); 20.60 (1C, $CH_3$); 20.71 (1C, $CH_3$); 30.00 (1C, $CH_2CH_2Br$); 31.91 (1C, $CH_2CH_2Br$); 62.30 (1C, $CH_2OAc$); 65.41 (1C, $CH_2CH_2O$); 65.91 (1C, CH); 68.56 (1C, CH); 68.956 (1C, CH); 69.32 (1C, CH); 97.51 (1C, $C_{anomeric}$); 169.53 (1C, $CH_3C(O)O$); 169.71 (1C, $CH_3C(O)O$); 169.82 (1C, $CH_3C(O)O$); 170.40 (1C, $CH_3C(O)O$). Anal. Calcd. for $C_{17}H_{25}N_3O_{10}$: C, 47.33; H, 5.84; N, 9.74. Found: C, 47.38; H, 5.90; N, 9.47; HRMS-ES Calcd. for $C_{17}H_{24}BrO_{10}$ (M−H): 467.0553. Found 467.0562.

(17) (Hayes W, et al., Tetrahedron (2003), 59 (40): 7983-7996) 77% yield. IR (neat): $\tilde{v}$=2938, 2097, 1742, 1679, 1434, 1368, 1218, 1136, 1083, 1046, 979, 938, 911 $cm^{-1}$. $^1H$ NMR (400.03 MHz, $CDCl_3$, 298 K) δ=1.83-1.90 (m, 2H, $CH_2CH_2N_3$); 1.96 (s, 3H, $CH_3$); 2.01 (s, 3H, $CH_3$); 2.07 (s, 3H, $CH_3$); 2.12 (s, 3H, $CH_3$); 3.40 (t, J=6.5 Hz, 1H, $CH_2N_3$); 3.47-3.52 (m, 1H, $OCHHCH_2$); 3.75-3.81 (m, 1H, $OCHHCH_2$); 3.90-3.95 (m, 1H, H-5); 4.08 (dd, J=12.3, 2.3 Hz, 1H, H"-6); 4.24 (dd, J=12.3, 5.4 Hz, 1H, H'-6); 4.78 (bs, 1H, H-1); 5.20 (dd, J=3.0, 1.8 Hz, 1H, H-2); 5.23-5.30 (m, 2H, H-3, H-4). $^{13}C\{^1H\}$ NMR (100.59 MHz, $CDCl_3$, 298 K) δ=20.75, 20.77, 20.94 (4C, $CH_3$); 28.71 (1C, $CH_2CH_2N_3$); 48.17 (1C, $CH_2CH_2N_3$); 62.58 (1C, $CH_2OAc$); 64.94 (1C, $CH_2CH_2O$); 67.22 (1C, CH); 68.74 (1C, CH); 69.11 (1C, CH); 69.57 (1C, CH); 97.71 (1C, $C_{anomeric}$); 169.80 (1C, $CH_3C(O)O$); 169.98 (1C, $CH_3C(O)O$); 170.12 (1C, $CH_3C(O)O$); 170.69 (1C, $CH_3C(O)O$). HRMS-ES Calcd. for $C_{17}H_{24}N_3O_{10}$ (M−H): 430.1462. Found 430.1458.

(18) (Prepared as for the analogous azide (22)) 87% yield. IR (neat): $\tilde{v}$=3358 (bs), 2927, 2097, 1644, 1301, 1262, 1132, 1056, 976, 913, 881, 812 $cm^{-1}$ $^1H$ NMR (400.03 MHz, $CD_3OD$, 298 K) δ=1.83-1.89 (m, 2H, $CH_2CH_2N_3$); 3.41 (td, J=6.8, 2.8 Hz, 2H, $CH_2N_3$); 3.48-3.53 (m, 2H, $OCHHCH_2$+H-5); 3.62 (apparent t, J=9.4 Hz, 1H, H-4); 3.69 (dd, J=9.3, 3.3 Hz, 1H, H-3); 3.72 (dd, J=11.9, 5.6 Hz, 1H, H'-6); 3.79-3.85 (m, 3H, H-2, H-6"); 4.76 (d, J=1.5 Hz, 1H, H-1). $^{13}C\{^1H\}$ NMR (100.59 MHz, $CD_3OD$, 298 K) δ=29.83 (1C, $CH_2CH_2N_3$); 49.85 (1C, $CH_2CH_2N_3$); 62.75 (1C, $CH_2OH$); 65.34 (1C, $CH_2CH_2O$); 68.44 (1C, CH); 72.05 (1C, CH);

72.56 (1C, CH); 74.58 (1C, CH); 101.53 (1C, C$_{anomeric}$); HRMS-ES Calcd. for C$_9$H$_{18}$N$_3$O$_6$(M+H): 264.1196. Found 264.1199.

(20) (Joosten J A F, et al., J. Med. chem. (2004), 47 (26): 6499-6508) 71% yield. IR (neat): $\tilde{v}$=2962, 1742, 1433, 1368, 1213, 1174, 1044, 955, 900, 736 cm$^{-1}$. $^1$H NMR (400.03 MHz, CDCl$_3$, 298 K) δ=1.96 (s, 3H, CH$_3$); 2.01-2.14 (m, 2H, CH$_2$CH$_2$Br); 2.03 (s, 3H, CH$_3$); 2.06 (s, 3H, CH$_3$); 2.13 (s, 3H, CH$_3$); 3.44-3.47 (m, 2H, CH$_2$Br); 3.64-3.70 (m, 1H, OCHHCH$_2$); 3.88-3.92 (m, 1H, H-5); 3.92-4.00 (m, 1H, OCHHCH$_2$); 4.08-4.19 (m, 2H, H'-6+H''-6); 4.46 (d, J=8.0 Hz, H-1); 5.00 (dd, J=10.4, 3.4 Hz, 1H, H-3); 5.17 (dd, J=10.4, 8.0 Hz, 1H, H-2); 5.37 (dd, J=3.5, 0.8 Hz, 1H, H-4). $^{13}$C{$^1$H} NMR (100.59 MHz, CDCl$_3$, 298 K) δ=20.67 (1C, CH$_3$); 20.74 (1C, CH$_3$); 20.77 (1C, CH$_3$); 20.90 (1C, CH$_3$); 30.26 (1C, CH$_2$CH$_2$Br); 32.32 (1C, CH$_2$CH$_2$Br); 62.37 (1C, CH$_2$OAc); 67.11 (1C, CH); 67.40 (1C, CH$_2$CH$_2$O); 68.93 (1C, CH); 70.76 (1C, CH); 70.92 (1C, CH); 101.64 (1C, C$_{anomeric}$); 169.69 (1C, CH$_3$C(O)O); 170.21 (1C, CH$_3$C(O)O); 170.33 (1C, CH$_3$C(O)O); 170.48 (1C, CH$_3$C(O)O). Anal. Calcd. for C$_{17}$H$_{25}$BrO$_{10}$: C, 43.51; H, 5.37; N, 0.00. Found: C, 43.95; H, 5.37; N, 0.00; HRMS-ES Calcd. for C$_{17}$H$_{24}$BrO$_{10}$ (M−H): 467.0553. Found 4678.0561.

(21) (Joosten J A F, et al., J. Med. chem. (2004), 47 (26): 6499-6508) 84% yield. IR (neat): $\tilde{v}$=2940, 2097, 1743, 1431, 1368, 1244, 1172, 1133, 1044, 955, 902, 736 cm$^{-1}$. $^1$H NMR (400.03 MHz, CDCl$_3$, 298 K) δ=1.72-1.93 (m, 2H, CH$_2$CH$_2$N$_3$); 1.96 (s, 3H, CH$_3$); 2.02 (s, 3H, CH$_3$); 2.04 (s, 3H, CH$_3$); 2.13 (s, 3H, CH$_3$); 3.32-3.37 (m, 2H, CH$_2$Br); 3.54-3.62 (m, 1H, OCHHCH$_2$); 3.87-3.97 (m, 1H, H-5+ OCHHCH$_2$); 4.07-4.19 (m, 2H, H'-6+H''-6); 4.44 (d, J=7.9 Hz, H-1); 4.99 (dd, J=10.5, 3.4 Hz, 1H, H-3); 5.17 (dd, J=10.4, 7.9 Hz, 1H, H-2); 5.37 (dd, J=3.4, 0.9 Hz, 1H, H-4). $^{13}$C{$^1$H} NMR (100.59 MHz, CDCl$_3$, 298 K) δ=20.66, 20.74, 20.84 (4C, CH$_3$); 29.02 (1C, CH$_2$CH$_2$N$_3$); 47.97 (1C, CH$_2$CH$_2$N$_3$); 61.34 (1C, CH$_2$OAc); 66.53 (1C, CH$_2$CH$_2$O); 67.08 (1C, CH); 68.88 (1C, CH); 70.75 (1C, CH); 70.94 (1C, CH); 101.39 (1C, C$_{anomeric}$); 169.53 (1C, CH$_3$C(O)O); 170.22 (1C, CH$_3$C(O)O); 170.33 (1C, CH$_3$C(O)O); 170.47 (1C, CH$_3$C(O)O). Anal. Calcd. for C$_{17}$H$_{25}$N$_3$O$_{10}$: C, 47.33; H, 5.84; N, 9.74. Found: C, 47.38; H, 5.90; N, 9.47; HRMS-ES Calcd. for C$_{17}$H$_{24}$N$_3$O$_{10}$ (M−H): 430.1462. Found 430.1458.

(22) (prepared with the general deprotection method described by Vicente et al. (Vicente V, et al., Chem.-Eur. J. (2004), 10 (17): 4240-4251) 91% yield. IR (neat): $\tilde{v}$=3360 (bs), 2930, 2886, 2094, 1643, 1374, 1299, 1260, 1143, 1115, 1041, 949, 915, 893, 783, 757 cm$^{-1}$. $^1$H NMR (400.03 MHz, CDCl$_3$, 298 K) δ=1.86 (app. quint, J=6.4 Hz, 2H, CH$_2$CH$_2$N$_3$); 3.45 (t, J=6.4 Hz, 2H, CH$_2$N$_3$); 3.50-3.55 (m, 2H, H-2+H-5); 3.64 (dt, J=10.0, 6.2 Hz, 1H, OCHHCH$_2$); 3.73 (d, J=6.0 Hz, 2H, H'-6+H''-6); 3.86 (dd, J=2.9, 1.0 Hz, H-4); 3.95 (dt, J=10.0, 6.2 Hz, 1H, OCHHCH$_2$); 4.22 (m, 1H, H-1). $^{13}$C{$^1$H} NMR (100.59 MHz, CD$_3$OD, 298 K) δ=30.19 (1C, CH$_2$CH$_2$N$_3$); 49.32 (1C, CH$_2$CH$_2$N$_3$); 62.32 (1C, CH$_2$OH); 67.46 (1C, CH$_2$CH$_2$O); 70.13 (1C, CH); 72.44 (1C, CH); 74.86 (1C, CH); 76.468 (1C, CH); 104.93 (1C, C$_{anomeric}$); HRMS-ES Calcd. for C$_9$H$_{18}$N$_3$O$_6$ (M+H): 264.1196. Found 264.1194

Coumarin propyl azide (28). A solution of Coumarin 343 (0.285 g, 1.00 mmol) and 3-azido-1-propanol (0.505 g, 5.00 mmol) in CH$_2$Cl$_2$ (20 mL) was cooled to 0° C. and EDC.HCl (0.575 g, 3.00 mmol) and DMAP (0.006 g, 0.05 mmol) were sequentially added. The orange solution was stirred at 0° C. for 2 h, then at ambient temperature overnight. The reaction mixture was washed with water (2×50 mL) and dried over MgSO$_4$. The volatiles were removed under reduced pressure and the crude product purified by flash chromatography (CC, SiO$_2$, 1) 100% CH$_2$Cl$_2$; 2) CH$_2$Cl$_2$/Et$_2$O 10:1). The isolated product still contained some 3-azido-1-propanol starting material, which was then removed by coevaporation with toluene under reduced pressure. Obtained 0.110 g (0.299 mmol, 30%) of (28) as an orange oil that partially solidified by standing at ambient temperature over several days.

IR (neat): $\tilde{v}$=2920, 2850, 2095, 1749, 1693, 1619, 1590, 1560, 1518, 1444, 1367, 1310, 1242, 1205, 1173, 1107, 1034, 793, 750 cm$^{-1}$; $^1$H NMR (400.03 MHz, CDCl$_3$, 298 K) δ=1.91-1.97 (m, 4H, 2CH$_2$), 2.01 (app. quint., J=6.4 Hz, 2H, CH$_2$CH$_2$N$_3$), 2.74 (t, J=6.3 Hz, 2H, CH$_2$), 2.84 (t, J=6.4 Hz, 2H, CH$_2$), 3.30-3.34 (m, 4H, CH$_2$N), 3.50 (t, J=6.8 Hz, 2H, CH$_2$CH$_2$N$_3$), 4.36 (t, J=6.2 Hz, 2H, CH$_2$CH$_2$O), 6.91 (s, 1H, CH$_{vinyl}$), 8.29 (s, 1H, CH$_{aryl}$); $^{13}$C{$^1$H} NMR (100.59 MHz, CDCl$_3$, 298 K) δ=20.13 (1C, CH$_2$), 20.24 (1C, CH$_2$), 21.22 (1C, CH$_2$), 27.49 (1C, CH$_2$), 28.38 (1C, CH$_2$), 29.78 (1C, CH$_2$), 48.40 (1C, CH$_2$), 49.98 (1C, CH$_2$), 50.37 (1C, CH$_2$), 61.77 (1C, CH$_2$O), 105.80 (1C, C), 107.02 (1C, C), 107.60 (1C, C), 119.35 (1C, C), 127.17 (1C, CH), 148.77 (1C, C), 149.42 (1C, CH), 153.64 (1C, C), 158.65 (1C, C), 164.69 (1C, C). HRMS-ES Calcd. for C$_{20}$H$_{21}$N$_3$O$_4$(M+): 368.148. Found 368.147.

General polymerization procedure. Synthesis of (3a): N-(Ethyl)-2-pyridylmethanimine ligand (0.072 mL, 0.51 mmol), (1) (2.0 g, 10.2 mmol), initiator (2) (0.065 g, 0.25 mmol) and mesitylene (internal NMR standard, 0.5 mL) were charged into a dry Schlenk tube along with toluene (4.0 mL) as solvent. The tube was sealed with a rubber septum and subjected to five freeze-pump-thaw cycles. This solution was then transferred via cannular under nitrogen into a second Schlenk tube, previously evacuated and filled with nitrogen, containing Cu(I)Br (0.036 g, 0.25 mmol) and a magnetic follower. The temperature was adjusted at 70° C. with constant stirring (t=0). Samples were removed periodically using a degassed syringe for molecular weight and conversion analysis. At the end of the polymerization the mixture was diluted with 10 mL of toluene and air was bubbled through for 4 h. The reaction mixture was passed through a short neutral alumina column and subsequently washed with toluene. The volatiles were removed under reduced pressure and the residues dissolved in THF (ca. 10 mL) prior to precipitation into 10:2 vol/vol methanol/water mixture (ca. 200 mL). The white solid was isolated by filtration, washed with additional methanol/water mixture and volatiles removed under reduced pressure. The molecular weight of the polymer was calculated by $^1$H NMR by comparing the integral of the initiator benzylic signal at 5.1 ppm to that of the C(O)OCH$_2$ group connected to the alkyne branches, at 4.4 ppm. Virtually identical molecular weights were obtained when the singlet of the Si(CH$_3$)$_3$ at 0.2 ppm was used instead of 4.4 ppm. The conversions were calculated via $^1$H NMR by following the decreasing of the integrals of the monomer vinyl signals (5.6 and 6.2 ppm), using the peak of mesitylene (6.9 ppm) as internal standard. Alternatively, the conversions were calculated by comparison between the integrals relative to the C(O)OCH$_2$ protons of the monomer (bs, 4.6 ppm, decreasing with time) and the analogous C(O)OCH$_2$ protons relative to the polymer (broad signal, 4.4 ppm increasing with time). DP(NMR)=75; M$_n$(NMR) 14.7 kDa; M$_w$/M$_n$ (GPC)=1.16 initiating efficiency=41%; Conversion 82%.

Polymer (6): [(1)]$_0$:[MMA]$_0$: [(2)]$_0$:[CuBr]:[ligand]=20: 50:1:1:2; mesitylene 0.5 mL, toluene 12 mL, (1): 1.2 g, MMA: 3.0 g, 70° C. M$_n$(NMR) 8.7 kDa (DP(1)=13; DP(MMA)=61); M$_w$/M$_n$ (GPC)=1.09; Conversion 86%; initiating efficiency=65%. The polymer was isolated via precipitation into petroleum ether.

Polymer (9): [(1)]:[mPEG$_{300}$MA]: [(2)]:[CuBr]:[ligand]= 5:25:1:1:2; mesitylene 0.2 mL; toluene 9 mL, (1): 0.50 g, mPEG$_{300}$MA: 4.0 g, 70° C. M$_n$(NMR) 10.8 kDa (DP(1)=6; DP(mPEG$_{300}$MA)=32); M$_w$/M$_n$ (GPC)=1.16; Conversion 85%; initiating efficiency=72%. The polymer was isolated via precipitation into petroleum ether.

Polymer deprotection. General procedure: The trimethyl silyl protected polymer (300 mg) and acetic acid (1.5 equiv. mol/mol with respect to the alkyne-trimethylsilyl groups) were dissolved in THF (20 mL). Nitrogen was bubbled (ca. 10 min) and the colorless solution was cooled to −20° C. A 0.20 M solution of TBAF.3H$_2$O (1.5 equiv. mol/mol with respect to the alkyne-trimethylsilyl groups) was added slowly via syringe (ca. 2-3 min). The resulting turbid mixture was stirred at this temperature for 30 min and then warmed to ambient temperature. The deprotection was complete in less than 3 h for the homopolymer (3a) and the MMA copolymer (6). For the copolymer with mPEG MA, (9), a longer reaction time (16 h) was necessary, presumably due to the larger steric hindrance provided by the mPEG side-branches on the polymer backbone. The reaction solution was passed through a short silica pad in order to remove the excess of TBAF and the pad was subsequently washed with additional THF. The resulting solution was then concentrated under reduced pressure and the polymer was precipitated in petroleum ether.

"Clicking" of Sugar Azides to Alkyne-Containing Polymers.

| Polymer (Code) | Synthetic procedure |
| --- | --- |
| (5a-12) | 1 |
| (5a-13) | 1 |
| (8-12) | 1 |
| (8-13) | 1 |
| (11-14) | 2[a] |
| (23) | 2 |
| (24) | 2 |
| (25) | 2 |
| (26) | 2 |
| (27) | 2 |
| (29) | 2 |
| (30) | 2 |

[a]modified work-up (see below)

Procedure 1: Synthesis of (5a-12). A solution of polymer (4a) (50 mg, 0.40 mmol of "clickable" alkyne units), the azido-sugar (12) (225 mg, 0.604 mmol) and diisopropylethylamine (DIPEA, 26 mg, 35 µL, 0.20 mmol) in THF (5 mL) was degassed by bubbling nitrogen for 10 min. [(PPh$_3$)$_3$CuBr] (37.5 mg, 0.402 mmol) was then added and nitrogen was bubbled into the resulting solution for a further 5 min. The very pale yellow clear solution was stirred at ambient temperature for 3 days and then passed through a short neutral alumina pad eluting with THF. The resulting solution was concentrated under reduced pressure and precipitated into petroleum ether (200 mL). The suspension was centrifugated and the solid obtained redissolved in THF. The solution was stirred for 1 h in the presence of ion exchange resin, filtered and precipitated again in 1:1 Et$_2$O/petroleum ether mixture (150 mL). The solid was separated by centrifugation to give the polymer (5a-12) as off-white solid.

Procedure 2: Synthesis of (24). A solution of polymer (4b) (100 mg, 0.806 mmol of "clickable" alkyne units), the azido-sugars (18) (223 mg, 0.847 mmol) and (22) (74.25 mg, 0.281 mmol), and triethylamine (41 mg, 0.40 mmol) in DMSO (7 mL) was degassed by bubbling nitrogen for 10 min. [(PPh$_3$)$_3$CuBr] (150 mg, 0.161 mmol) was then added and nitrogen was bubbled into the resulting solution for further 5 min. The very pale yellow clear solution was stirred at ambient temperature for 3 days, then ion exchange resin (150 mg) was added and the suspension gently stirred for 4 hours. After filtering, addition of more ion-exchange resin (150 mg) the suspension was stirred at ambient temperature overnight. After filtration the solution was added dropwise to a 2:1 CH$_2$Cl$_2$/methanol mixture and the polymer was separated by centrifugation. The precipitated polymer was dissolved in water and reprecipitated in THF in order to remove the traces of DMSO still present. The sticky product was isolated by centrifugation, dissolved in the minimum amount of water and freeze-dried, to give the polymer (23) as a light white powder.

Synthesis of (11-14). Procedure 2 was employed (reaction time=96 h), with the following work-up: Triethylamine was removed from the reaction mixture under reduced pressure and the resulting solution was stirred in the presence of ion-exchange resin overnight. The resin isolated by filtration water (250 mL) was added and the resulting solution was centrifuged. The supernatant was purified by dialysis and the polymer isolated by freeze-drying.

Synthesis of fluorescent ligands (29) and (30). Procedure 2 was employed, using 2.5% (with respect to the total amount of azido reagents used) of coumarin azide (28).

GPC-LALS Analysis

Each sample was analyzed in triplicate.

| Polymers (Code) | Average M$_w$ (kDa) | Standard deviation (kDa) |
| --- | --- | --- |
| (3b) | 19.83 | 0.57 |
| (4b) | 12.99 | 0.49 |
| (23) | 37.70 | 0.36 |
| (24) | 39.34 | 0.71 |
| (25) | 37.28 | 0.33 |
| (26) | 37.72 | 0.47 |
| (27) | 38.09 | 0.76 |
| (29) | 38.83 | 0.27 |
| (30) | 38.08 | 2.5 |

Quantitative Precipitation Assay

The assay was performed as described by Kiessling and coworkers (Cairo C W, et al., J. Am. Chem. Soc. (2002), 124 (8): 1615-1619), except that 0.10 M Tris.HCl (pH 7.2), 0.9 M NaCl, 1 mM CaCl$_2$ and 1 mM MnCl$_2$ was employed as the precipitation buffer (Khan M I, et al., Carbohydr. Res. (1991), 213: 69-77) and the polymer-Con A aggregates were redissolved in 1 mL of 1 M α-D-methyl mannopyranoside (see FIG. 2).

A preliminary screening at different ligand concentrations was performed in order to estimate the approximate maximal polymer concentration necessary for quantitatively precipitate the Con A lectin. In subsequent measurements, more points (samples with appropriate polymer concentration) were added, until the maximum polymer concentrations for quantitative lectin precipitation converged to the values that are reported in the main paper. The steepest point of the sigmoidal curves used for the experimental results fitting were takes as half maximal polymer concentration required for fully precipitate Con A.

Tubidimetry Assay

Figure 3:
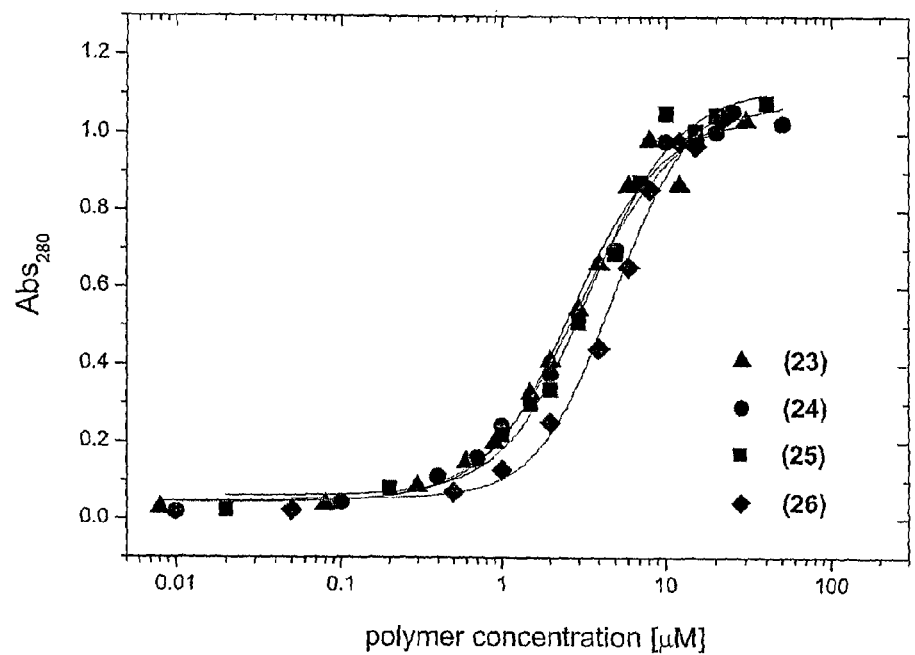
FIG. 3 shows the absorbance of a number of different polymers with polymer concentration.
Figure 4:
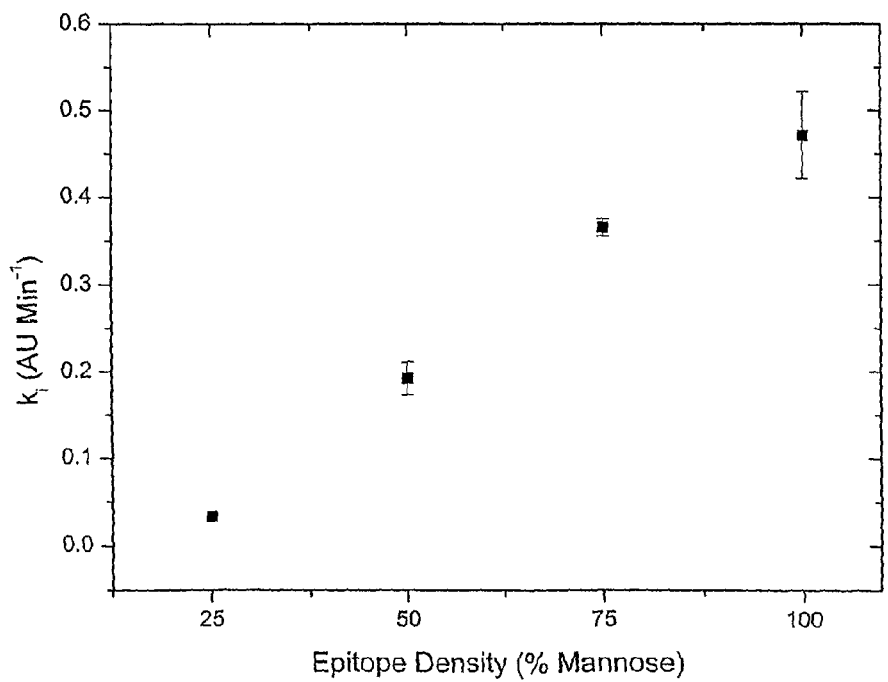
FIG. 4 shows clustering rate constants for the polymer according to the invention compared with epitope density (average of 3 independent experiments).

The assay was performed as described by Kiessling and coworkers (Cairo C W, et al., J. Am. Chem. Soc. (2002), 124 (8): 1615-1619), taking spectra every 0.12 s. The data shown are the average of 3 independent experiments. Results are shown in FIGS. 3, 4 and 5.

Results and Discussion
Synthesis of the "Clickable" Alkyne Polymers.

Figure 1:
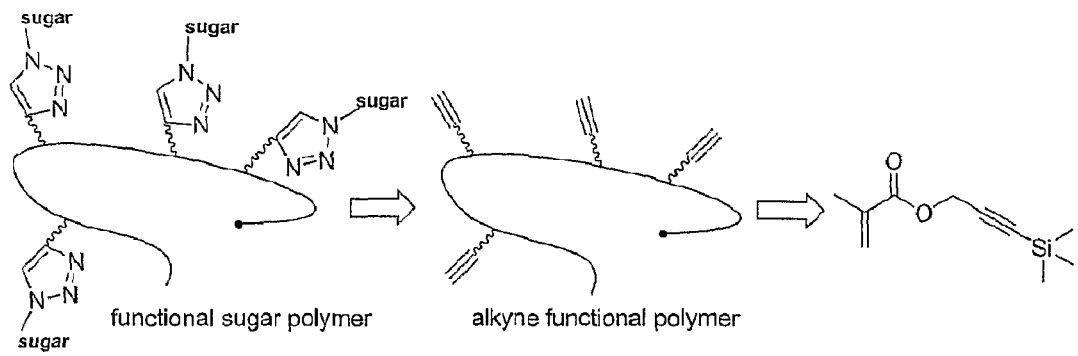
FIG. 1 shows a retrosynthetic approach towards comb carbohydrate functional polymers.
Figure 2:
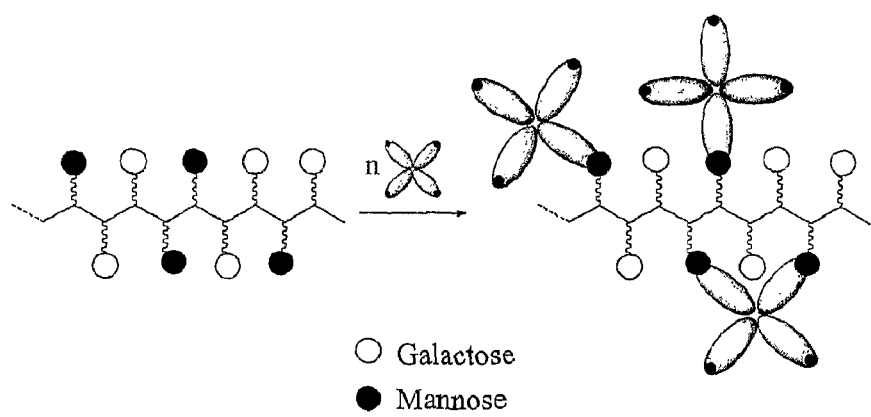
FIG. 2 shows a schematic representation of multivalent ligand-con A clustering reaction.

Trimethylsilyl methacrylate monomer (1) was prepared in one step from commercially available 3-trimethylsilylpropyn-1-ol and methacryloyl chloride. O-Benzyl α-bromoester (2)[76] was chosen as initiator since both the aromatic and the benzylic protons can be used as $^1$H NMR internal standards for the determination of the number average molecular weight ($M_n$(NMR)) of the corresponding polymers (Scheme 1). Both homo- and co-polymerization of (1) with MMA and mPEG$_{300}$MA in the presence of a Cu(I)Br/N-(n-ethyl)-2-pyridylmethanimine catalyst[77] gave excellent first order kinetic plots, indicating a good control over the polymer molecular weight and molecular weight distribution (FIG. 2 and Table 1). For the homopolymerization of (1), it is noted that the polydispersity Scheme 1.

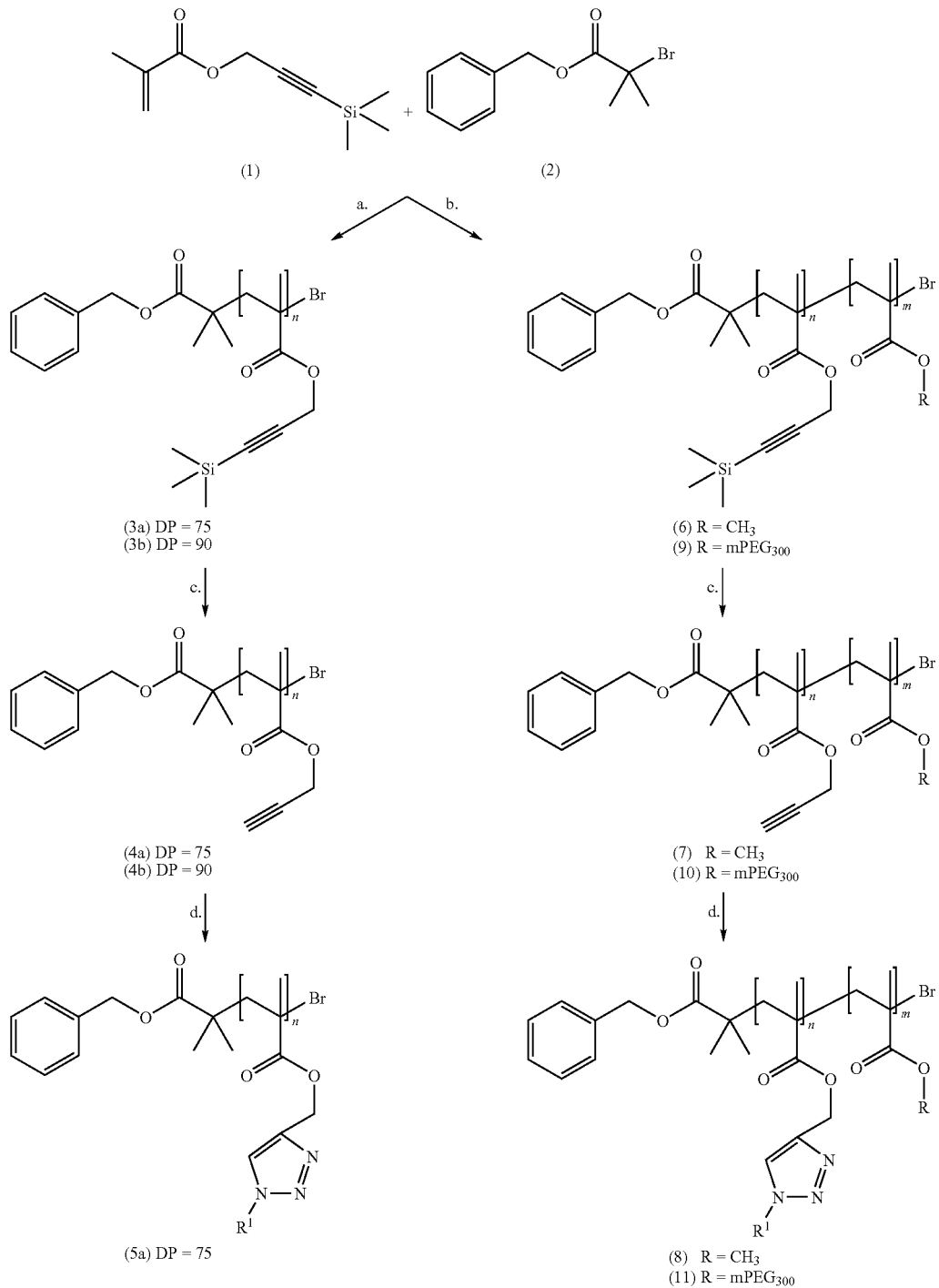

Reagents and conditions. a) N-(n-Ethyl)-2-pyridylmethanimine/CuBr, toluene, 70° C.; b) N-(ethyl)-2-pyridylmethanimine/CuBr, MMA or (mPEG$_{300}$)MA, toluene, 70° C.; c) TBAF, acetic acid, THF, -20 to 25° C.; d) R$^1$N$_3$, (PPh$_3$)$_3$CuBr, DIPEA.

index ($M_w/M_n$) of the purified polymers is as low as 1.15, even at relatively high monomer conversion (>80%). In order to verify the versatility of the synthetic strategy proposed, several polymers with very different solubilities in both organic and aqueous solvents were prepared. Methyl methacrylate (MMA) and methoxy(polyethylene glycol)$_{300}$ methacrylate (mPEG$_{300}$MA) were chosen as model comonomers as they furnish hydrophobic and hydrophilic copolymers, respectively. Moreover, polyethylene glycols have been shown not to illicit non-specific protein binding which is important in the interpretation of the lectin binding reported later.[78]

Interestingly, preliminary attempts using TBAF-mediated removal of the trimethylsilyl protecting group afforded polymers with a terminal alkyne content lower than expected. We suspected that the reason behind this behaviour was related to the basicity of TBAF and we were pleased to find that the addition of acetic acid as buffering agent was sufficient to provide the expected terminal alkyne polymers in virtually 100% yields.[79] The complete removal of the trimethylsilyl groups was confirmed by both $^1$H NMR, with the appearance of the C≡CH signal at 2.5 ppm along with the disappearance of the Si(CH$_3$)$_3$ signal at 0.2 ppm, and by FT IR analysis with the alkyne C—H stretching frequency at 3291 cm$^{-1}$. The SEC analysis also revealed that, as expected, the hydrodynamic volume of the polymers decreased after deprotection while the polydispersity index remained unchanged. The use of a low-angle laser light scattering (LALLS) detector (5°) for SEC analysis allowed us to determine the absolute $M_w$ values of the polymers before and after the removal of trimethylsilyl group. The results obtained, $M_w$(3b)=19.8 and $M_w$(4b)=13.0 kDa, combined with the relative polydispersity indexes of these polymers, gave an indication of the number average molecular weights, $M_n$(3b)=17.3 and $M_n$(4b)=11.3 kDa, that agreed well with the data obtained by $^1$H NMR analysis ($M_n$(NMR)(3b)=17.7 and $M_n$(NMR)(4b)=11.2 kDa).

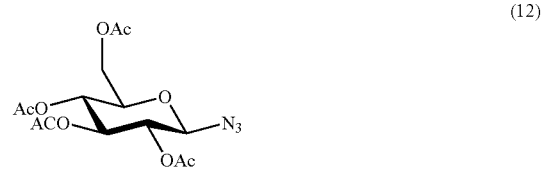

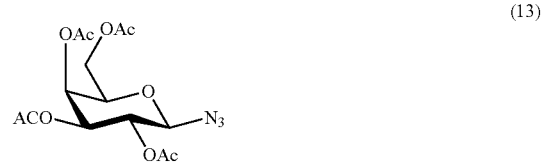

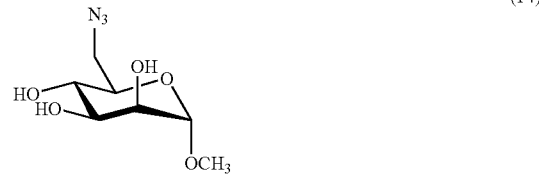

Chart 1. Azido Sugar Derivatives Used in the Synthesis of Carbohydrate Comb Polymers

TABLE 2

| Polymer | Precursor | Azide sugar | $M_n$(NMR) (kDa) | $M_w/M_n$ (SEC) |
|---|---|---|---|---|
| (5a-12) | (4a) | (12) | 27.0 | 1.13 |
| (5a-13) | (4a) | (13) | 25.5 | 1.13 |
| (8-12) | (7) | (12) | 10.9 | 1.08 |
| (8-13) | (7) | (13) | 10.8 | 1.08 |
| (11-14) | (11) | (14) | 12.6 | 1.14 |

The conditions chosen for the click reaction for the sugar azides to the alkyne-containing polymers were modified from those reported by Hawker and co-workers for the synthesis of several dendritic libraries, with [(PPh$_3$)$_3$CuBr] as catalyst, in the presence of DIPEA.[6] Removal of the trimethylsilyl protecting group was accompanied by a decrease in the polymer

TABLE 1

| Polymer | Monomer A | Monomer B | $M_n$(NMR) (kDa) | $M_w/M_n$ (SEC) | Notes |
|---|---|---|---|---|---|
| (3a) | (1) | — | 14.9 | 1.16 | Homopolymer from (1) |
| (4a) | (1) | — | 8.5 | 1.15 | Obtained by deprotection of (3a) |
| (3b) | (1) | — | 17.6 | 1.17 | Homopolymer from (1) |
| (4b) | (1) | — | 11.2 | 1.11 | Obtained by deprotection of (3b) |
| (6) | (1) | MMA[a] | 8.9 | 1.09 | Statistical copolymer |
| (7) | (1) | MMA[a] | 8.2 | 1.09 | Obtained by deprotection of (6) |
| (9) | (1) | mPEG$_{300}$MA[b] | 11.9 | 1.12 | Statistical copolymer |
| (10) | (1) | mPEG$_{300}$MA[b] | 11.1 | 1.15 | Obtained by deprotection of (9) |

[a] MMA content in the polymer: 82% (mol/mol);
[b] mPEG$_{300}$MA content in the polymer: 84% (mol/mol).

2,3,4,6-Tetra-O-acetyl-β-D-glucopyranosyl azide (12), 2,3,4,6-tetra-O-acetyl-β-D-galactopyranosyl azide (13) and methyl-α-D-6-azido-6-deoxy-mannopyranoside (14) were employed as model sugar azide reagents for the click reaction to investigate the versatility of this approach to attach protected and unprotected carbohydrates either via a C-6 or an α or β anomeric azide following established synthetic protocols (Chart 1).

molecular mass, while after conjugation of the azide sugar derivatives a substantial increasing in the polymer hydrodynamic volume was observed (FIG. 7). $^1$H NMR and FT-IR analysis confirmed that the conversion of the alkyne groups into triazoles was achieved at close to 100% yield, with the molecular weight distribution of the polymers remaining virtually unchanged during both the deprotection and click reactions.

Synthesis of Multivalent Ligands and Preliminary Experiments in Lectin Conjugation Reactions.

Subsequently, we implemented this synthetic strategy for the preparation of different classes of sugar polymers and, in particular, we focused our attention towards materials able to bind appropriate lectins. Concavalin A (Con A) was chosen as the model α-mannose-binding lectin, due to its involvement in a number of biological processes, with the bulk of literature focusing on both its chemical and biological behaviour.[80-84] Con A is an aggregate of 26 kDa monomeric units in higher order oligomeric structures. In the pH range 5.0-5.6, Con A exists exclusively as dimers, whilst at higher pH the dimers associate into tetramers with the tetramer being the predominant form at pH 7.0.[44] Each monomeric unit possesses one coordination site with the ability to selectively bind α-gluco- and α-mannopyranoside derivatives, with the manno-configuration at C2 preferred.[57, 85]

The alkyne functional homopolymer (4b) was used as the starting material for the parallel synthesis of a library of polymers differing only in the amount of Con A-binding mannose ligand, obtained by "co-clicking" reactions of appropriate mixtures of mannose and galactose-based azides (Scheme 3). The purpose of this was to study the binding ability of these new materials with the Con A lectin. In particular we were interested in deriving the influence the amount of mannopyranoside moieties have on the nature of polymer-protein interactions, in analogous study to that described by Kiessling and coworkers for multivalent displays prepared by ROMP polymerization.[61]

The "co-clicking" strategy is attractive as it allows for the preparation of a range of materials featuring identical macromolecular properties (polymer architecture, $M_n$, $M_w/M_n$) that only differ in their binding epitope density.[86] An added advantage relating to the use of this approach is that this functionalization of the polyalkyne materials can be carried out under extremely mild conditions using non-expensive starting materials easily obtainable in multi-gram scale. β-Galactopyranoside units were employed in order to dilute the mannopyranoside epitopes present on the multivalent polymer Scheme 2.

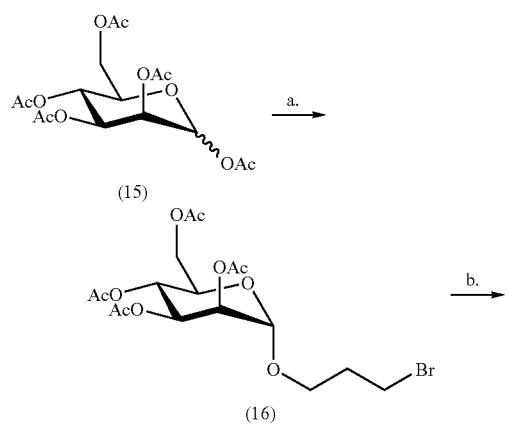

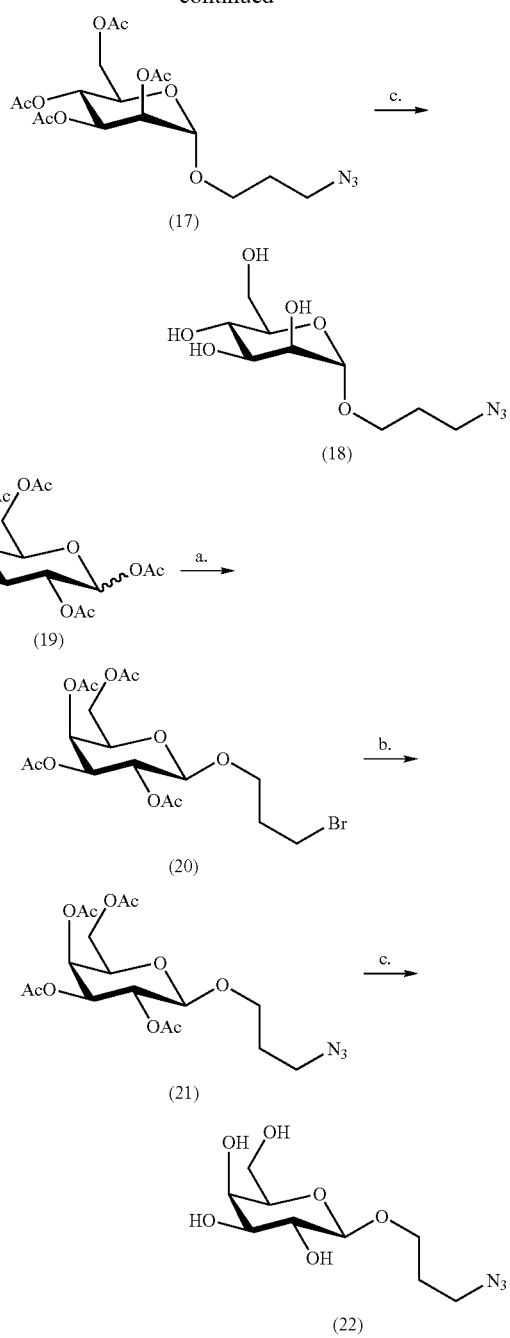

Reagents and conditions: a) 3-Bromo-1-propanol, BF$_3$·OEt$_2$, -20° C. to ambient temperature, b) NaN$_3$, DMF, 100° C., c) CH$_3$ONa (cat.), CH$_3$OH, ambient temperature.

ligands. Sugar azides are useful precursors normally employed for the synthesis of amino-sugar derivatives and were prepared following the synthetic protocol shown in Scheme 2. Briefly, a peracetylated hexose, either manno- or galacto-pyranose, was treated with 3-bromo-1-propanol in the presence of BF$_3$·OEt$_2$ to give the bromides (16) and (20) respectively. The desired azide functional monomers (18) and (22) were obtained by conversion of the bromide intermediates into the corresponding azides ((17) and (21)) and subsequent removal of the acetate protecting groups.

Scheme 3. Synthesis of the polymers employed for Con A binding studies, DP (x + y) = 90.

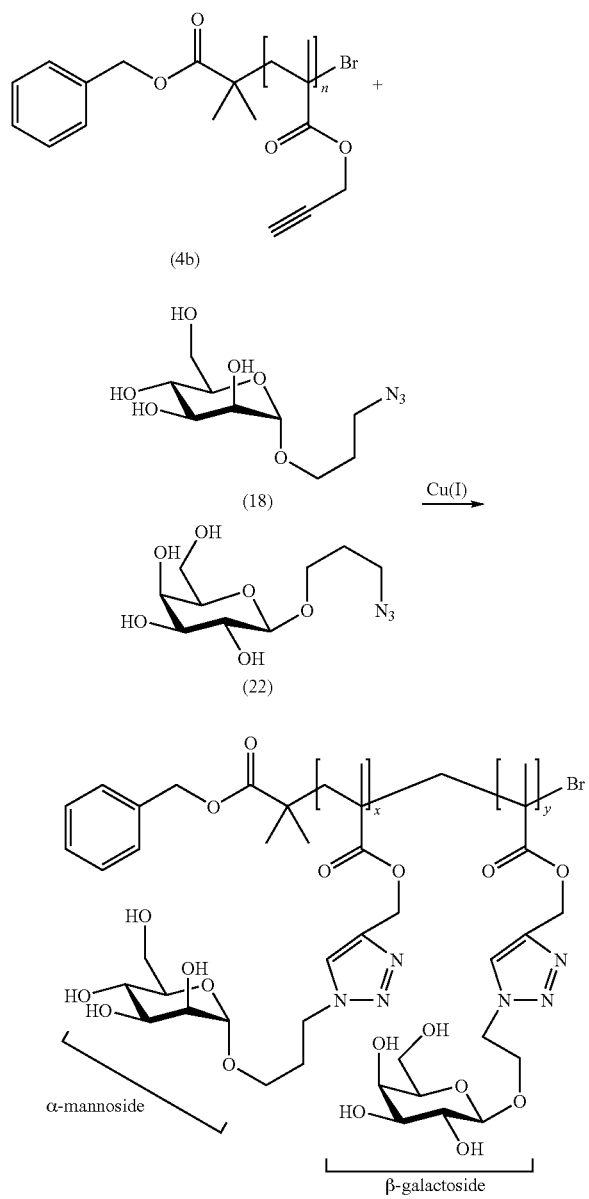

Experimental conditions employed for the co-clicking reactions were similar to those used for the synthesis of the polymers (5), (8) and (11) except that DMSO was employed as the solvent and triethylamine was used as the base.[87] SEC analysis of the product polymers in DMF eluent[88] showed that all of these polymers feature virtually identical molecular weights and molecular weight distributions. Again, the use of LALLS detection for the SEC analysis allowed us to determine the absolute weight-average molecular weight ($M_w$) of the polydentate ligands (Table 3).[89] Again, the results obtained matched the theoretical values expected for the glycopolymers products. $^1$H NMR analysis confirmed that the molar ratio of the two different sugar moieties in the polymers was essentially analogous to the (18):(22) initial ratio employed in the "co-clicking" reactions.

TABLE 3

Multivalent ligands: composition and macromolecular features.

| Polymer (code) | α-mannoside (%) | β-galactoside (%) | $M_w/M_n{}^a$ | $M_w$ (kDa)$^b$ |
|---|---|---|---|---|
| (23) | 100 | 0 | 1.10 | 37.7 |
| (24) | 75 | 25 | 1.10 | 39.3 |
| (25) | 50 | 50 | 1.10 | 37.3 |
| (26) | 25 | 75 | 1.10 | 37.7 |
| (27) | 0 | 100 | 1.10 | 38.1 |

$^a$Obtained by SEC analysis using DMF as eluent with DRI detection.
$^b$Obtained by SEC analysis using DMF as the mobile phase LALLS detection.

In biological processes the rate of the clustering events occurring at the cell surface is a crucial parameter, with a timescale that ranges from between seconds and hours.[61] The influence of the epitope density on the rate of ligand-lectin aggregation was assessed by a turbidrimetric assay[61, 90-92] and the results shown in FIG. 8. The clustering rates of Con A in the presence of an excess of different multivalent ligands was monitored by measuring changes in the absorbance at λ=420 nm of appropriate solutions of the lectin and functional polymers in HEPES buffer at pH 7.4. In the case of the fully mannose-functionalized polymer (23) the absorbance reached a plateau and remained almost constant until the end of the measurement, indicating that this multivalent ligand was able to quickly precipitate virtually all of the Con A present in solution.

When polymers featuring a lower epitope density were used, the observed absorbance increased continuously with time, consistent to that previously described by Kiessling for macromolecular ligands obtained by ROMP which was ascribed to higher order aggregation of partially soluble conjugates formed in the early stages of measurement.[61] The initial clustering rates were employed for the determination of aggregation rate constants, expressed as arbitrary units per minute (AU/min). The values obtained indicate that under these experimental conditions the rate of the clustering process decreased with a decrease in epitope density. A control experiment using the multivalent ligand (27) revealed that the fully galactopyranose-functionalized ligand was unable to precipitate the Con A lectin. Aggregates formed in these experiments were then treated with a large excess of α-methyl mannopyranoside, a competitive monodentate ligand, and the decrease in the absorbance with time was monitored. The stability of the polymer-lectin conjugates was directly proportional to the polymer epitope density (see supporting information).

Quantitative precipitation (QP) experiments were carried out in order to determine the stoichiometry of the polymer-Con A conjugates. Measurement of the polymer concentration necessary to quantitatively precipitate the lectin from a solution with known concentration of Con A allowed the determination of the average number of Con A tetramer bound by each polymer chain.[93] This was found to increase with an increase in the ligand mannose content increasing from 0 to 75% (Table 4).[94] Beyond this value the number of bound lectin tetramers appeared to remain constant, presumably indicating that for high epitope density steric effects may hamper further lectin coordination.[61]

TABLE 4

Quantitative Precipitation assay results for Con A with mannose containing polymers.

| Polymer (code) | % mannose | Con A units/polymer chain | mannose/Con A |
|---|---|---|---|
| (23) | 100 | 15 | 6.0 |
| (24) | 75 | 15 | 4.5 |
| (25) | 50 | 11 | 4.0 |
| (26) | 25 | 7 | 3.2 |

Synthesis of Fluorescent Multivalent Displays

The versatility of the strategy developed allows, in principle, to add a number of further different functionality into the polymer backbone, as long as the derivatives carrying the desired function contain the required azide group. The possibility of "co-clicking" a visibly fluorescent tag in the polymeric scaffold appeared attractive, as resulting multivalent ligands presenting both binding elements and a reporter unit are known for being extremely useful in protein-carbohydrate binding interaction studies.[95, 96] Fluorescent glycopolymers have been employed in a range of applications that including cell surface interactions,[97, 98] anticancer therapy,[99] lectin recognition analysis,[100, 101] PEGylation chemistry,[102] L-selectin binding[95] and spermatozoa stability studies.[103] Living radical polymerization can be used to prepare visibly fluorescent polymers by either employing a fluorescent initiator or monomer.[104]

Scheme 4: Synthesis of fluorescent multivalent ligands (29) and (30).

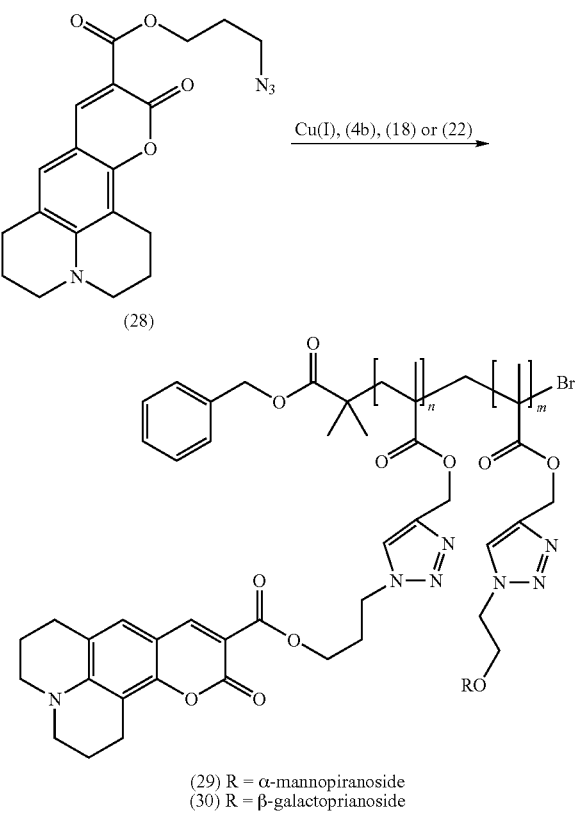

(29) R = α-mannopiranoside
(30) R = β-galactoprianoside

We chose to continue to use the benzyl bromoester (2) as initiator, as it allowed us to determine the molecular mass $M_n$(NMR) of the corresponding polymers and the visibly fluorescent tag was introduced via azide (28) (obtained in one step from Coumarin 343 and 3-azido-1-propanol) in the reaction feed, along with the unprotected azido-sugars (18) and (22). An important advantage in using dye (28) is that only a relatively small percentage was required to confer high fluorescence to the multivalent ligands.

Polymers (29) and (30) (Scheme 4) showed a maximum absorbance at $\lambda$=436 nm with maximum emission at $\lambda$=485 nm, showing a Stokes shift of 49 nm. Grafting of azide (28) onto the polymer backbone occurred with virtually no change in the glycopolymer macromolecular features, with (29) and (30) being analogous, apart from their fluorescence behaviour, to polymers (23) and (27), respectively (Table 5 and FIG. 5).

TABLE 5

Properties of the fluorescent polymers prepared in this study: Composition and macromolecular features

| Polymer | α-mannoside (%) | β-galactoside (%) | $M_w/M_n{}^a$ | $M_w{}^b$ |
|---|---|---|---|---|
| (29) | 100 | 0 | 1.15 | 38.8 |
| (30) | 0 | 100 | 1.16 | 38.1 |

The potential of these fluorescent glycopolymers as multivalent ligands was then qualitatively assessed. Solutions of the fluorescent displays were analysed by HPLC using a column packed with immobilized *Ricinus Communis* Agglutinin I (RCA I), a 120 kDa dimeric lectin isolated from *Ricinus communis* (castor bean), as the stationary phase,[105] with a fluorescence HPLC detector. RCA I interacts selectively with β-D-galactose units and was therefore chosen as a conjugating substrate that could complement the results previously obtained using α-D-mannose-binding Con A.

Preliminary attempts using 0.067 M PBS (pH 7.4) and 0.15 M NaCl as the mobile phase showed that whilst the mannoside-based polymer (29) was not retained by the column, the ligand (30) interacted with the RCA I stationary phase sufficiently strongly that it was not eluted at all. Thus further several mobile phases containing D-galactose in different concentrations were utilised. Due to its monotopic nature, D-galactose can only weakly interact with the RCA I receptors. However, if present in large excess it competes with the multivalent display (30) for RCA I coordination, and the use of decreasing galactose concentrations in the mobile phase resulted in increasing retention times, with peaks featuring a typical broad shape with tailing (FIG. 6). These results indicate that the galactose-containing display (30) is able to strongly interact with RCA I and the use of similar synthetic glycolopolymers as multidentate ligands will be the subject for further investigation.

CONCLUSION

In summary, a novel series of comb sugar polymers have been prepared by Huisgen 1,3 dipolar cycloaddition of appropriate sugar azides with poly(methacrylates) bearing terminal alkyne functionalities. These "clickable" materials have been prepared by TMM-LRP of trimethylsilyl-propargyl methacrylate with excellent control over the polymer properties, with $M_w/M_n$ of the purified products between 1.09-1.16. Removal of the TMS protecting groups was carried out under mild conditions with full retention of the terminal alkyne groups. The grafting of protected and unprotected carbohydrates either via a C-6 or an α or β anomeric azide onto the polymer backbone was successfully performed via Cu(I)-catalyzed click reaction. A number of mannose- and galactose-containing multidentate ligands for lectin binding studies displays were prepared by simultaneously reacting different sugar azides onto a polyalkyne methacrylate backbone. This "co-clicking" approach successfully coupled the advantages of controlled radical copolymerisation with a highly efficient post-functionalisation process, leading to a library of multivalent displays that only differ in their epitope density. In addition, fluorescent ligands were prepared by simply adding a visibly fluorescent azide tag, namely a Coumarin 343 derivative, to the reaction mixture. Their behaviour was then tested in the presence of model lectins able to selectively bind mannose (Con A) and galactose (RCA I) units. In the case of Con A this study showed that both the clustering rate and the stoichiometry of the polymer-protein conjugates depend on the epitope density of the displays employed.

The synthetic strategy proposed is quite general, as the protocol that had been successfully employed for the synthesis of sugar polymers can in principle be applied to a wide range of functional molecules, even ones containing functionalities that are not compatible with the conditions employed in TMM-LRP, opening the way for the synthesis of a wide range of precision materials. Moreover, in view of the biological application of carbohydrate polymers analogous to those described in the present work, the strategy appears to be an extremely powerful tool for the synthesis of libraries of materials that differ only in the nature of the sugar moiety presented on a well defined polymer scaffold.

Wang Resin Surface Functionlization Through [2+3] Huisgens Cycloaddition Process Experimental General. Polymerizations were carried out using standard Schlenk techniques under an inert atmosphere of nitrogen. FirstMate benchtop synthesizer (Argonaut Technologies Limited, New Road, Hengoed, Mid Glamorgan, UK) was used to carry out the resin modification, which is also carried out under nitrogen.

Characterization. Molecular weights and polydispersities were measured using size exclusion chromatography (SEC) from Polymer Laboratories. NMR spectra were obtained on a Bruker DPX300 and Bruker DPX400 spectrometer. Infrared absorption spectra were recorded on a Bruker VECTOR-22 FTIR spectrometer using a Golden Gate diamond attenuated total reflection cell. Field-Emission scanning electron microscopy (FE-SEM) and confocal microscopy are used to image the surface of resin. FE-SEM is from Joel JSM 6100, with an accelerating voltage of 10 kV and equipped with Oxford JSIS analytical system. HPLC-SEC and HPLC-FL spectra were determined by a HP 1050 UV-detector and a Hitachi L7480 FL-detector. Confocal microscopy experiments were performed on a Zeiss LSM 510 system. The 488 nm band of an argon-ion laser were used to excite the fluorescing materials. The filters in the experimental set-up were chosen to allow the measurement of the emitted fluorescence above 505 nm.

TMM-LRP of MMA and hostasol monomer. A sealed dried Schlenk flask containing Initiator 2-bromo-2-methyl-propionic acid 3-azido-propyl ester (Mantovani t al 2005, Chem Commun, 2089) methyl methacrylate (MMA), hostasol methacrylate, N-(n-propyl)-2-pyridyl methanimine and mesitylene as internal $^1$H NMR standard dissolved in toluene was degassed by four freeze-pump-thaw cycles. The solution was then transferred via cannula to another Schlenk tube containing CuBr previously evacuated and filled with $N_2$. The polymerization was carried out at 90° C.

Wang resin-alkyne synthesis. Using a FirstMate benchtop synthesizer, the Wang resin was wetted with anhydrous pyridine and 4-dimethylaminopyridine for 1 h, thereafter the alkyne-ester was added. The reaction mixture was then heated to 60° C. and kept at this temperature for 20 h.

Click reaction to Wang resin. The reaction tube containing Wang resin, (PPh$_3$)CuBr and azide terminated materials in toluene solution was heated to 70° C. under nitrogen and reacted overnight. The beads were taken out, filtered and rinsed thoroughly.

Results and Discussion

Scheme:

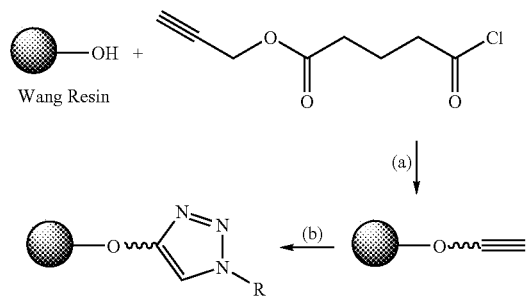

Reagents and conditions: a) anhydrous pyridine, DMAP, b) PPh$_3$/Cu(I)Br, R—N$_3$, 60° C., (R = Poly(MMA-co-hostasol), D-mannose).

A schematic representation of the "click" reaction between azide polymer/sugar and the alkyne modified resin is shown in the scheme. The alkyne-ester was obtained by the treatment of glutaric anhydride and propargyl alcohols with DMAP in a refluxing dichloromethane solution and through subsequent halogenation of the product with oxalyl dichloride. The native Wang resin was then treated with the alkyne-ester, giving alkyne functionalized Wang resin, which is then used to "click" with azide terminal poly(MMA-co-hostasol) and D-mannose.

Poly(MMA-co-hostasol) has been synthesized by TM-LRP of MMA and hostasol methacrylate using 2-bromo-2-methyl-propionic acid 3-azido-propyl ester as the initiator, giving excellent first order kinetic plots, indicating a constant concentration of propagating radicals, and a good control over the polymer weight and molecular weight distribution is also observed (FIG. 11). Hostasol methacrylate (Tronc et al, J. Polym. Sci, Part A, Polym Chem. 2003, 41, 766) was employed as visibly fluorescent co-monomer to give fluorescent tagged PMMA, which facilitated the characterization of the corresponding Wang resin-polymer hybrid materials using fluorescence analytical techniques. D-Mannose azide has been obtained in two steps: a peracetylated mannose was treated with 3-bromo-1-propanol in the presence of BF$_3$.OEt$_2$ to give a bromide intermediate, which is then converted into azides and subsequent removal of the acetate protecting groups give the desired azide functional mannose. (Ladmiral et al J. Am. Chem. Soc 1006, 128, 4823). These azide functional materials were then "clicked" to the preformed Wang resin surface in the presence of (PPh$_3$)CuBr. The complete conversion of the resin alkyne units as well as the sugar azides into triazole was confirmed by IR, showing the difference between native resin and resin-alkyne and resin-polymer/sugar. SEM analysis also showed difference between the native Wang resin and modified one. For poly(MMA-co-hostasol) modified resin, confocal spectroscopy was also used to confirm the successful reaction (FIG. 13a).

The mannose-modified Wang resin has been used to test its binding ability of certain lectin. Concavalin A (Con A) was chosen as the model D-mannose binding lectin, due to its involvement in a number of biological processes. To facilitate monitoring, a fluorescein isothiocyanate-conjugated ConA (FITC-Con A) was used. A flush and flow column system was employed using the mannose-modified Wang resin as a filling in a small pipette, a 1 M FITC-Con A solution was used as eluent, the solution after column was collected for analysis. The result shown in FIG. 12 indicates its binding ability to FITC-Con A, as an intensity decrease have been observed both by the HPLC and Fluorescent detector, using the same amount of sample before and after column. This is also confirmed by confocal spectroscopy (FIG. 13b), indicating a successful absorption of FITC-Con A by the mannose modified Wang resin.

More accessible mannose on the surface is expected to increase the binding ability of the mannose modified Wang resin for certain lectin like Con A. Bearing this in mind, a comb alkyne monomer is being polymerized from the resin surface and click with D-mannose, and its binding ability is under further investigation. A test using rat serum will also be carried out to confirm the potential protein recognition/separation applications of these mannose-modified Wang resin.

Further Data Showing the Production of Galactose- and Lactose-Functionalised Polymers.

(A) Procedure for the Synthesis of a Galactose Functional Polymer

1. Synthesis of Galactose Azide

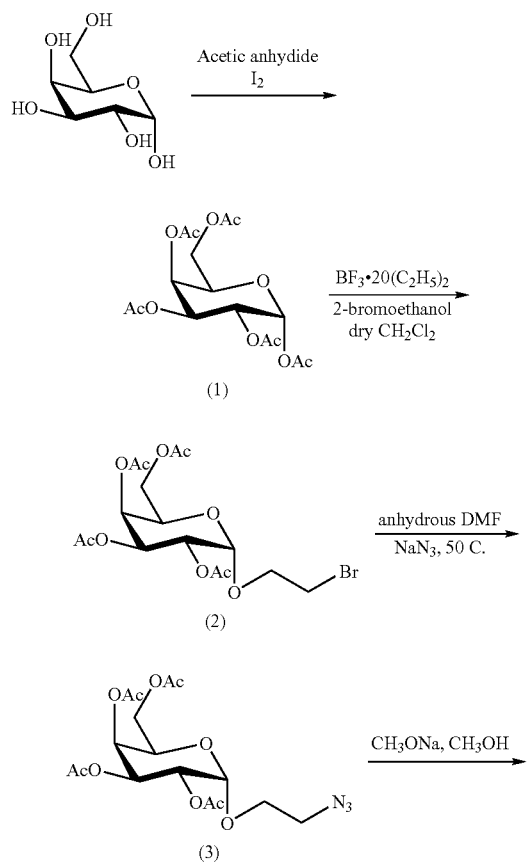

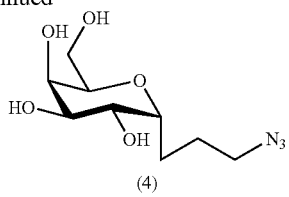

(4)

(1)[1] 25 mL acetic anhydride mixed with 9.01 g (0.049 mol) D-galactose, and stirred for 5 min. Solid iodine (0.08712 g, 0.34 mmol) was added into the mixture. After the solution had cooled to the ambient temperature, 100 mL $CH_2Cl_2$ was added and the resulting solution was stirred for 10 min. Then the reaction mixture was neutralized by adding saturated sodium bicarbonate solution (3×100 cm$^3$) and the resulting solution was washed with deionised water (2×200 cm$^3$). The combined organic layers were dried over sodium sulfate, filtered and the volatiles removed under reduced pressure. Yield obtained=18.01 g (92%).

(2)[2] A solution of boron trifluoride etherate (25.99 cm$^3$, 205.10 mmol) and (1) (17.25 g, 44.11 mmol) and 2-bromoethanol (7.42 cm$^3$, 102.40 mmol) in dry $CH_2Cl_2$ (250 cm$^3$) was stirred in the dark under a nitrogen atmosphere overnight. TLC analysis, using ethyl acetate/petroleum/ether (1:2, v/v), showed that the reaction had gone to completion (starting material $R_f$ 0.53, product $R_f$ 0.63). 200 cm$^3$ $CH_2Cl_2$ was added, then the reaction mixture was neutralized by adding saturated sodium bicarbonate solution (3×100 cm$^3$) and the resulting solution was washed with deionised water (2×200 cm$^3$). The combined organic layers were dried over magnesium sulfate, filtered and the volatiles removed under reduced pressure. The crude product was purified by flash chromatography (CC, $SiO_2$, ethyl acetate/petroleum ether (1:4, v/v). The relevant fractions were collected, combined and volatiles removed under reduced pressure. Yield obtained=10.05 g (50.13%) colorless powder.

(3): A solution of (2) (10.028 g, 20.03 mmol) in anhydrous DMF (100 cm$^3$) was treated with sodium azide (8.59 g, 130.22 mmol) and the reaction mixture stirred at 50 C overnight. TLC analysis, using ethyl acetate/petroleum ether (1:1, v/v), showed that the reaction had gone to completion (starting material $R_f$ 0.69, product $R_f$ 0.60). The reaction mixture was concentrated to dryness under reduced pressure, dissolved in $CH_2Cl_2$ (50 cm$^3$) and then washed with deionised water (4×50 cm$^3$). The combined organic layers were dried over magnesium sulfate, filtered and the volatiles removed under reduced pressure. The crude product was purified by flash chromatography (CC, $SiO_2$, ethyl acetate/petroleum ether (1:1, v/v). The relevant fractions were collected, combined and concentrated to dryness under reduced pressure. Yield obtained=8.08 g (96.73%) colorless crystals.

(4): (3) (8.01 g, 19.2 mmol) was dissolved in 100 cm$^3$ methanol. Sodium methoxide (25% Wt in methanol) (21.9 cm$^3$, 96.01 mmol) was added, the mixture stirred at ambient temperature for 3 h. Amberlite IR-120 (PLUS) ion-exchange resin was added and stirred with the reaction mixture for 30 min. The resin was removed by filteration and the resulting solution concentrated to dryness in reduced pressure. Yield obtained=4.62 g (81.56%) colorless crystals.

2. Synthesis of Glycopolymer

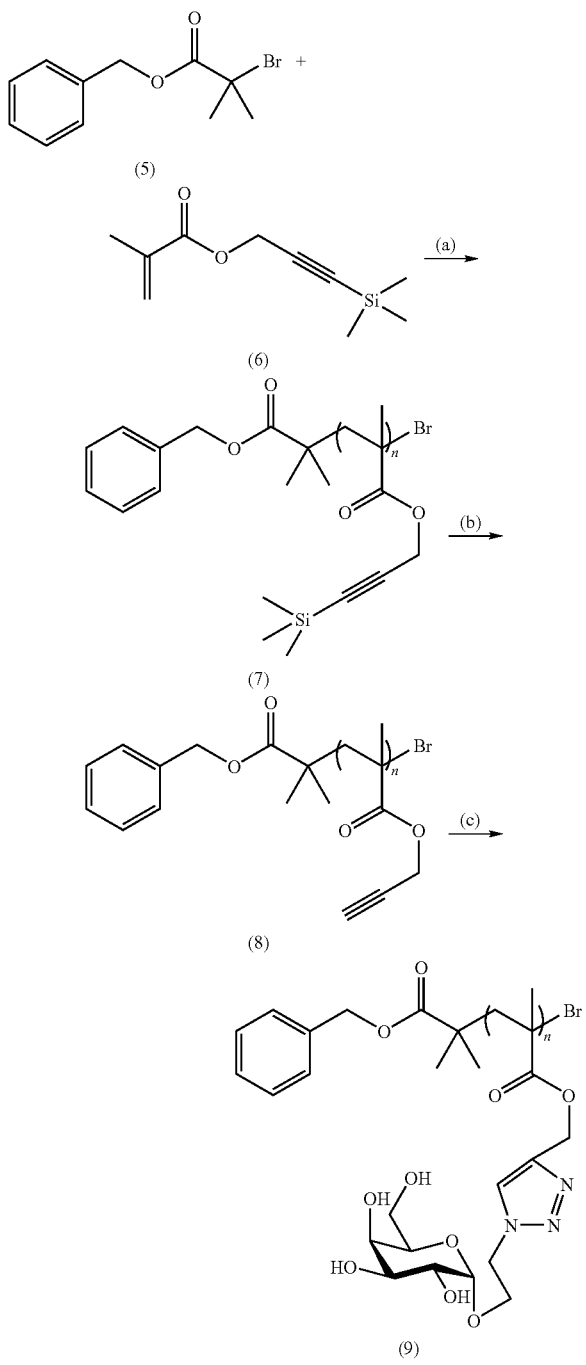

Reagents and conditions. a) N-(n-Ethyl)-2-pyridylmethanimine/CuBr, toluene, 70° C.; b) TBAF, acetic acid, THF, −20 to 25° C.; c) 2'-Azidoethyl-O-α-D-galactopyranoside (4), (PPh$_3$)$_3$CuBr, Et$_3$N.

2-Methyl-acrylic acid 3-trimethylsilanyl-prop-2-ynyl ester (6)$_3$: A solution of trimethylsilyl propyn-1-ol (10.0 g, 78.0 mmol) and Et$_3$N (14.2 mL, 101.3 mmol) in Et$_2$O (100 mL) was cooled to −20° C. and a solution of methacryloyl chloride (8.8 mL, 93 mmol) in Et$_2$O (50 mL) was added dropwise over ca. 1 h. The mixture was stirred at this temperature for 30 min, then at ambient temperature overnight; the ammonium salts were removed by filtration and the volatiles removed under reduced pressure. The crude product was purified by flash chromatography (CC, SiO$_2$, petroleum ether/Et$_2$O 50:1; R$_f$=0.67 in petroleum ether/Et$_2$O 50:1). Obtained 12.4 g (63.2 mmol, 81%)

(a) General polymerization procedure. Synthesis of (7): N-(Ethyl)-2-pyridylmethanimine ligand (0.072 mL, 0.51 mmol), (6) (2.0 g, 10.2 mmol), initiator (5) (0.065 g, 0.25 mmol) and mesitylene (internal NMR standard, 0.5 mL) were charged into a dry Schlenk tube along with toluene (4.0 mL) as solvent. The tube was sealed with a rubber septum and subjected to five freeze-pump-thaw cycles. This solution was then cannulated under nitrogen into a second Schlenk tube, previously evacuated and filled with nitrogen, containing Cu(I)Br (0.036 g, 0.25 mmol) and a magnetic follower. The temperature was adjusted to 70° C. with constant stirring (t=0). Samples were removed periodically using a degassed syringe for molecular weight and conversion analysis. At the end of the polymerization the mixture was diluted with 10 mL of toluene and air was bubbled through for 4 h. The reaction mixture was passed through a short neutral alumina column and subsequently washed with toluene. The volatiles were removed under reduced pressure and the residues dissolved in THF (ca. 10 mL) prior to precipitation into 10:2 vol/vol methanol/water mixture (ca. 200 mL). The white solid was isolated by filtration, washed with additional methanol/water mixture and volatiles removed under reduced pressure. The molecular weight of the polymer was calculated by $^1$H NMR by comparing the integral of the initiator benzylic signal at 5.1 ppm to that of the C(O)OCH$_2$ group connected to the alkyne branches, at 4.4 ppm. Virtually identical molecular weights were obtained when the singlet of the Si(CH$_3$)$_3$ at 0.2 ppm was used instead of 4.4 ppm. The conversions were calculated via $^1$H NMR by following the decreasing of the integrals of the monomer vinyl signals (5.6 and 6.2 ppm), using the peak of mesitylene (6.9 ppm) as internal standard. Alternatively, the conversions were calculated by comparison between the integrals relative to the C(O)OCH$_2$ protons of the monomer (bs, 4.6 ppm, decreasing with time) and the analogous C(O)OCH$_2$ protons relative to the polymer (broad signal, 4.4 ppm increasing with time). DP(NMR)=75; M$_n$(NMR) 14.7 kDa; M$_w$/M$_n$ (GPC)=1.15 initiating efficiency=41%; Conversion=82%.

(b) Polymer deprotection. General procedure: The trimethyl silyl protected polymer (1.5 g, 7.653 mmol alkyne-trimethylsilyl groups) and acetic acid (2.19 mL, 0.0382 mol, 5 eq. to the alkyne-trimethylsilyl groups) were dissolved in THF (100 mL). Nitrogen was bubbled (ca. 10 min) and the solution was cooled to −20° C. A 0.20 M solution of TBAF.3H$_2$O (0.0114 mol, 1.5 eq to the alkyne-trimethylsilyl groups) was added dropwise in ca. 20 min. The resulting turbid mixture was stirred at this temperature for 30 min and then warmed to ambient temperature. After stirring overnight Amberlite IR-120 (PLUS) ion-exchange resin was added and stirred with the reaction mixture for 30 min. The resin was then filtered off under gravity and the resulting solution concentrated to dryness in reduced pressure and the polymer was precipitated in petroleum ether. Yield obtained=0.46 g (48%) colorless powder.

(c) Synthesis of (9): A solution of polymer (8) (50 mg, 0.40-mmol of "clickable" alkyne units), the azido-sugar (4) (225 mg, 0.604 mmol) and triethylamine (26 mg, 35 μL, 0.20 mmol) in THF (5 mL) was degassed by bubbling nitrogen for 10 min. [(PPh$_3$)$_3$CuBr] (37.5 mg, 0.402 mmol) was then added and nitrogen was bubbled into the resulting solution for a further 5 min. The very pale yellow clear solution was stirred at ambient temperature for 3 days and then passed through a short neutral alumina pad eluting with THF. The resulting solution was concentrated under reduced pressure and precipitated into petroleum ether (200 mL). The suspension was centrifugated and the solid obtained redissolved in THF. The solution was stirred for 1 h in the presence of ion exchange resin, filtered and precipitated again in 1:1 Et$_2$O/petroleum ether mixture (150 mL). The solid was separated by centrifugation to give the polymer.

3. References

1. Mukhopadhyay, B.; Kartha, K. P. R.; Russell, D. A.; Field, R. A., Streamlined *Synthesis of Per-O-acetylated Sugars, Glycosyl Iodides, or Thioglycosides from Unprotected Reducing Sugars*. J. Org. Chem. 2004, 69, (22), 7758-7760.

2. Hayes, W.; Osborn, H. M. I.; Osborne, S. D.; Rastall, R. A.; Romagnoli, B., *One-pot synthesis of multivalent arrays of mannose mono-and disaccharides*. Tetrahedron 2003, 59, (40), 7983-7996.

3. Ladmiral, V.; Mantovani, G.; Clarkson, G. J.; Cauet, S.; Irwin, J. L.; Haddleton, D. M., *Synthesis of Neoglycopolymers by a Combination of \"Click Chemistry\" and Living Radical Polymerization*. J. Amer. Chem. Soc. 2006, 128, (14), 4823-4830.

(B) Procedure for Lactose Functional Polymer

1. Synthesis of Lactose Azide

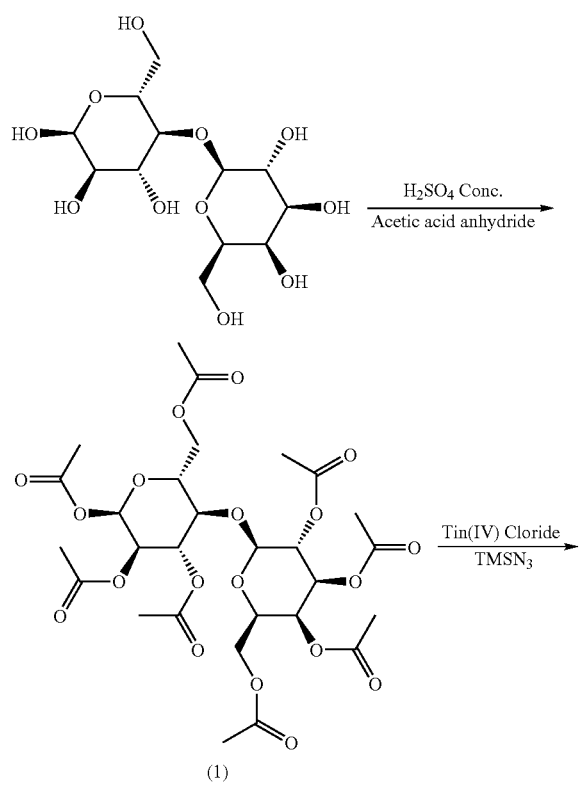

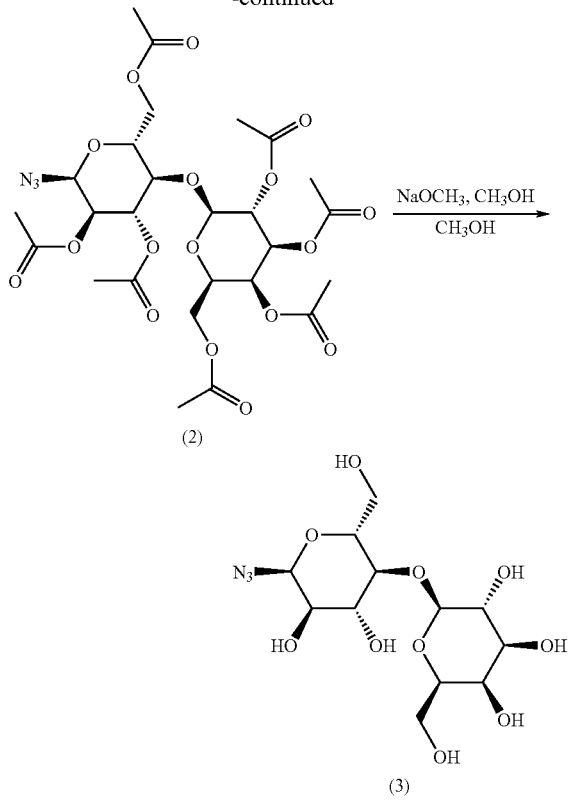

Reagents and conditions. a) H$_2$SO$_4$, acetic acid anhydride; b) Trimethylsilyl azide, tin(IV) chloride, DCM; c)CH$_3$ONa (cat.), CH$_3$OH, ambient temperature.

(a). Acetic acid anhydride (28.50 mL 0.513 mol) were mixed with (18 g 0.052 mol) D-lactose and stirred for 5 min. Three drops of concentrated sulfuric acid were added into the mixture. After the solution was cooled down to ambient temperature, 100 mL CH$_2$Cl$_2$ was added and the resulting solution stirred for 10 min. Then the reaction mixture was neutralized by adding saturated sodium bicarbonate solution (3×100 cm$^3$) and the resulting solution washed with brine (2×200 cm$^3$). The combined organic layers were dried over sodium sulfate, filtered and the volatiles removed under reduced pressure. Yield obtained=32.01 g (89%).

(b). Into a solution of (1) (4.14 g, 6.106 mmol) in dry DCM (50 mL) was first injected trimethylsilyl azide (1.606 mL, 12.211 mmol) and tin (IV) chloride (0.428 ml, 3.657 mmol) was added under nitrogen. The mixture was stirred at ambient temperature for 12 h. After the mixture was concentrated under reduced pressure, the crude product was purified by flash chromatography (CC, SiO$_2$, ethyl acetate/petroleum ether (1:1, v/v). The relevant fractions were collected, combined and concentrated to dryness under reduced pressure. Yield obtained=3.67 g (91%) colorless powder.

(c). Into a solution of (2) (3.66 g, 5.532 mmol) in 150 cm$^3$ methanol was added sodium methoxide (25% wt in methanol) (21.9 cm$^3$, 96.01 mmol). The mixture was stirred at ambient temperature for 3 h. Amberlite IR-120 (PLUS) ion-exchange resin was added and stirred with the reaction mixture for 30 min. The resin was then removed by filtration and the resulting solution concentrated under reduced pressure. The crude product was purified by flash chromatography (CC, SiO$_2$, ethyl methanol/DCM (1:2, v/v). The relevant fractions were collected, combined and concentrated to dryness under reduced pressure. Yield obtained=1.52 g (75%) white powder.

2. Synthesis of Glycopolymer

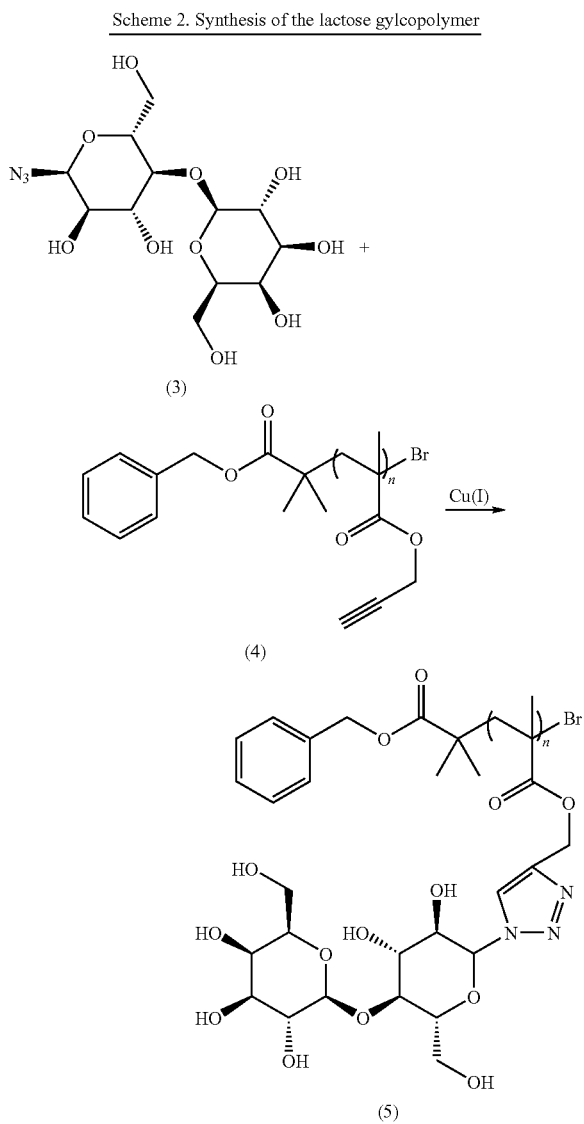

A solution of polymer (4) (0.012 g, 0.092 mmol of "clickable" alkyne units) and azido-lactose (3) (0.030 g, 0.097 mmol, 1.05 eq. to the alkyne units) were dissolved in 10 mL of DMSO, and tris-(1-butyl-1H-[1,2,3]triazol-4-ylmethyl)-amine (0.035 g, 0.0816 mmol) was degassed by bubbling nitrogen for 20 min. Cu(I) (0.030 g, 0.081 mmol) was then added under nitrogen. The resulting solution was stirred at ambient temperature for 3 days, then ion exchange resin was added and the suspension gently stirred at ambient temperature. After filtration the solution was added dropwise to H$_2$O and the polymer separated by centrifugation. Then the supernatant was collected, the solution was put into dialysis tubing (NMWCO cut off=8,000 Da) and dialyzed against water for more than 20 hours with the water being changed 3 times. The aqueous solution was then freeze-dried to give the glycopolymer (5) as a white solid.

REFERENCES

1. Kolb, H. C.; Finn, M. G.; Sharpless, K. B., *Angew. Chem., Int. Ed.* 2001, 40, (11), 2004-2021.
2. Kolb, H. C.; Sharpless, K. B., *Drug Discov. Today* 2003, 8, (24), 1128-1137.
3. Rostovtsev, V. V.; Green, L. G.; Fokin, V. V.; Sharpless, K. B., *Angew. Chem., Int. Ed.* 2002, 41, (14), 2596-2599.
4. Tornoe, C. W.; Christensen, C.; Meldal, M., *J. Org. Chem.* 2002, 67, (9), 3057-3064.
5. Wu, P.; Feldman Alina, K.; Nugent Anne, K.; Hawker Craig, J.; Scheel, A.; Voit, B.; Pyun, J.; Frechet Jean, M. J.; Sharpless, K. B.; Fokin Valery, V., *Angew. Che., Int. Ed.* 2004, 43, (30), 3928-3932.
6. Malkoch, M.; Schleicher, K.; Drockenmuller, E.; Hawker, C. J.; Russell, T. P.; Wu, P.; Fokin, V. V., *Macromolecules* 2005, 38, (9), 3663-3678.
7. Joralemon, M. J.; Nugent, A. K.; Matson, J. B.; O'Reilly, R. K.; Hawker, C. J.; Wooley, K. L., *Polym. Mater. Sci. Eng.* 2004, 91, 195.
8. Mynar, J. L.; Choi, T.-L.; Yoshida, M.; Kim, V.; Hawker, C. J.; Frechet, J. M. J., *Chem. Commun.* 2005, (41), 5169-5171.
9. Dirks, A. J.; van Berkel, S. S.; Hatzakis, N. S.; Opsteen, J. A.; van Delft, F. L.; Cornelissen, J. J. L. M.; Rowan, A. E.; van Hest, J. C. M.; Rutjes, F. P. J. T.; Nolte, R. J. M., *Chem. Commun.* 2005, (33), 4172-4174.
10. Wang, Q.; Chan, T. R.; Hilgraf, R.; Fokin, V. V.; Sharpless, K. B.; Finn, M. G., *J. Am. Chem. Soc.* 2003, 125, (11), 3192-3193.
11. Link, A. J.; Tirrell, D. A., *J. Am. Chem. Soc.* 2003, 125, (37), 11164-11165.
12. Speers, A. E.; Adam, G. C.; Cravatt, B. F., *J. Am. Chem. Soc.* 2003, 125, (16), 4686-4687.
13. Lee, L. V.; Mitchell, M. L.; Huang, S.-J.; Fokin, V. V.; Sharpless, K. B.; Wong, C.-H., *J. Am. Chem. Soc.* 2003, 125, (32), 9588-9589.
14. Manetsch, R.; Krasinski, A.; Radic, Z.; Raushel, J.; Taylor, P.; Sharpless, K. B.; Kolb, H. C., *J. Am. Chem. Soc.* 2004, 126, (40), 12809-12818.
15. Krasinski, A.; Radic, Z.; Manetsch, R.; Raushel, J.; Taylor, P.; Sharpless, K. B.; Kolb, H. C., *J. Am. Chem. Soc.* 2005, 127, (18), 6686-6692.
16. Helms, B.; Mynar, J. L.; Hawker, C. J.; Frechet, J. M. J., *J. Am. Chem. Soc.* 2004, 126, (46), 15020-15021.
17. Opsteen, J., A.; van Hest, J. C. M., *Chem. Commun.* 2005, (1), 57-59.
18. O'Reilly, R. K.; Hawker, C. J.; Wooley, K. L., *Polym. Prepr. (Am. Chem. Soc., Div. Polym. Chem.)* 2004, 45, (1), 780.
19. Mantovani, G.; Ladmiral, V.; Tao, L.; Haddleton, D. M., *Chem. Commun.* 2005, (16), 2089-2091.
20. Sumerlin, B. S.; Tsarevsky, N. V.; Louche, G.; Lee, R. Y.; Matyjaszewski, K., *Macromolecules* 2005, 38, (18), 7540-7545.
21. Punna, S.; Kaltgrad, E.; Finn, M. G., *Bioconjugate Chem.* 2005, 16, (6), 1536-1541.
22. Fazio, F.; Bryan, M. C.; Blixt, O.; Paulson, J. C.; Wong, C.-H., *J. Am. Chem. Soc.* 2002, 124, (48), 14397-14402.
23. Hotha, S.; Anegundi, R. I.; Natu, A. A., *Tetrahedron Lett.* 2005, 46, (27), 4585-4588.
24. Doerner, S.; Westermann, B., *Chem. Commun.* 2005, (22), 2852-2854.
25. Perez-Balderas, F.; Ortega-Munoz, M.; Morales-Sanfrutos, J.; Hernandez-Mateo, F.; Calvo-Flores, F. G.; Calvo-Asin, J. A.; Isac-Garcia, J.; Santoyo-Gonzalez, F., *Org. Lett.* 2003, 5, (11), 1951-1954.
26. Casas-Solvas, J. M.; Vargas-Berenguel, A.; Capitan-Vallvey, L. F.; Santoyo-Gonzalez, F., *Org. Lett.* 2004, 6, (21), 3687-3690.

27. Kuijpers, B. H. M.; Groothuys, S.; Keereweer, A. R.; Quaedflieg, P. J. L. M.; Blaauw, R. H.; van Delft, F. L.; Rutjes, F. P. J. T., *Org. Lett.* 2004, 6, (18), 3123-3126.
28. Lin, H.; Walsh, C. T., *J. Am. Chem. Soc.* 2004, 126, (43), 13998-14003.
29. Bodine, K. D.; Gin, D. Y.; Gin, M. S., *Org. Lett.* 2005, 7, (20), 4479-4482.
30. Dove, A., *Nat. Biotechnol.* 2001, 19, (10), 913-7.
31. Kiessling, L. L.; Cairo, C. W., *Nat. Biotechnol.* 2002, 20, (3), 234-235.
32. Tirrell, D. A., *Nature* 2004, 430, (7002), 837.
33. Dwek, R. A., *Chem, Rev.* 1996, 96, (2), 683-720.
34. Ambrosi, M.; Cameron, N. R.; Davis, B. G., *Org. Biomol. Chem.* 2005, 3, (9), 1593-1608.
35. Bertozzi, C. R.; Kiessling, L. L., *Science* 2001, 291, (5512), 2357-64.
36. Rademacher, T. W.; Parekh, R. B.; Dwek, R. A., *Annu. Rev. Biochem.* 1988, 57, 785-838.
37. Tropper, F. D.; Romanowska, A.; Roy, R., *Methods enzymol.* 1994, 242, 257-71.
38. Roy, R.; Laferriere, C. A.; Pon, R. A.; Gamian, A., *Methods enzymol.* 1994, 247, 351-61.
39. Wang, Q.; Dordick, J. S.; Linhardt, R. J., *Chem. Mater.* 2002, 14, (8), 3232-3244.
40. Ladmiral, V.; Melia, E.; Haddleton, D. M., *Eur. Polym. J.* 2004, 40, (3), 431-449.
41. Kiessling, L. L.; Pohl, N. L., *Chem. Biol.* 1996, 3, (2), 71-7.
42. Lundquist, J. J.; Toone, E. J., *Chem. Rev.* 2002, 102, (2), 555-578.
43. Lee, Y. C.; Lee, R. T., *Acc. Chem. Res.* 1995, 28, (8), 321-7.
44. Dimick, S. M.; Powell, S. C.; McMahon, S. A.; Moothoo, D. N.; Naismith, J. H.; Toone, E. J., *J. Am. Chem. Soc.* 1999, 121, (44), 10286-10296.
45. Narain, R.; Armes Steven, P., *Chem. Commun.* 2002, (23), 2776-7.
46. Ohno, K.; Tsujii, Y.; Fukuda, T., *J. Polym. Sci., Part A: Polym. Chem.* 1998, 36, (14), 2473-2481.
47. Ohno, K.; Tsujii, Y.; Miyamoto, T.; Fukuda, T.; Goto, M.; Kobayashi, K.; Akaike, T., *Macromolecules* 1998, 31, (4), 1064-1069.
48. Grande, D.; Baskaran, S.; Chaikof, E. L., *Macromolecules* 2001, 34, (6), 1640-1646.
49. Gotz, H.; Harth, E.; Schiller, S. M.; Frank, C. W.; Knoll, W.; Hawker, C. J., *J. Polym. Sci., Part A: Polym. Chem.* 2002, 40, (20), 3379-3391.
50. Lowe, A. B.; Sumerlin, B. S.; McCormick, C. L., *Polymer* 2003, 44, (22), 6761-6765.
51. Muthukrishnan, S.; Zhang, M.; Burkhardt, M.; Drechsler, M.; Mori, H.; Mueller, A. H. E., *Macromolecules, ACS ASAP.*
52. Gupta, S. S.; Raja, K. S.; Kaltgrad, E.; Strable, E.; Finn, M. G., *Chem. Commun.* 2005, (34), 4315-4317.
53. Very few example of "clickable" polymers have been reported to date: a). Helms, B.; Mynar, J. L.; Hawker, C. J.; Frechet, J. M. J., *J. Am. Chem. Soc.* 2004, 126, (46), 15020-15021. b). Malkoch, M.; Thibault, R. J.; Drockenmuller, E.; Messerschmidt, M.; Voit, B.; Russell, T. P.; Hawker, C. J., *J. Am. Chem. Soc.* 2005, 127, (42), 14942-14949. c) Sumerlin, B. S.; Tsarevsky, N. V.; Louche, G.; Lee, R. Y.; Matyjaszewski, K., *Macromolecules* 2005, 38, (18), 7540-7545.
54. Kamigaito, M.; Ando, T.; Sawamoto, M., *Chem. Rev.* 2001, 101, (12), 3689-3745.
55. Matyjaszewski, K.; Xia, J., *Chem. Rev.* 2001, 101, (9), 2921-2990.
56. Ladmiral, V.; Mantovani, G.; Haddleton, D. M. umpublished results
57. Mortell, K. H.; Weatherman, R. V.; Kiessling, L. L., *J. Am. Chem. Soc.* 1996, 118, (9), 2297-8.
58. Strong, L. E.; Kiessling, L. L., *J. Am. Chem. Soc.* 1999, 121, (26), 6193-6196.
59. Choi, S.-K.; Mammen, M.; Whitesides, G. M., *J. Am. Chem. Soc.* 1997, 119, (18), 4103-4111.
60. Ambrosi, M.; Cameron, N. R.; Davis, B. G.; Stolnik, S., *Org. Biomol. Chem.* 2005, 3, (8), 1476-1480.
61. Cairo, C. W.; Gestwicki, J. E.; Kanai, M.; Kiessling, L. L., *J. Am. Chem. Soc.* 2002, 124, (8), 1615-1619.
62. Kanai, M.; Mortell, K. H.; Kiessling, L. L., *J. Am. Chem. Soc.* 1997, 119, (41), 9931-9932.
63. Gestwicki, J. E.; Strong, L. E.; Kiessling, L. L., *Angew. Chem., Int. Ed.* 2000, 39, (24), 4567-4570.
64. Schuster, M. C.; Mortell, K. H.; Hegeman, A. D.; Kiessling, L. L., *J. Mol. Catal. A: Chem.* 1997, 116, (1-2), 209-216.
65. Manning, D. D.; Hu, X.; Beck, P.; Kiessling, L. L., *J. Am. Chem. Soc.* 1997, 119, (13), 3161-3162.
66. Mann, D. A.; Kanai, M.; Maly, D. J.; Kiessling, L. L., *J. Am. Chem. Soc.* 1998, 120, (41), 10575-10582.
67. Pontrello, J. K.; Allen, M. J.; Underbakke, E. S.; Kiessling, L. L., *J. Am. Chem. Soc.* 2005, 127, (42), 14536-14537.
68. Gestwicki, J. E.; Cairo, C. W.; Strong, L. E.; Oetjen, K. A.; Kiessling, L. L., *J. Am. Chem. Soc.* 2002, 124, (50), 14922-14933.
69. Kiessling, L. L.; Gestwicki, J. E.; Strong, L. E., *Curr. Opin. Chem. Biol.* 2000, 4, (6), 696-703.
70. Gestwicki, J. E.; Strong, L. E.; Cairo, C. W.; Boehm, F. J.; Kiessling, L. L., *Chem. Biol.* 2002, 9, (2), 163-169.
71. Lamanna, A. C.; Gestwicki, J. E.; Strong, L. E.; Borchardt, S. L.; Owen, R. M.; Kiessling, L. L., *J. Bacteriol.* 2002, 184, (18), 4981-4987.
72. Gestwicki, J. E.; Strong, L. E.; Borchardt, S. L.; Cairo, C. W.; Schnoes, A. M.; Kiessling, L. L., *Bioorg. Med. Chem.* 2001, 9, (9), 2387-2393.
73. Gestwicki, J. E.; Kiessling, L. L., *Nature* 2002, 415, (6867), 81-84.
74. Gordon, E. J.; Sanders, W. J.; Kiessling, L. L., *Nature* 1998, 392, (6671), 30-31.
75. Sanders, W. J.; Gordon, E. J.; Dwir, O.; Beck, P. J.; Alon, R.; Kiessling, L. L., *J. Biol. Chem.* 1999, 274, (9), 5271-5278.
76. Hovestad, N. J.; van Koten, G.; Bon, S. A. F.; Haddleton, D. M., *Macromolecules* 2000, 33, (11), 4048-4052.
77. Haddleton, D. M.; Jasieczek, C. B.; Hannon, M. J.; Shooter, A. J., *Macromolecules* 1997, 30, (7), 2190-2193.
78. Ostuni, E.; Yan, L.; Whitesides, G. M., *Colloids Surf., B* 1999, 15, (1), 3-30.
79. The use of acetic acid in combination with TBAF is a well established procedure in organic chemistry that is used when the substrate to deprotect contains functional group (esters, thioesters.) that can be cleaved when TBAF alone is employed. See for example: a) molecules containing esters: Stone, M. T.; Moore, *J. S. Org. Lett.,* 2004, 6, (4), 469-472. b) molecules containing thioesters Chanteau, S. H.; Tour J. M. *J. Org. Chem.* 2003, 68, 8750-8766
80. Lin, S. S.; Levitan, I. B., *Trends Neurosci.* 1991, 14, (7), 273-7.
81. Phondke, G. P.; Sainis, K. B.; Joshi, N. N., *J. Biosci.* 1983, 5, (Suppl. 1), 137-48.
82. Bittiger, H.; Schnebli, H. P., (In: *Concanavalin A as a Tool,* Wiley, New York), 1976; p 656

83. Poste, G., *Advances in Experimental Medicine and Biology* (In: *Concanavalin A*, eds. T. K. Chowdhury and A. K. Weiss, Plenum Press, New York) 1975, 55, pp. 117-152.
84. Mironov, S. L., *Trends Neurosci.* 1992, 15, (1), 13.
85. Goldstein, I. J., (In: *Concanavalin A as a Tool*, Wiley, New York), 1976, 55-65.
86. A few examples of different post-functionalization approach leading to functional glycopolymers have been reported: a) Gestwicki, J. E.; Strong, L. E.; Borchardt, S. L.; Cairo, C. W.; Schnoes, A. M.; Kiessling, L. L. Bioorg. Med. Chem. 2001, 9, (9), 2387-2393. b) Uzawa, H.; Ito, H.; Izumi, M.; Tokuhisa, H.; Taguchi, K.; Minoura, N. *Tetrahedron* 2005, 61, (24), 5895-5905.
87. DMSO was chosen as the solvent because of its ability of solubilizing both the poly(propargyl methacrylate starting material (4b) and the final clicked polymers. A number of many other different reaction conditions and catalysts (see for example: a) Chan, T. R.; Hilgraf, R.; Sharpless, K. B.; Fokin, V. V., *Org. Lett.* 2004, 6, (17), 2853-2855. b) Lewis, W. G.; Magallon, F. G.; Fokin, V. V.; Finn, M. G. *J. Am. Chem. Soc.* 2004, 126, 9152-9153) could, in theory, be efficiently employed. Given the satisfactory results obtained with the (PPh$_3$)$_3$CuBr)/triethylamine/DMSO catalytic system, no further investigation was carried out in this direction
88. All the multivalent ligands prepared are soluble in water, DMSO and DMF.
89. Jeng, L.; Balke, S. T.; Mourey, T. H.; Wheeler, L.; Romeo, P., *J. Appl. Polym. Sci.* 1993, 49, (8), 1359-74.
90. Kitano, H.; Sumi, Y.; Tagawa, K., *Bioconjugate Chem.* 2001, 12, (1), 56-61.
91. Roy, R.; Page, D.; Perez, S. F.; Bencomo, V. V., *Glycoconjugate J.* 1998, 15, (3), 251-263.
92. Ueno, T.; Tanaka, S.; Umeda, M., *Adv. Drug Delivery Rev.* 1997, 24, (2, 3), 293-299.
93. Khan, M. I.; Mandal, D. K.; Brewer, C. F., *Carbohydr. Res.* 1991, 213, 69-77.
94. Strictly speaking, the point at which the number of coordinated Con A no longer increase with the epitope density increasing lays between 50 and 75%.
95. Owen, R. M.; Gestwicki, J. E.; Young, T.; Kiessling, L. L., *Org. Lett.* 2002, 4, (14), 2293-2296.
96. Bovin, N. V., *Glycoconjugate J.* 1998, 15, (5), 431-446.
97. Gestwicki, J. E.; Strong, L. E.; Kiessling, L. L., *Chem. Biol.* 2000, 7, (8), 583-591.
98. Kamitakahara, H.; Suzuki, T.; Nishigori, N.; Suzuki, Y.; Kanie, O.; Wong, C.-H., *Angew. Chem., Int. Ed.* 1998, 37, (11), 1524-1528.
99. David, A.; Kopeckova, P.; Kopecek, J.; Rubinstein, A., *Pharm. Res.* 2002, 19, (8), 1114-1122.
100. Disney, M. D.; Zheng, J.; Swager, T. M.; Seeberger, P. H., *J. Am. Chem. Soc.* 2004, 126, (41), 13343-13346.
101. Ticha, M.; Kocourek, J., *Carbohydr. Res.* 1991, 213, 339-43.
102. Ladmiral, V.; Monaghan, L.; Mantovani, G.; Haddleton, D. M., *Polymer* 2005, 46, (19), 8536-8545.
103. Fleming, C.; Maldjian, A.; Da Costa, D.; Rullay, A. K.; Haddleton, D. M.; St. John, J.; Penny, P.; Noble, R. C.; Cameron, N. R.; Davis, B. G., *Nat. Chem. Biol.* 2005, 1, (5), 270-274.
104. Haddleton, D. M.; Rullay, A. K.; Limer, A. J.; Carrington, S.; Keely, S.; Brayden, D., *Polym. Prepr. (Am. Chem. Soc., Div. Polym. Chem.)* 2004, 45, (2), 253-254.
105. RCA I columns have been employed for studying the binding ability of a galactose-bearing copolymer micelles: Bes, L.; Angot, S.; Limer, A.; Haddleton, D. M. *Macromolecules* 2003, 36, (7), 2493-2499

The invention claimed is:
1. A process for making a polymer having pendant sugar side groups comprising:
   (i) polymerising an olefinically unsaturated monomer selected from alkyl methacrylates; alkyl acrylates; functionalised methacrylates; functionalized acrylates, glycidyl methacrylate, trimethoxysilyl propyl methacrylate, allyl methacrylate, hydroxyethyl methacrylate, hydroxypropyl methacrylate, dialkylaminoalkyl methacrylates; fluoroalkyl (meth)acrylates; methacrylic acid, acrylic acid; fumaric acid and esters thereof, itaconic acid and esters thereof, maleic anhydride; vinyl halides; acrylonitrile, methacrylonitrile; vinylidene halides of formula $CH_2=C(Hal)_2$ where each halogen is independently Cl or F; optionally substituted butadienes of the formula $CH_2=C(R^{15})C(R^{15})=CH_2$ where $R^{15}$ is independently H, $C_1$-$C_{10}$ alkyl, Cl, or F; sulfonic acids or derivatives thereof of the formula $CH_2=CHSO_2OM$ wherein M is Na, K, Li or $N(R^{16})_4$ where each $R^{16}$ is independently H, Cl or alkyl; acrylamide and derivatives thereof of formula $CH_2=CHCON(R^{16})_2$ and methacrylamide and derivatives thereof of formula $CH_2=C(CH_3)CON(R^{16})_2$ and mixtures thereof;
   functionalised with (a) an azide group optionally protected by a protecting group, or (b) an alkyne group optionally protected by a protecting group,
   by RAFT, transition metal mediated living radical polymerization and/or atom transfer radical polymerization, to produce a polymer intermediate;
   (ii) removing, when present, at least a portion of the total number of protecting groups from the polymer intermediate; and
   (iii) reacting the polymer intermediate with at least one pendant sugar side group moiety functionalised with (a) an alkyne group or (b) an azide group respectively so that the alkyne and azide groups react to attach the pendant sugar side group to the polymer.

2. A process according to claim 1, wherein the monomer comprises an alkyne group optionally protected by a protecting group and the pendant sugar side group comprises an azide group.

3. A process according to claim 1, wherein at least one sugar is N-acetylated.

4. A process according to claim 1 wherein the olefinically unsaturated monomer is copolymerised with one or more different olefinically unsaturated monomers optionally functionalised with one or more functional groups.

5. A process according to claim 4, wherein the functional group is selected from a marker group, a polyalkylene glycol and a drug.

6. A process according to claim 1 wherein the polymer intermediate in step (iii) is reacted with two or more different pendant sugar side group moieties, each functionalised with (a) an alkyne group or (b) an azide group.

7. A process according to claim 1 wherein the polymer intermediate in step (iii) is reacted with the pendant sugar side group moieties and one or more additional functional compounds, each functional compound comprising (a) an alkyne group or (b) an azide group.

8. A process according to claim 6 or claim 7, wherein the pendant sugar side group moiety or functional compound comprises a marker group, a polyalkylene glycol group or a drug.

9. A process according to claim 8, wherein the functional compound comprises a fluorescent group.

10. A process according to claim 1, wherein the or each olefinically unsaturated monomer is a linear, branched or star-shaped, substituted or non-substituted monomer having an olefinically unsaturated moiety capable of undergoing addition polymerisation, and optionally comprising one or more functional groups.

11. A process according to claim 1 wherein the living radical polymerization of step (i) comprises the use of an initiator having a detectable group or a group capable of binding a biological substance, wherein the biological substance is selected from a protein, polypeptide, nucleic acid, carbohydrate or fat.

12. A process according to claim 1, wherein each sugar is selected from glucose, glucosamine, galactose, galactosamine, mannose, lactose, fucose and derivatives thereof.

13. A process according to claim 1, further comprising the step of (iv) reacting the pendant sugar side groups attached to the polymer to derivatize the pendant sugar side groups.

14. A process according to claim 13, wherein the sugar side groups are derivatised by reacting with a chiral compound.

15. A process according to claim 1, wherein the process further comprises the step of preparing a chromatography column comprising the polymer which is the product of step (iii).

16. A process according to claim 1, wherein the pendant sugar side group moiety is an enantiomer of a compound or a racemic mixture of enantiomers of a compound.

* * * * *